US011393023B1

(12) United States Patent
Daya et al.

(10) Patent No.: US 11,393,023 B1
(45) Date of Patent: Jul. 19, 2022

(54) ADAPTIVE MULTI-STAGE USER INTERFACE FOR CREDIT OFFERS

(71) Applicant: Block, Inc., San Francisco, CA (US)

(72) Inventors: Ronak Daya, Brooklyn, NY (US); Mahima Chawla, San Francisco, CA (US); Elizabeth Gregory, San Francisco, CA (US)

(73) Assignee: BLOCK, INC., San Francisco, CA (US)

( * ) Notice: Subject to any disclaimer, the term of this patent is extended or adjusted under 35 U.S.C. 154(b) by 0 days.

(21) Appl. No.: 16/517,374

(22) Filed: Jul. 19, 2019

(51) Int. Cl.
G06Q 40/00 (2012.01)
G06Q 40/02 (2012.01)
G06N 20/00 (2019.01)

(52) U.S. Cl.
CPC .......... *G06Q 40/025* (2013.01); *G06N 20/00* (2019.01)

(58) Field of Classification Search
None
See application file for complete search history.

(56) References Cited

U.S. PATENT DOCUMENTS

| | | |
|---|---|---|
| 6,941,281 B1 | 9/2005 | Johnson |
| 7,630,932 B2 | 12/2009 | Danaher et al. |
| 7,974,918 B1 | 7/2011 | Kunde et al. |
| 8,150,762 B1 | 4/2012 | Reed |
| 8,204,779 B1 | 6/2012 | Hughes et al. |
| 8,429,067 B1 | 4/2013 | Keller et al. |
| 9,183,480 B1 | 11/2015 | Quigley et al. |
| 9,786,005 B1 | 10/2017 | Poursartip et al. |
| 9,805,338 B1 | 10/2017 | Ghosn et al. |
| 9,824,394 B1 | 11/2017 | Boates et al. |
| 9,892,458 B1 | 2/2018 | Shearer et al. |
| 9,984,412 B1 | 5/2018 | Poursartip et al. |
| 10,007,953 B1 | 6/2018 | Nathoo et al. |
| 10,019,698 B1 | 7/2018 | Scott et al. |
| 10,373,185 B1 | 8/2019 | Spitzer |
| 10,628,816 B1 | 4/2020 | Scott et al. |
| 10,832,248 B1 | 11/2020 | Kramme et al. |
| 11,144,990 B1 | 10/2021 | Santa Cruz Masoni et al. |

(Continued)

FOREIGN PATENT DOCUMENTS

WO 2005119543 A1 12/2005

OTHER PUBLICATIONS

Ex parte Matt Cannon, Wei Lium and Jon Wierks, Appeal 2021-000137; U.S. Appl. No. 15/346,498. (PTAB decision May 18, 2021).*

(Continued)

*Primary Examiner* — Olabode Akintola
(74) *Attorney, Agent, or Firm* — Mattingly & Malur, PC

(57) ABSTRACT

A credit offer system may receive a request for a credit offer to a merchant. The credit offer system may obtain data associated with the merchant for determining whether to extend the credit offer to the merchant. In response to determining that the data is not sufficient to extend the credit offer to the merchant, the credit offer system may determine additional data associated with the merchant that is to be obtained and may obtain the additional data. The credit offer system may, in response to determining that the data and the additional data are sufficient to extend the credit offer to the merchant, send information associated with the credit offer to a computing device associated with the merchant.

16 Claims, 16 Drawing Sheets

(56) References Cited

U.S. PATENT DOCUMENTS

| | | |
|---|---|---|
| 2001/0044756 A1 | 11/2001 | Watkins et al. |
| 2003/0074311 A1 | 4/2003 | Saylors et al. |
| 2004/0111361 A1 | 6/2004 | Griffiths et al. |
| 2004/0225545 A1 | 11/2004 | Turner et al. |
| 2004/0225594 A1 | 11/2004 | Nolan, III et al. |
| 2005/0192862 A1 | 9/2005 | Modi |
| 2005/0239448 A1 | 10/2005 | Bayne |
| 2006/0242030 A1 | 10/2006 | Blanchard, Jr. et al. |
| 2007/0067208 A1 | 3/2007 | Haggerty et al. |
| 2007/0168277 A1 | 7/2007 | Marchesi |
| 2007/0271178 A1 | 11/2007 | Davis et al. |
| 2007/0288357 A1 | 12/2007 | Holman et al. |
| 2008/0052229 A1 | 2/2008 | Sheinker et al. |
| 2008/0228540 A1 | 9/2008 | Megdal et al. |
| 2008/0243569 A1 | 10/2008 | Hadden |
| 2009/0048926 A1 | 2/2009 | Salesky et al. |
| 2009/0222374 A1 | 9/2009 | Choudhuri et al. |
| 2009/0222378 A1 | 9/2009 | Choudhuri et al. |
| 2009/0313156 A1 | 12/2009 | Herr |
| 2010/0049588 A1 | 2/2010 | Debow |
| 2010/0100464 A1 | 4/2010 | Ellis et al. |
| 2010/0114624 A1 | 5/2010 | Lakshminarayan et al. |
| 2010/0228651 A1 | 9/2010 | Becerra et al. |
| 2010/0262534 A1 | 10/2010 | Kaufman |
| 2011/0078073 A1 | 3/2011 | Annappindi |
| 2011/0112923 A1 | 5/2011 | Chatter et al. |
| 2011/0178902 A1 | 7/2011 | Imrey et al. |
| 2011/0251870 A1 | 10/2011 | Tavares et al. |
| 2011/0302018 A1 | 12/2011 | Norcross et al. |
| 2012/0005036 A1 | 1/2012 | Erickson |
| 2012/0054097 A1 | 3/2012 | Frohwein et al. |
| 2012/0089436 A1 | 4/2012 | Tavares et al. |
| 2012/0109820 A1 | 5/2012 | Galit et al. |
| 2012/0185311 A1 | 7/2012 | Tavares et al. |
| 2012/0232974 A1 | 9/2012 | Castiglione |
| 2012/0233090 A1 | 9/2012 | Tavares et al. |
| 2012/0239552 A1 | 9/2012 | Harychi |
| 2012/0310686 A1 | 12/2012 | Carter |
| 2012/0330741 A1 | 12/2012 | Cruz |
| 2012/0330769 A1 | 12/2012 | Arceo |
| 2013/0013477 A1 | 1/2013 | Ortega |
| 2013/0110607 A1 | 5/2013 | Basmajian et al. |
| 2013/0231974 A1 | 9/2013 | Harris et al. |
| 2013/0268342 A1 | 10/2013 | Tune et al. |
| 2013/0305356 A1 | 11/2013 | Cohen-Ganor et al. |
| 2013/0339219 A1 | 12/2013 | Bernheimer et al. |
| 2014/0006202 A1 | 1/2014 | Frohwein et al. |
| 2014/0012780 A1 | 1/2014 | Sanders |
| 2014/0025446 A1 | 1/2014 | Nagarajan et al. |
| 2014/0025542 A1 | 1/2014 | Sharma et al. |
| 2014/0122195 A1 | 5/2014 | Tabor et al. |
| 2014/0172560 A1 | 6/2014 | Satyavolu et al. |
| 2014/0180826 A1 | 6/2014 | Boal |
| 2014/0229397 A1 | 8/2014 | Fink |
| 2014/0258088 A1 | 9/2014 | Belarj |
| 2014/0351116 A1 | 11/2014 | Hoff |
| 2014/0358766 A1 | 12/2014 | Nayyar et al. |
| 2015/0019404 A1 | 1/2015 | Karamchedu et al. |
| 2015/0026035 A1 | 1/2015 | Showalter |
| 2015/0066635 A1 | 3/2015 | Valin et al. |
| 2015/0100475 A1 | 4/2015 | Cummings et al. |
| 2015/0106260 A1 | 4/2015 | Andrews et al. |
| 2015/0149333 A1 | 5/2015 | Yaplee et al. |
| 2015/0180833 A1 | 6/2015 | Snow et al. |
| 2015/0348083 A1 | 12/2015 | Brill et al. |
| 2015/0371335 A1 | 12/2015 | Liptak et al. |
| 2016/0012465 A1 | 1/2016 | Sharp |
| 2016/0086222 A1 | 3/2016 | Kurapati |
| 2016/0189292 A1 | 6/2016 | Deshpande et al. |
| 2017/0193596 A1 | 7/2017 | Bol et al. |
| 2017/0255793 A1 | 9/2017 | Caldwell |
| 2018/0040064 A1 | 2/2018 | Grigg et al. |
| 2018/0053253 A1 | 2/2018 | Gokhale et al. |
| 2018/0150910 A1* | 5/2018 | Grech .................. G06Q 40/025 |
| 2018/0158091 A1 | 6/2018 | Ovick et al. |
| 2018/0204280 A1* | 7/2018 | Painter .................... G06F 15/76 |
| 2018/0225648 A1 | 8/2018 | Robinson et al. |
| 2018/0349990 A1 | 12/2018 | Diriye et al. |
| 2019/0172155 A1 | 6/2019 | Byron et al. |

OTHER PUBLICATIONS

"MCM Poll Results: 72 percent of Mobile Food Vendor only accept cash," Mobile Cuisine Magazine, accessed at http://web.archive.org/web/201104 23204019/mobile-cuisine.com/features/mcm-poll-results-72-percent-of-mobile-food-vendors-only-accept -cash/, pp. 2 (Jan. 25, 2011).

Non-Final Office Action dated Apr. 4, 2018, for U.S. Appl. No. 15/855,802, of Jew, W., et al., filed Dec. 27, 2017.

Non-Final Office Action dated Sep. 4, 2018, for U.S. Appl. No. 16/024,140, of Masoni, J.I.S.C, et al., filed Jun. 29, 2018.

Non-Final Office Action dated Sep. 27, 2018, for U.S. Appl. No. 14/985,191, of Spitzer et al., filed Dec. 30, 2015.

Final Office Action dated Nov. 19, 2018, for U.S. Appl. No. 15/855,802, of Jew et al., filed Dec. 27, 2017.

Final Office Action dated Jan. 11, 2019, for U.S. Appl. No. 16/024,140, of Masoni, J.I.S.C., et al., filed Jun. 29, 2018.

Advisory Action dated Feb. 8, 2019, for U.S. Appl. No. 15/855,802, of Jew, W., et al., filed Dec. 27, 2017.

Notice of Allowance dated Mar. 22, 2019, for U.S. Appl. No. 14/985,191, of Spitzer, G., filed Dec. 30, 2015.

Non-Final Office Action dated Aug. 7, 2019, for U.S. Appl. No. 16/024,140, of Masoni, J.I.S.C., et al., filed Jun. 29, 2018.

Non-Final Office Action dated Aug. 22, 2019, for U.S. Appl. No. 15/911,221, of Scott, J.B , et al., filed Mar. 5, 2018.

Non-Final Office Action dated Aug. 30, 2019, for U.S. Appl. No. 16/024,167, of Masoni, J.I.S.C., et al., filed Jun. 29, 2018.

Non-Final Office Action dated Oct. 2, 2019, for U.S. Appl. No. 15/855,802, of Jew, W., et al., filed Dec. 27, 2017.

Notice of Allowance dated Dec. 23, 2019, for U.S. Appl. No. 15/911,221, of Scott, J.B., et al., filed Mar. 5, 2018.

Final Office Action dated Jan. 17, 2020, for U.S. Appl. No. 16/024,140, of Masoni, J.I.S.C., et al., filed Jun. 29, 2018.

Final Office Action dated Feb. 4, 2020, for U.S. Appl. No. 16/024,167, of Masoni, J.I.S.C., et al., filed Jun. 29, 2018.

Final Office Action dated Mar. 6, 2020, for U.S. Appl. No. 15/855,802, of Jew, W., et al., filed Dec. 27, 2017.

Advisory Action dated Apr. 3, 2020, for U.S. Appl. No. 16/024,140, of Masoni, J.I.S.C., et al., filed Jun. 29, 2018.

Advisory Action dated Apr. 9, 2020, for U.S. Appl. No. 16/024,167, of Masoni, J.I.S.C., et al., filed Jun. 29, 2018.

Non-Final Office Action dated May 15, 2020, U.S. Appl. No. 15/995,039, of Perelli-Minetti, L., et al., filed May 31, 2018.

Advisory Action dated May 21, 2020, for U.S. Appl. No. 15/855,802, of Jew, W., et al., filed Dec. 27, 2017.

Non-Final Office Action dated Jun. 25, 2020, U.S. Appl. No. 15/994,882, of Kerof, V., et al., filed May 31, 2018.

Non-Final Office Action dated Jul. 23, 2020, for U.S. Appl. No. 16/024,140, of Masoni, J.I.S.C., et al., filed Jun. 29, 2018.

Non-Final Office Action dated Aug. 19, 2020, for U.S. Appl. No. 16/024,167, of Masoni, J.I.S.C., et al., filed Jun. 29, 2018.

Waraporn N., et al: "Virtual Credit Cards on Mobile for M-Commerce Payment", School of Information Technology, King Mongkut's University of Technology Thonburi, Bangkok, Thailand, 2009 IEEE International Conference on e-Business Engineering (Year: 2009), pp. 241-246.

Final Office Action dated Feb. 2, 2021, for U.S. Appl. No. 16/024,167, of Masoni, J.I.S.C., et al., filed Jun. 29, 2018.

Final Office Action dated Feb. 16, 2021, for U.S. Appl. No. 16/024,140, of Masoni, J.I.S.C., et al., filed Jun. 29, 2018.

Advisory Action dated Apr. 8, 2021, for U.S. Appl. No. 16/024,167, of Masoni, J.Ls C , et al., filed Jun. 29, 2018.

Notice of Allowance dated Jun. 10, 2021, for U.S. Appl. No. 16/024,167, of Masoni, J.I.S.C., et al., filed Jun. 29, 2018.

* cited by examiner

ADAPTIVE MULTI-STAGE USER INTERFACE FOR CREDIT OFFERS

TECHNICAL FIELD

Credit providers commonly offer capital loans to businesses. The credit provider may determine the features, such as the types, sizes, and terms of the capital loans, to offer based at least in part on forecasting each business's capability to repay the loan and based on information associated with the business. One useful source of information for a particular business may be records of the business's transactions with its customers, which may provide evidence as to the income or revenue of the business. However, such information may not be available to the credit provider if the business does not use the credit provider as a payment service to process transactions with customers. Credit offers made without considering such information may therefore be based on an inaccurate assessment of target businesses and may harm the profitability of such credit provider.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
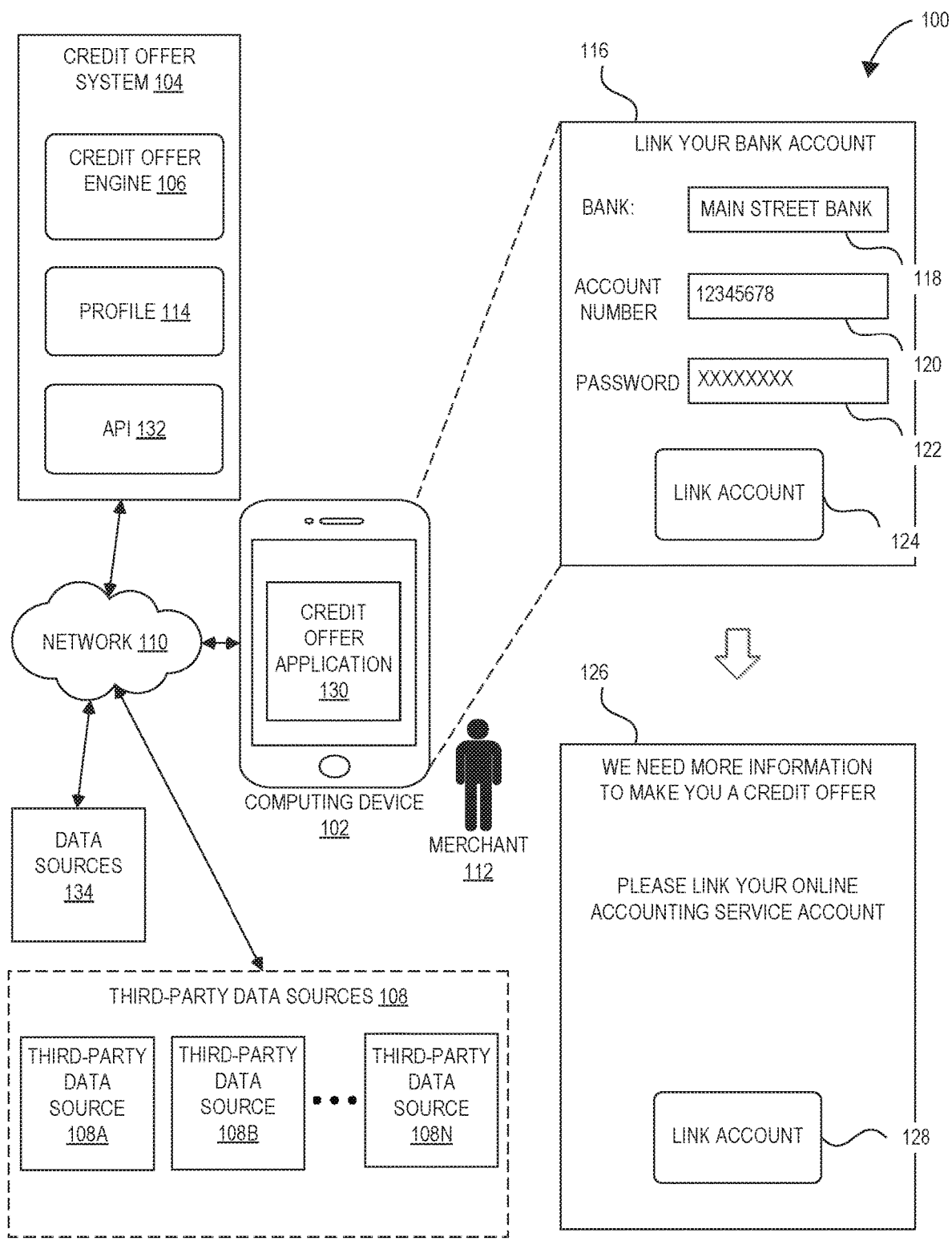
FIG. 1 illustrates an example environment in which an example credit offer system provides credit offers to example merchants, in accordance with one or more aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. The described implementations may be modified in various different ways, all without departing from the scope of the present disclosure. Accordingly, the drawings and description are to be regarded as illustrative in nature and not restrictive.

Overview

Aspects of this disclosure provide a credit offer system that intelligently obtains data specific to merchants, analyzes specific data associated with merchants to decide whether to make credit offers to merchants, and determines the types of credit offers that can be potentially extended to the merchants. A merchant may send a request for a credit offer to the credit offer system, where the credit offer system may not necessarily act as a payment service to process payments for the merchant. As such, when the merchant sends the request for the credit offer to the credit offer system, the credit offer system may not have knowledge or access to records of the merchant's transactions with customers, nor have access to any other information regarding the merchant's income, revenue, expenses, and the like.

The disclosed credit offer system intelligently requests data associated with the merchant to build a profile of the merchant to determine the merchant's ability to pay back a potential credit offer. For another merchant, the credit offer system may request data different from the data requested of the first merchant. When the disclosed credit offer system receives a request from a merchant for a credit offer, the credit offer system may start by requesting an initial set of data associated with the merchant, such as based on the use-case, the requirements of an offer, and the like. The data requested by the credit offer system may be any data from which the credit offer system may be able to determine information regarding the merchant and the merchant's ability to pay back a potential credit offer. Examples of such data may include bank account statements, a credit history, accounting records, the technologies and equipment that are implemented their businesses and the like.

The credit offer system may obtain such requested data associated with the merchant by connecting to third-party data sources at which such data are stored to access current data associated with the merchant. The credit offer system may request information for accessing such data, such as information for connecting and authenticating with such third-party data sources, from the merchant. Upon receiving information for accessing such data from the merchant, the credit offer system may connect to the data source where the data is stored in order to access the data.

Once the credit offer system obtains the initial set of data associated with the merchant, the credit offer system may analyze the data to infer or to otherwise determine information that it may use to determine the merchant's repayment risk score, which may correspond to a risk of the merchant defaulting on the credit offer, and the kind of credit offer to extend to the merchant that would best suit the merchant. For example, the credit offer system may determine from the data, information associated with the merchant such as income, expenses, debt, cash flow, and the like. As the credit offer system determines such information from the data, the credit offer system may build a profile of the merchant based on such information to make projections regarding the merchant's future, such as by projecting future cash flow of the merchant, the ability of the merchant to repay the credit offer, future business needs of the merchant, and the like, which the credit offer system may use to determine the merchant's repayment risk, whether to make a credit offer to the merchant, as well as what kind of credit offer to make to the merchant.

If the credit offer system determines that the information it has determined from the initial data regarding the merchant is not sufficient for it to make a determination regarding whether to extend a credit offer to the merchant, the credit offer system may determine the kinds of additional information that would improve its ability to determine whether to extend a credit offer to the merchant and may determine which additional data associated with the merchant may contain such additional information regarding the merchant. Thus, based at least in part on analyzing the initial data obtained by the credit offer system, the credit offer system may determine additional data associated with the merchant to obtain, and may obtain such additional data regarding the merchant.

To obtain the additional data regarding the merchant, the credit offer system may send a request to the merchant for the additional data. In particular, the credit offer system may send a request to a computing device used by the merchant to communicate with the credit offer system, and the computing device may, in response, present a user interface with which the merchant may interact to input information for accessing the additional data regarding the merchant. Because the additional data requested by the credit offer system may differ based on the kinds of additional information the credit offer system determines would improve its ability to determine whether to extend a credit offer to the merchant, the request sent by the credit offer system may cause the credit offer system to dynamically generate a user interface based at least in part on the additional data the credit offer system requests from the merchant. For example, a request by the credit offer system for accounting statements for the merchant may cause the computing device to generate a user interface to receive input corresponding to information for accessing such accounting statements, while a request by the credit offer system for tax returns of the merchant may cause the computing device to generate a different user interface to receive input corresponding to information for accessing such tax returns.

When the credit offer system obtains the additional data associated with the merchant, the credit offer system may analyze the additional data to infer or to otherwise determine, from the additional data, additional information that it may use to determine whether to extend a credit offer to the merchant and the kind of credit offer to extend to the merchant that would suit the merchant's business needs. The credit offer system may update the profile of the merchant that it has built using such additional information to improve its ability to make accurate projections regarding the merchant's future and to determine whether to extend a credit offer to the merchant.

As the credit offer system obtains additional data associated with the merchant and infers additional information regarding the merchant, the credit offer system may improve its ability to more accurately make projections regarding the merchant's future, and may thereby improve its ability to determine whether to make a credit offer to the merchant as well as its ability to determine the types of credit offers that the merchant would have the ability to repay. As such, when the credit offer system determines that it has sufficient information associated with the merchant in order to make a credit offer to the merchant, the credit offer system may proceed to make a credit offer to the merchant.

However, if the credit offer system determines that it still does not have sufficient information regarding the merchant in order to make a credit offer to the merchant, the credit offer system may continue to intelligently request additional data associated with the merchant to derive additional information associated with the merchant to improve its ability to more accurately make projections regarding the merchant's future, until it determines that it has sufficient information associated with the merchant in order to make a credit offer to the merchant. In addition, as the credit offer system determines more and more information associated with the credit, it can continually, for example in real-time, tailor the credit offer to better suit the merchant's business needs. In this way, the credit offer system may be able to intelligently request data associated with a merchant in order to make a credit offer to the merchant. In response of the request for data, the credit offer system may connect with a single or a combination of data sources to furnish the requested data so that the credit offer system may generate a credit offer and its terms based at least in part on the requested data.

In one example, the credit offer system may receive from a merchant a request for a credit offer. The credit offer system may request and receive the current bank account statement associated with a business checking account for the merchant from a data source associated with the merchant's bank. The credit offer system may analyze the bank account statement to determine information regarding the merchant from the bank account statement, such as the merchant's income, expenses, debts, cash flow, and the like.

However, the credit offer system may determine that it is not able to sufficiently determine the merchant's ability to pay back a credit offer based on the information it has determined from the bank account statement. For example, the credit offer system may determine from the bank account statement that the merchant is currently paying monthly installments to another lender, which may signify that the merchant has already taken out a loan from another lender. However, the credit offer system may not have any visibility regarding the number of payments remaining on the loan.

As such, the credit offer system may determine that it should request information regarding the loan that was previously received by the merchant to better forecast the merchant's ability to pay back a credit offer made by the credit offer system. The credit offer system may request information regarding the loan that was previously received by the merchant by accessing a data source associated with the lender that made the previously-received loan.

The credit offer system may use the information it has obtained regarding the loan previously received by the merchant to augment its ability to determine the merchant's ability to pay back a credit offer from the credit offer system. If the credit offer system determines that the information it has regarding the merchant is sufficient for it to determine the merchant's ability of pay back a credit offer made by the credit offer system, then the credit offer system may make a loan offer to the merchant.

Technical Solution to a Technical Problem

Aspects of the present disclosure provide a technical solution that addresses a technical problem of reducing the amount of user input and data that is transmitted across computer networks that may be required by a lender to make a lending decision to a merchant.

Specifically, because merchants may differ in many ways, certain data may be relevant in deciding whether to make a credit offer to one merchant but may not be relevant in deciding whether to make a credit offer to another merchant. However, in a one-size-fits-all credit offer system, a credit lending system typically collects as much data regarding a merchant as possible, regardless of whether such data is relevant in determining whether to make a credit offer to the merchant. As such, a merchant that requests a credit offer from such a one-size-fits-all credit offer system may expend a significant amount of effort to provide a voluminous amount of user input to a computing device to input the data collected by the system. Furthermore, data, such as financial statements and the like, may be stored at third-party data sources, such as servers associated with various financial institutions that are separate from the credit lending system. As such, retrieving all of the data required by such a one-size-fits-all credit offer system from these third-party sources may result in transmitting relatively large amounts of data across computer networks from such third-party sources, and may also cause battery drain at the merchant's computing device to receive the voluminous amount of user input and to transmit the information inputted by the merchant via a network to the credit offer system.

Aspects of the present disclosure solves the technical problem by intelligently determining which data to obtain in order to decide whether the merchant qualifies for a credit offer and/or to determine the terms of the credit offer. By intelligently determining which data to obtain, the credit offer system may selectively request and obtain data that contributes to the determination of whether the merchant qualifies for a credit offer and/or the determination of the terms of the credit offer, and may refrain from requesting and obtaining data that it determines may not contribute to such a determination, thereby reducing the amount of data that is obtained in order to determine whether to make a credit offer to a merchant.

In addition, aspects of the present disclosure solve the technical problem by dynamically generating user interfaces at the computing device used by the merchant to communicate with the credit offer system based on the data requested by the credit offer system. By dynamically generating user interfaces that are customized to capture the data requested by the credit offer system, the computing device reduces the amount of user interaction with the computing device by reducing the amount of data inputted into the computing device that may not be relevant for determining whether the merchant qualifies for a credit offer, and reduces the amount of data that is transmitted by the computing device to the credit offer system, thereby reducing power usage of the computing device. Further, in some implementations, a dashboard graphical user interface can indicate the state of the credit offer—including past, present, and future states—to provide better visibility to the merchant regarding which data sources may impact the credit offer and how data sources may impact the credit offer. This may aid the merchant to more efficiently plan their business by determining how its actions may affect the credit offers made by the credit offer system (e.g., gaining knowledge that purchasing inventory before a credit offer request could negatively impact terms of the credit offer). Thus, such a "plug-and-play" feature allows merchant to take action to modify their business in order to cause the credit offer system to extend more favorable credit offers.

In this way, rather than being an impenetrable black box where the credit offer system does not offer visibility into how it determines whether merchants qualify for credit offers and how information associated with the merchants affect the terms of credit offers made to merchants, aspects of the present disclosure offer merchants real-time visibility into the decision-making of the credit offer system. Enabling merchants to have real-time visibility and direction around their borrowing capacity that can benefit both the merchants and the credit offer system. Though business credit needs may vary in their level of urgency (e.g., "I'm running out of cash" versus "this could be a good opportunity"), such business credit needs may be ever-present and constantly evolving. The disclosed methods and systems enable merchants to keep a daily pulse on what they have and how to get more or better terms, or what they do not have and how to get it, empowers merchants to help take control of their credit options and to even create options for themselves. From the perspective of the credit offer system, guiding merchants on how they can access credit may help to incentivize behavior that ultimately leads to a lending outcome, whether that be the merchant connecting the credit offer system to different data sources of data regarding the merchant or modifying how merchants operate their business.

For example, a credit offer system in accordance with the present disclosure may request information associated with data from a merchant, obtain the data in real-time from a third-party data source, and may, based on information it has determined from the obtained data, build a profile of the merchant. The credit offer system may, based on the profile of the merchant, determine whether it has sufficient information regarding the merchant to make a credit offer to the merchant. If the credit offer system does not have sufficient information regarding the merchant to make a credit offer, the credit offer system may determine, based on the information it has regarding the client, additional data regarding the merchant that it may obtain from another third-party data source to increase its ability to make a credit offer to the merchant, and may prune any information that does not contribute to the determination of whether to make a credit offer to the merchant. To access such additional data, the credit offer system may send a request to the computing device used by the merchant for information regarding the additional data, such as information for accessing the data at a third-party data source. The computing device may, based on the request, dynamically generate a user interface that is customized to receive input corresponding to the requested data from the merchant, and may send information regarding the additional data to the credit offer system. The credit offer system may use the information it receives from the computing device regarding the additional data to access the additional data regarding the merchant from a third-party data source, update the profile of the merchant based on the additional data, and may determine whether to extend a credit offer to the merchant based on the updated profile of the merchant. In this way, aspects of the present disclosure reduces the amount of user input that is required of the merchant to input relevant data into a computing device and reduces the amount of data that is transmitted across computer networks from third-party data sources to the credit offer system by selectively and intelligently obtaining data to make credit offer decisions.

Aspects of the present disclosure may also use anonymized data from merchants that are associated with the credit offer system, such as anonymized data from merchants that may also use the credit offer system to process payments, to better inform the credit offer system to make credit offers for merchants that are not associated with the credit offer system. This may be useful because merchants that are not associated with the credit offer system may otherwise be relatively harder for the credit offer system to gauge from a credit risk perspective. For example, the credit offer system may train a credit offer engine via machine learning using the anonymized data from merchants associated with the credit offer system as training data, which may be referred to as previous data from previous merchants associated with the credit offer system. Further, aspects of the present disclosure may also allow for frictionless onboarding of such merchants that are not associated with the credit offer system to the credit offer system, such as to use other services provided by the credit offer system, such as invoice or appointment services.

The disclosed methods and systems also disclose techniques for more quickly generating credit offers compared with traditional systems. This is made possible, for example, by intelligently requesting a subset (instead of the entire) of data that financial institutions may typically be conditioned to request. By processing less data to generate credit offers, the disclosed techniques may reduce the amount of time taken to generate credit offers. Further, while the merchant is entering the information on a custom user interface, the credit offer system may pre-fetch risk score and follow-up user interfaces to present to the customer. The technique of credit offer requests while capturing user information may speed up the credit process significantly.

Example System Environment

FIG. 1 illustrates an example environment in which an example credit offer system provides credit offers to example merchants, in accordance with one or more aspects of the present disclosure. As shown in FIG. 1, environment 100 includes computing device 102, credit offer system 104, third-party data sources 108A-180N (hereafter "third-party data sources 108), and network 110. Credit offer system 104 may communicate with computing device 102 and third-party data sources 108 via network 110. Credit offer system 104 may represent any suitable computing system, such as one or more desktop computers, laptop computers, mainframes, servers, virtual servers, virtual machines, containers, cloud computing systems, etc. capable of executing applications and services for determining and providing credit offers to merchants and sending and receiving information both to and from a network, such as network 110. Credit offer system 104 hosts (or at least provides access to) credit offer engine 106. In some examples, credit offer system 104 may represent cloud computing systems that provide access to their respective services via a cloud.

Network 110 represents any public or private communications network, for instance, cellular, Wi-Fi, and/or other types of networks, for transmitting data between computing systems, servers, and computing devices. Credit offer system 104 may exchange data, via network 110, with computing device 102 to send and receive data to and from computing device 102 when computing device 102 and credit offer system 104 are connected to network 110. Similarly, credit offer system 104 may exchange data, via network 110, with one or more of third-party data sources 108 to access data associated with a merchant when credit offer system 104 and third-party data sources 108 are connected to network 110.

Computing device 102 may represent any suitable computing device, such as a mobile phone, a tablet computer, a laptop computer, a desktop computer, and the like, that is capable of executing one or more applications to communicate via network 110 with credit offer system 104. Computing device 102 may be capable of receiving user input via an input device operably coupled to computing device 102, such as a keyboard, a mouse, a touchscreen, a microphone, and the like, as well as providing output, such as via an output device operably coupled to computing device 102, such as a display device, speakers, and the like.

Third-party data sources 108 may represent any suitable computing system, such as one or more desktop computers, laptop computers, mainframes, servers, virtual servers, virtual machines, containers, cloud computing systems, etc. capable of executing applications and services and sending and receiving information both to and from a network, such as network 110. Third-party data sources 108 may be data sources that store data associated with merchants, such as merchant 112, or may store any other data related to merchant 112 that credit offer system 104 may use to determine whether to extend a credit offer to merchant 112. Examples of third-party data sources 108 may include data sources associated with financial institutions, governmental data sources, publicly-accessible data sources, private data sources, payment services, and the like.

In some examples, third-party data sources 108 may provide interfaces such as application programming interfaces (APIs) through with credit offer system 104 may interact with such third-party data sources 108 to retrieve data. In other examples, credit offer system 104 may access data stored in third-party data sources 108 via scraping data from third-party data sources 108. In some examples, third-party data sources 108 may require authentication information (e.g., a username and password) in order to access data stored in third-party data sources 108.

Third-party data sources 108 may not be associated with and/or are independent from credit offer system 104, and individual third-party data sources from third-party data sources 108 may be unrelated to each other. As such, third-party data sources 108 may be data sources owned or under the control of entities, organizations, institutions, and/or persons that are not associated with and are unrelated to credit offer system 104 and merchant 112. For example, while credit offer system 104 may be owned or controlled by one financial institution, third-party data sources 108 may be owned or controlled by other financial institutions different from the financial institution that owns credit offer system 104. Further, while third-party data source 108A may be owned or controlled by one organization, third-party data source 108B may be owned or controlled by a different organization.

In other embodiments, third-party sources 108 may be supplemented or replaced by data sources 134 that provide data signals from internal products and services of credit offer system 104. For example, these data sources may be internal to or may otherwise be associated with other services provided by credit offer system 104. For example, these data sources 134 may include any suitable data sources that are part of a payment processing service provided by credit offer system 104. Examples of such data sources 134 may include payment processing applications, credit card processing services, the hardware and/or software of credit card readers, data sources that store payment transaction data, and the like that are used as part of a payment processing service.

Data associated with merchant 112 may be any suitable data related to merchant 112 that credit offer system 104 may use in determining whether to extend a credit offer to merchant 112 and/or the types, sizes, terms, and the like of the credit it offers to merchant 112. In particular, data associated with merchant 112 may be data that enables credit offer system 104 to build a profile of merchant 112 for the purposes of determining whether to extend a credit offer to merchant 112 and the terms of such a credit offer.

In some examples, data associated with merchant 112 may include financial data associated with merchant 112. For example, the financial data associated with merchant 112 may include a bank account statement associated with a business checking account for merchant 112, credit reports associated with merchant 112, accounting statements associated with merchant 112, tax returns associated with merchant 112, information regarding loans taken out by merchant 112, and the like. In some instances, data may also include personal financial data associated with the owner or owners of merchant 112, such as bank account statements for a personal checking account or a personal savings account, details of personal retirement savings accounts, personal credit reports, details regarding personal loans, and the like. In examples where credit offer system 104 acts as a payment service for processing payments made from customers to merchant 112 during the course of merchant 112's business, or where credit offer system 104 is able to communicate with a third-party data source that is a payment service used to process payments made from customers to merchant 112, the financial data may include any data regarding such transactions between customers and merchant 112.

In some examples, data may also include non-financial data associated with merchant 112. For example, the non-financial data associated with merchant may include data regarding the location or locations of merchant 112, the schedule of business hours of merchant 112, weather forecast information at merchant 112's location, and the like.

As used herein, a merchant, such as merchant 112, may include any business engaged in the offering of goods or services for acquisition by customers. Actions attributed to a merchant may include actions performed by owners, employees, or other agents of the merchant, and thus no distinction is made herein unless specifically discussed. For example, a merchant may also be referred to as a user, such as a user of computing device 102 to communicate with credit offer system 104 or a user of a point-of-sale system that is used during the course of merchant 112's business.

Merchant 112 may request a credit offer from credit offer system 104. A credit offer may be any suitable type of loan for any suitable amount of money. Examples of loans may include fixed rate loans, variable rate loans, lines of credit, and the like, with any suitable terms such as length, interest rate, fees, payments, and the like. To request the credit offer, merchant 112 may interact with computing device 102, such as by providing user input to an input device operably coupled to computing device 102, to send a request for the credit offer to credit offer system 104, via network 110. For example, merchant 112 may execute an application, such as a web browser or an application associated with credit offer system 104, that communicates with an application or service executing at credit offer system 104 to send the request for the credit offer to credit offer system 104 via network 110.

In some examples, credit offer system 104 may receive a request for a credit offer to merchant 112 without merchant 112 taking action (e.g., provide input to computing device 102 that causes computing device 102 to send a request for a credit offer to credit offer system 104) to send a request for a credit offer to credit offer system 104. For example, merchant 112 may use third-party systems or services, such as sales services, financial services, payroll services, appointment services, invoicing services, and the like, or other services associated with credit offer system 104, that may periodically send up-to-date information regarding merchants that uses such systems or services, such as merchant 112, to credit offer system 104. Credit offer system 104 may periodically receive up-to-date information regarding merchants from such systems or services. For example, the credit offer system 104 may include API 132 to which the third-party data sources 108 and services may connect so that credit offer system 104 may periodically obtain such information regarding merchants from third-party data sources 108 at a specific cadence (e.g., every 30 minutes, every hour, every 24 hours, and the like). The credit offer system 104 may determine, based on the information it has received and at periodic time intervals, whether merchants such as merchant 112 qualifies for a credit offer and/or the types of credit offers for which they may qualify without merchant 112 necessarily taking action to request a credit offer from credit offer system 104.

In this way, aspects of the present disclosure reduce friction in the onboarding of merchants to credit offer system 104 because credit offer system 104 may already have collected up-to-date information regarding merchants and may have already built profiles of such merchants when merchants are onboarded to credit offer system 104. Thus, when a merchant, such as merchant 112, is onboarded to credit offer system 104, such as when merchant 112 sends a request for a credit offer to credit offer system 104, credit offer system 104 may be able to intelligently determine, based on the profile it has already built regarding merchant 112, credit offers that merchant 112 qualifies for without requesting additional data from merchant 112. Further, credit offer system 104 may also be able to intelligently determine, based on the profile it has already built regarding merchant 112, additional data it may request from merchant 112 to refine the credit offers to make to merchant 112.

In some implementations, the credit offer system 104 may not necessarily continually track data regarding merchants that are stored by third-party data sources 108. Instead, credit offer system 104 may activate upon a threshold criterion being met. For example, certain data signals associated with merchants may trigger activation of credit offer system 104 to determine credit offers for those merchants, where the data signals may indicate whether a merchant is qualified for a credit offer, or whether a credit offer can be sent to the merchant without additional data or qualification. For example, in examples where the data signals indicate that a merchant has onboard a certain number of employees, or where the data signals indicate that the merchant has purchased a certain amount of inventory, such data signals may trigger credit offer system 104 by causing credit offer system 104 to change its state (e.g., from a sleep state to awake state). The credit offer system 104 may communicate with third-party data sources 108 through API 132 to obtain such data signals or to receive and be triggered via such data signals. If the data signals meet the threshold criterion (e.g., the number of employees exceeds a certain value where the value is more than merchants of their size, the inventory ordered is more than the current merchant location can store, and so on), the credit offer system 104 may obtain permission to create a communication path between itself and third-party data sources 108. The credit offer system 104 may then connect with the third-party data sources 108, either subsequently or at substantially the same time, to obtain specific information in response to the data signals that changed its state. The credit offer system 104 uses that information to take an action, for example extend a credit offer, request for engagement from the merchant, reject a request for credit offer, or rescind a previously extended credit offer.

In scenarios where the request for credit offer originates from merchant 112's computing device 102 or an application therein, the request may include information such as an indication of merchant 112, such as the name of merchant 112. The request for the credit offer may also include an indication of the amount of money merchant 112 would like to borrow, the types of loans that merchant 112 would like to receive, the terms of the loan that merchant 112 would like to receive, or any other suitable information. Credit offer system 104 may receive the request for the credit offer and may, in response, obtain, in real-time, data associated with merchant 112 so that it may determine whether to make the credit offer to merchant 112 based at least in part on the data associated with merchant 112. Credit offer system 104 may obtain data associated with merchant 112 from computing device 102 or from a specific third-party data source out of the third-party data sources 108 based at least in part on an indication of the data associated with merchant 112 that it receives from computing device 102. Upon obtaining the data associated with merchant 112, credit offer system 104 may determine whether to provide a credit offer to merchant 112.

In some scenarios, a merchant may have already received a credit offer from the credit offer system 104. As such the techniques described throughout this disclosure are equally applicable to such scenarios as well for determining and making updated credit offers to merchants that have already received a credit offer from credit offer system 104. For example, upon receiving a credit offer from credit offer system 104, a merchant, such as merchant 112, may request an updated credit offer from credit offer system 104 having better lending terms or for an increased loan amount. In this example, the merchant may use a dashboard or other suitable visualization tools to view the current terms of the credit offer based on current data associated with the merchant that is used by credit offer system 104 to make the current credit offer as well as proposed terms of the credit offer based on possible updated data associated with the merchant.

For example, if credit offer system 104 has access to data associated with the merchant from a first third-party data source (e.g., third-party data source 108A), the dashboard may include a visualization of a proposed credit offer from credit offer system 104 that is based at least in part on the data associated with the merchant that it has accessed from the first third-party data source. Further, dashboard may also include a visualization of an updated credit offer from credit offer system 104 that is contingent upon the merchant authorizing credit offer system 104 to access data associated with the merchant from a second third-party data source (e.g., third-party data source 108B). A single dashboard with current and potential credit offers may allow the merchant to control the kind of data that is shared with credit offer system 104. This may be particularly advantageous for data control and privacy reasons. For example, in some cases, the user may prefer to withhold specific data from a particular third-party data source from being accessed by credit offer system 104 in lieu of being offered an updated credit offer with better terms or a larger loan amount.

Throughout this disclosure, obtaining data in real-time may refer to credit offer system 104 obtaining up-to-date versions of the data from third-party data sources 108 as soon as credit offer system 104 receives information or receives information for accessing the data at one or more of third-party data sources 108. For example, if the data are financial records being stored at a third-party data source associated with a financial institution, credit offer system 104 may be able to connect to the third-party data source, such as via an application programming interface provided by the third-party data source, to access, retrieve, or download the current version of the financial records stored at the third-party data source.

In some examples, when computing device 102 sends the request for the credit offer to credit offer system 104, computing device 102 may include an indication of data associated with merchant 112, which credit offer system 104 may use to obtain the data, in the request for the credit offer. Alternatively, credit offer system 104 may, in response to receiving the request for the credit offer, send computing device 102 a request for information regarding the data associated with merchant 112. The request for information regarding the data associated with merchant 112 may include an indication of the type of data that it is requesting. In response to receiving the request for information regarding the data associated with merchant 112, computing device 102 may send an indication of data associated with merchant 112 to credit offer system 104.

The indication of data associated with merchant 112 that computing device 102 may send to credit offer system 104 may include the data itself, such as a copy of the data that computing device 102 may upload to credit offer system 104. Thus, in some examples, credit offer system 104 may receive the data associated with merchant 112 from computing device 102. Alternatively, the indication of data associated with merchant 112 that computing device 102 may send to credit offer system 104 may include information for accessing the data associated with merchant 112 in real-time at one or more of third-party data sources 108.

The information for accessing the data may include any suitable information that credit offer system 104 may use to access the data at one or more of third-party data sources 108, such as an indication of a specific third-party data source from the third-party data sources 108, authorization information for accessing the data at the specified third-party data source, account information associated with merchant 112 for accessing the data, and the like. For example, if the data associated with merchant 112 is the bank account statement for a bank account associated with merchant 112, the information for accessing the data may include information regarding the financial institution where the bank account is located, the account number for the bank account, the routing number for the bank account, the username and password for accessing the bank account, and the like.

In some examples, in response to receiving the request for information regarding the data associated with merchant 112, computing device 102 may output, such as for display at a display device operably coupled to computing device 102, a user interface for accepting user input via an input device operably coupled to computing device 102. Computing device 102 may receive user input corresponding to information for the data associated with merchant 112 and may send an indication of the data associated with merchant 112 to credit offer system 104. For example, computing device 102 may receive user input corresponding to information for accessing the data at one or more of third-party data sources 108, such as information regarding the financial institution where the bank account is located, the account number for the bank account, the routing number for the bank account, the username and password for accessing the bank account, and the like. In another example, computing device 102 may receive user input corresponding to uploading a copy of the data to credit offer system 104, such as user input corresponding to selecting a copy of the data from the file system of computing device 102 and selecting a user interface element to upload the selected copy of the data to credit offer system 104.

In the example of FIG. 1, computing device 102 may output, for display at a display device operably coupled to computing device 102, graphical user interface (GUI) 116. GUI 116 may include elements 118, 120, 122, and 124 with which merchant 112 may interact to provide user input corresponding to information regarding the data associated with merchant 112, such as information for accessing merchant 112's bank account statement.

If credit offer system 104 does not receive the data associated with merchant 112 from computing device 102, but instead receives information for accessing the data from computing device 102, credit offer system 104 may use the information for accessing the data to access the data associated with merchant 112 from one or more of third-party data sources 108. For example, credit offer system 104 may use the information for accessing the data associated with merchant 112 at one or more of the third-party data sources 108 that it had received from computing device 102 to access the data at one or more of the third-party data sources 108.

Once credit offer system 104 obtains the data associated with merchant 112, it may analyze the obtained data associated with merchant 112 to determine whether to extend a credit offer to merchant 112. In particular, credit offer system 104 may include credit offer engine 106 that executes at credit offer system 104 to determine whether to extend a credit offer to merchant 112.

Credit offer engine 106 may represent any suitable software, such as an application, a service, a module, and the like, that executes at credit offer system 104 to determine whether a merchant qualifies for a credit offer from credit offer system 104 and/or the type or types of offers of credit for which the merchant may qualify. Credit offer engine 106 may execute to intelligently discern, from the data associated with merchant 112 accessed by credit offer system 104 from third-party data sources 108 or data sources 134, information associated with merchant 112 that is indicative of the repayment capacity of merchant 112 from disparate sources and various types of business information. Credit offer engine 106 may quantify the repayment capacity of merchant 112 in many ways. In some example, the repayment capacity of merchant 112 may be a function of the risk of default for merchant 112. In another example, the repayment capacity of merchant 112 may be a function of the projected cash flow of merchant 112. In other examples, the repayment capacity of the merchant 112 may be a function of the risk of default or projected cash flow of similarly situated merchants, such as merchants in a similar location, merchants running a similar business, and the like. This may ensure that credit offer engine 106 may accurately and appropriately calculate credit offers for merchant 112.

In some examples, credit offer engine 106 is trained via machine learning techniques to infer whether a merchant qualifies for a credit offer based on data associated with the merchant. In the examples where credit offer engine 106 is trained via machine learning techniques, credit offer engine 106 may be or may include a recurrent neural network, a convolutional neural network, a deep neural network, and the like. In some examples, credit offer engine 106 may be trained via machine learning over sets of data associated with merchants to whom credit offer engine 106 had previously extended credit offers, such as over previous data associated with a previous merchant that are associated with credit offer system 104. For example, credit offer engine 106 may utilize data of merchants that use credit offer system 104 as a payment service in order to train itself. In this way, credit offer engine 106 may infer, from such machine learning techniques, the types of information and signals that may be used to make decisions regarding making credit offers to merchants.

To make a determination regarding whether or not to make a credit offer to a merchant, credit offer engine 106 may build a profile of a merchant, such as merchant 112 in order to determine whether to make a credit offer to the merchant. A profile associated with a merchant may represent a holistic view of the business, such as how the merchant's business is doing and what the business is forecasted to look like in the future, and may include any suitable information about a merchant that may contribute to credit offer engine 106's decision-making process for determining whether to make a credit offer to the merchant and/or the types of credit offers to make to the merchant. For example, a profile associated with a merchant may include information regarding one or more of: a history of the merchant, debt associated with the merchant, current cash flow of the merchant, current profits and losses of the merchant, recurring income and expenses of the merchant, future behavior of the merchant, future cash flow of the merchant, future profits and losses of the merchant, and the like, that may be used by credit offer engine 106 to determine whether to extend a credit offer to the merchant.

Credit offer engine 106 may be able to determine information associated with the merchant from the data and to use such information to build a profile of the merchant that it may use to determine whether the merchant qualifies for a credit offer from credit offer system 104 and/or the type or types of offers of credit for which the merchant may qualify. For example, credit offer engine 106 may use the profile it has built of the merchant to determine the merchant's ability to pay off a loan in the future, the types of loans that would be most relevant to the merchant, the sizes of the loan that the merchant may be able to pay off in the future, or any other future projections about the merchant.

For example, the data obtained by credit offer system 104 may include a bank account statement for a business checking account associated with merchant 112, which may include information regarding transactions made by merchant 112 over the course of merchant 112's business. As used herein, a transaction may include a financial transaction for the acquisition of goods and/or services that is conducted by merchant 112 during the course of merchant 112's business. Such financial transactions may be conducted between merchant 112 and customers, between merchant 112 and vendors, between merchant 112 and a landlord, between merchant 112 and a creditor, between merchant 112 and its employees and staff, and the like. As used herein, a transaction may also include other examples of transactions, such as peer-to-peer (P2P) lending between merchant 112 and another entity, such as between multiple merchants, between multiple individuals, and the like.

Credit offer engine 106 may be able to identify transaction information from the bank account statement describing each transaction, such as the identifier of the payment instrument, an amount of payment received from the customer, the goods acquired by the customer, a time, place, and date of the transaction, a payment network associated with the payment instrument, an issuing bank of the payment instrument, a name or user account of the customer, contact information of the customer, type of currency, and so forth. Credit offer engine 106 may include indications of such information determined from the bank account statement in the profile of the merchant.

Credit offer engine 106 may intelligently analyze the obtained data to infer information or characteristics associated with merchant 112 from the obtained data. In the example where the obtained data is a bank account statement comprising transaction information, credit offer engine 106 may be able to determine, from the obtained data, information such as the cash flow of merchant 112 (e.g., from recurring and non-recurring income and expenses), the location of merchant 112, the rent or mortgage paid by merchant 112, loan repayment by merchant 112, average check size of merchant 112, repair expenses of merchant 112, the business hours of merchant 112, determine the peak business hours and peak business volume of merchant 112, trends in sales and expenses, and the like.

Credit offer engine 106 may utilize such information determined from the obtained data to generate or update profile 114 of merchant 112 that it may use to determine whether to make a credit offer to merchant 112. As discussed above, credit offer engine 106 may utilize such information determined from the obtained data to determine information regarding one or more of: a history of the merchant 112, debt associated with the merchant 112, credit history of merchant 112, current cash flow of the merchant 112, recurring income and expenses of the merchant 112, future behavior of the merchant 112, future cash flow of the merchant 112, future behavior of merchant 112, future expansion plans of merchant 112, or any other suitable data that is included in profile 114.

Credit offer engine 106 may determine whether the data associated with merchant 112 that it has obtained is sufficient for it to extend a credit offer to merchant 112 using any suitable technique. In particular, credit offer system 104 may determine whether profile 114 it has generated for merchant 112 provides enough information regarding merchant 112 for it to make accurate future projections about merchant 112, such as future projections about merchant 112's future cash flow, in order to extend a credit offer to merchant 112. In one of many examples, credit offer engine 106 may determine, based on any, some, or all of the information included in profile 114, a confidence level (e.g., from 0 to 100) that merchant 112 would be able to successfully pay back a credit offer, as well as a threshold value (e.g., 90, 95, and the like). If credit offer engine 106 determines that the confidence level for merchant 112 is above the threshold value, credit offer engine 106 may determine that merchant 112 qualifies for a credit offer from credit offer system 104. Conversely, if credit offer engine 106 determines that the confidence level for merchant 112 is below the threshold value, or if profile 114 does not have sufficient information for credit offer engine 106 to determine a confidence level for merchant 112, credit offer engine 106 may determine that the data associated with merchant 112 is not sufficient for credit offer system 104 to extend the credit offer to merchant 112.

If credit offer engine 106 determines that merchant 112 qualifies for a credit offer from credit offer system 104, credit offer system 104 may send information regarding the credit offer to computing device 102 so that merchant 112 may view the details of the credit offer to decide whether to accept the credit offer, as discussed in more detail below. Conversely, if credit offer engine 106 determines that the data associated with merchant 112 is not sufficient for credit offer system 104 to extend the credit offer to merchant 112, credit offer engine 106 may determine additional data associated with merchant 112 that it may obtain to supplement the data associated with merchant 112 that it has already obtained and analyzed in order to determine whether to make a credit offer to merchant 112.

In some examples, credit offer engine 106 may determine, based on the previously-obtained data associated with merchant 112, the additional data associated with merchant 112 to obtain, that may contain additional information regarding merchant 112 that increases the ability of credit offer system 104 to make accurate future projections about merchant 112 and increases the level of confidence that merchant 112 would be able to successfully pay back a credit offer from credit offer system 104. In particular, credit offer system 104 may determine the additional information that is to be obtained to supplement the information regarding merchant 112 that has already been determined based in part on the previously-obtained data, and may determine the additional data associated with merchant 112 that it may obtain to determine such additional information.

For example, credit offer engine 106 may determine areas in profile 114 of merchant 112, such as projected future cash flow or projected future debt load, where it does not have sufficient information from merchant 112 based on analyzing the previously-obtained data associated with merchant 112. Thus, credit offer engine 106 may determine the additional data associated with merchant 112 that it may obtain to supplement those areas with additional information.

Credit offer engine 106 may determine, from the previously-obtained bank account statement for merchant 112, that merchant 112 is paying an amount of money each month to a lender to pay off a loan. However, credit offer engine 106 may not be able to determine from the bank account statement the number of payments remaining on the loan and when the loan will be fully paid off. As such, credit offer engine 106 may not be able to accurately determine the future cash flow of merchant 112 without such information because credit offer engine 106 does not have information regarding how to take those payments to the lender into account in forecasting the future cash flow of merchant 112. In this example, credit offer engine 106 may determine which additional data associated with merchant 112 may include details regarding the loan previously taken by merchant 112 and may determine that such additional data is to be obtained by credit offer system 104. In this way, credit offer engine 106 may determine which additional data to obtain to increase its ability to make more accurate future projections about merchant 112.

In another example, credit offer engine 106 may compare the information it has determined regarding merchant 112 with the information associated with one or more other similar merchants to determine the additional data associated with merchant 112 to obtain. These other similar merchants may be merchants that were used in training credit offer engine 106 via machine learning or may be merchants to whom credit offer engine 106 had previously made credit offers. Credit offer engine 106 may select these other merchants to which merchant 112 is compared based on any suitable measures of similarity, such as having similar profiles, similar types of business, similar business locations, similar cash flow, similar projected cash flow, and the like.

Credit offer engine 106 may compare merchant 112 with one or more other similar merchants to determine whether it has sufficient information regarding certain types of information associated with merchant 112 compared with the other similar merchants. For example, if credit offer engine 106 determines that certain areas of information were relatively important in determining whether to extend a credit offer to the other similar merchants, and if it determines that it does not have sufficient information about merchant 112 in the same areas of information, credit offer engine 106 may obtain additional information about merchant 112 regarding those areas of information.

For example, if merchant 112 is a food truck, credit offer engine 106 may compare merchant 112 against other food trucks. Credit offer engine 106 may determine, from the information it has about the other similar food truck operators, that the weather plays an important factor in the daily sales of food truck operators. If merchant 112 determines that the profile 114 of merchant 112 it has generated based on the previously-obtained data associated with merchant 112 does not include sufficient information regarding weather, merchant 112 may obtain information such as the operating schedule or the operating locations of merchant 112, along with historical or forecasted weather conditions during such operating schedule at those operating locations, in order to use such information to determine whether to extend a credit offer to merchant 112.

In some examples, credit offer system 104 may choose and/or prioritize the data associated with merchant 112 that it obtains in order to reduce the friction that may be required for merchant 112 to enter such data. Thus, if credit offer system 104 is able to determine the same or substantially similar information regarding merchant 112 from two or more pieces of data associated with merchant 112, credit offer system may choose to obtain the data with the least amount of friction for merchant 112 to provide. For example, if credit offer system 104 determines that both merchant 112's social security number and evidence merchant 112 has paid rent for the past 12 months may each provide substantially the same information, merchant 112 may choose to obtain merchant 112's social security number because there may be relatively less friction for merchant 112 to enter its social security number than for the merchant to provide evidence of 12 months of paid rent. In this way, credit offer system 104 may prioritize the data that it requests from merchant 112 based at least in part on the friction of merchant 112 providing such data to credit offer system 104.

Similar to the techniques described above for obtaining data associated with merchant 112, once credit offer system 104 determines the additional data associated with merchant 112 that it is to obtain, credit offer system 104 may send a request to computing device 102 for information regarding the additional data associated with merchant 112. The additional data may be the additional data credit offer system 104 has determined to obtain, as discussed above, and the request for information regarding the additional data associated with merchant 112 may include an indication of the additional data that is being requested by credit offer system 104.

The request for information regarding the additional data may cause computing device 102 to generate a user interface that is customized for receiving user input corresponding to the information regarding the additional data. As such, depending on the additional data for which information is requested by credit offer system 104, computing device 102 may dynamically customize the user interface that it generates and outputs in order to receive information regarding the additional data. Thus, in response to receiving the request for information regarding the additional data associated with merchant 112, computing device 102 may, in real-time, dynamically generate a graphical user interface adapted to receive user input corresponding to the information for the additional data associated with merchant 112.

Computing device 102 may output, such as for display at a display device operably coupled to computing device 102, the generated user interface for accepting user input via an input device operably coupled to computing device 102. Computing device 102 may receive user input corresponding to information for the additional data associated with merchant 112 and may send an indication of the data associated with merchant 112 to credit offer system 104. For example, computing device 102 may receive user input corresponding to information for accessing the additional data at one or more of third-party data sources 108, such as information regarding the third-party data source where the additional data is located and the like.

In the example of FIG. 1, credit offer system 104 may send a request for information regarding accounting statements associated with merchant 112. Computing device 102 may receive the request from credit offer system 104 and may, in response and based on the request, dynamically generate GUI 126 that is customized for receiving, via user input, the information regarding accounting statements associated with merchant 112. Computing device 102 may output, for display at a display device operably coupled to computing device 102, GUI 126 that include element 128 with which merchant 112 may interact to provide user input corresponding to information regarding accounting statements associated with merchant 112, such as information for accessing merchant 112's accounting statements from an online accounting service.

In this way, computing device 102 may send an indication of additional data associated with merchant 112 to credit offer system 104. The indication of additional data associated with merchant 112 that computing device 102 may send to credit offer system 104 may include the additional data itself, such as a copy of the additional data that computing device 102 may upload to credit offer system 104. Thus, in some examples, credit offer system 104 may receive the additional data associated with merchant 112 from computing device 102. Alternatively, the indication of additional data associated with merchant 112 that computing device 102 may send to credit offer system 104 may include information for accessing the additional data associated with merchant 112 at one or more of third-party data sources 108.

The information for accessing the additional data may include any suitable information that credit offer system 104 may use to access the additional data at one or more of third-party data sources 108, such as an indication of a specific third-party data source from the third-party data sources 108, authorization information for accessing the additional data at the specified third-party data source, account information associated with merchant 112 for accessing the additional data, and the like. In some examples, because credit offer system 104 may be able to access data from different third-party data sources that are under the control of different entities or organizations, the data source that credit offer system 104 accesses to obtain the additional data associated with merchant 112 may be different from the data source that credit offer system 104 had previously accessed to obtain data associated with merchant 112.

In some examples, while computing device 102 receives the user input corresponding to the information for accessing the additional data, credit offer system 104 may, at the same, determine a credit offer for merchant 112. Credit offer system 104 may determine the credit offer for merchant 112 based on the user input computing device 102 has currently received from merchant 112. For example, if merchant 112 provides user input corresponding to information for accessing multiple pieces of additional data, credit offer system 104 may access a first additional piece of data and may determine a credit offer for merchant 112 based at least in part on the first additional piece of data while merchant 112 is still in the process of providing user input corresponding to information for a second additional piece of data.

In response to receiving the information for accessing the additional data from computing device 102, credit offer system 104 may use the information for accessing the additional data to access the additional data associated with merchant 112 from one or more of third-party data sources 108. For example, credit offer system 104 may use the information for accessing the additional data associated with merchant 112 at one or more of third-party data sources 108 that it had received from computing device 102 to access the additional data at one or more of third-party resources.

As discussed above, credit offer system 104 may be able to obtain data from different third-party data sources at different locations within network 110 (e.g., at different network addresses, at different servers, and the like) that are provided by different third-parties (e.g., different organizations, different companies, different financial institutions, and the like). Thus, credit offer system 104 may obtain the additional data associated with merchant 112 at a different third-party data source from third-party data sources 108 than the data associated with merchant 112 that it had previously obtained.

In response to obtaining the additional data associated with merchant 112, credit offer engine 106 may determine whether the data it had previously obtained together with the additional data it has now obtained are sufficient to extend the credit offer to merchant 112. In particular, credit offer engine 106 may analyze the additional data associated with merchant 112 to determine additional information associated with merchant 112 and may utilize the additional information determined from the additional data to augment profile 114 associated with merchant 112, thereby augmenting the information it already has on merchant 112.

In some examples, credit offer engine 106 may compare and/or prioritize the different data associated with merchant 112 it has retrieved or accessed from different third-party data sources 108 in order to determine or update information regarding merchant 112 to determine whether to extend a credit offer to merchant 112 and/or to determine the types of credit offers to extend to merchant 112. For example, if credit offer engine 106 accesses tax returns of merchant 112 and accounting statements of merchant 112 from different third-party data sources 108, credit offer engine 106 may reconcile the accounting statements of merchant 112 with the tax returns of merchant 112 to determine whether the information included in the tax returns and the accounting statements are in agreement.

If credit offer engine 106 determines that the information included in the tax returns and the accounting statements are not in agreement, such a determination may cause credit offer engine 106 to determine additional information regarding merchant 112 to obtain in order to determine which of the two documents to prioritize. For example, if credit offer engine 106 receives additional information indicating that merchant 112's accounting statements contain correct information, while merchant 112's tax returns contain incorrect information, credit offer engine 106 may prioritize the information included in merchant 112's accounting statements over the information included in merchant 112's tax returns, and may even discard any information determined from merchant 112's tax returns to refrain from using such information in determining whether to extend a credit offer to merchant 112.

As discussed above, credit offer engine 106 may determine, based at least in part on profile 114 of merchant 112, whether it has sufficient information to extend a credit offer to merchant 112. In one example, credit offer engine 106 may determine a confidence level that merchant 112 would be able to successfully pay back a credit offer based at least in part on profile 114. If credit offer engine 106 determines that the confidence level for merchant 112 is above the threshold value, credit offer engine 106 may determine that merchant 112 qualifies for a credit offer from credit offer system 104. Conversely, if credit offer engine 106 determines that the confidence level for merchant 112 is below the threshold value, or if profile 114 does not have sufficient information for credit offer engine 106 to determine a confidence level for merchant 112, credit offer engine 106 may determine that the data associated with merchant 112 is not sufficient for credit offer system 104 to extend the credit offer to merchant 112.

If credit offer engine 106 determines that all of the information it has determined for merchant 112 is not sufficient for credit offer system 104 to extend the credit offer to merchant 112, or that the merchant 112 does not qualify for a credit offer, credit offer system 104 may repeat the techniques described above to repeatedly request further data associated with merchant 112 until credit offer system 104 has sufficient information regarding merchant 112 to extend the credit offer to merchant 112. In particular, credit offer engine 106 may determine further data associated with merchant 112 that it may obtain to supplement information associated with merchant 112 that it has already obtained and analyzed in order to gather further information to determine whether to make a credit offer to merchant 112, and may repeat the techniques for obtaining such further data and the techniques for determining whether merchant 112 qualifies for a credit offer until it has obtained sufficient information to determine that merchant 112 qualifies for a credit offer or until merchant 112 exits the process.

If credit offer engine 106 determines that the information it has determined for merchant 112 is sufficient for credit offer system 104 to extend the credit offer to merchant 112, credit offer engine 106 may provide information regarding the credit offer to merchant 112. For example, in response to determining that the data and the additional data are sufficient to extend the credit offer to merchant 112, credit offer system 104 may send information associated with the credit offer to computing device 102, so that merchant 112 may view the details of the credit offer and either accept or decline the credit offer.

In some examples, credit offer engine 106 may select the credit offer for merchant 112 based at least in part on the data and the additional data associated with merchant 112, such as information contained in profile 114 associated with merchant 112. In particular, credit offer engine 106 may select a credit offer for merchant 112 that would suit the current and future business needs of merchant 112 as determined by credit offer engine 106. Credit offer system 104 may be able to provide a variety of different types of credit offers, and credit offer engine 106 may select one or more credit offers based on the business needs of merchant 112. For example, if credit offer engine 106 determines a likelihood for spikes in cash flow for merchant 112, credit offer engine 106 may select a line of credit as the credit offer to extend to merchant 112 so that merchant 112 may use the credit line when such spikes in cash flow occurs to smooth out merchant 112's cash flow.

Computing device 102 may receive the information regarding the credit offer from credit offer system 104 and may, in response, output the information regarding the credit offer, such as in the form of a notification or alert. Merchant 112 may view the information regarding the credit offer and may provide user input at an input device operably coupled to computing device 102 to accept or decline the credit offer. In some examples, credit offer system 104 may offer two or more credit offers to merchant 112. Computing device 102 may receive information regarding the two or more credit offers from credit offer system 104, and merchant 112 may provide user input to select one of the credit offers to accept or may decline all of the credit offers made to merchant 112. If merchant 112 accepts a credit offer, computing device 102 may send an indication that merchant 112 has accepted the credit offer to credit offer system 104, and credit offer system 104 may operate to effectuate the credit offer.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 2:
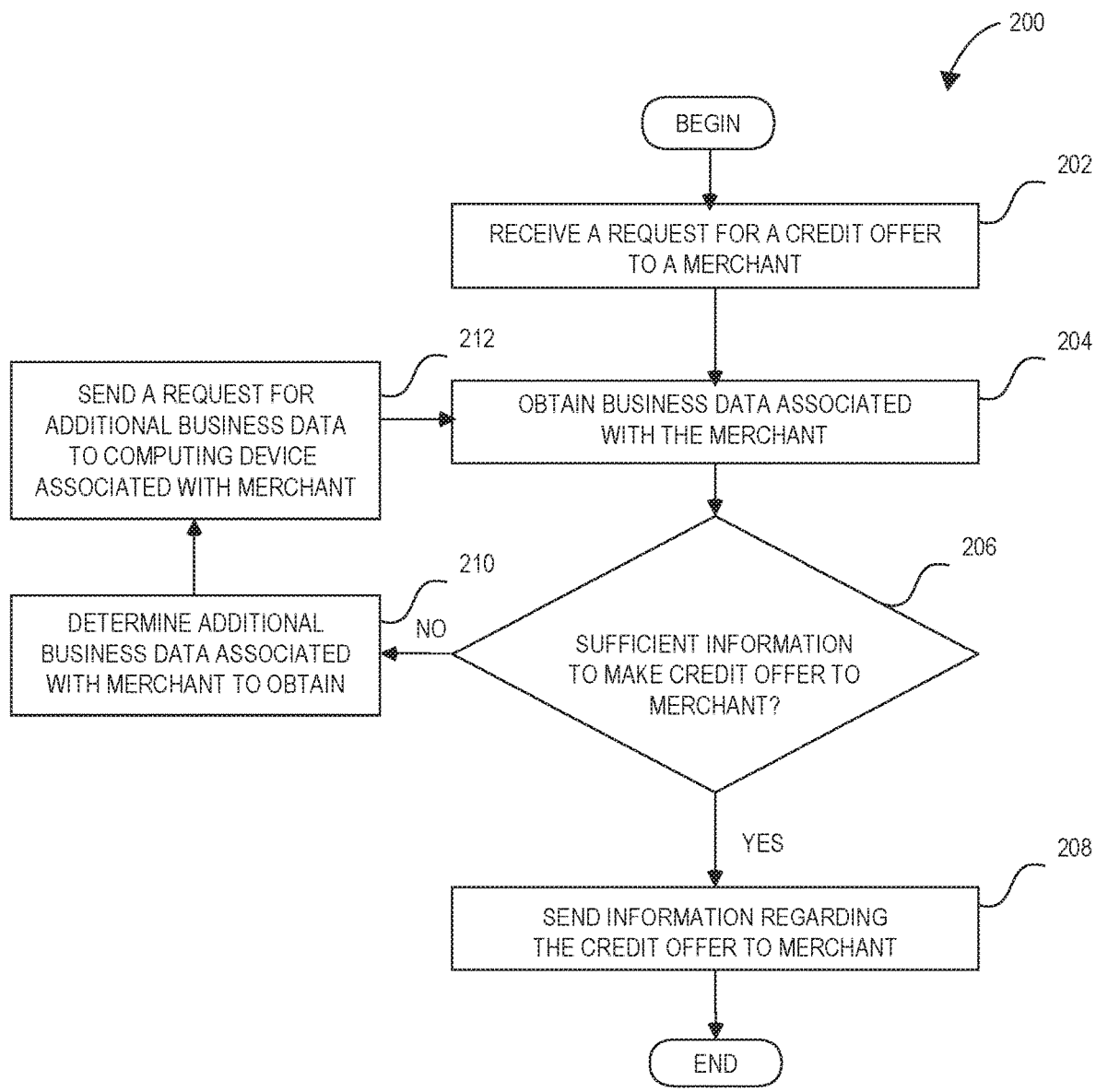
FIG. 2 illustrates a process for obtaining additional data for credit offer decision-making, in accordance with one or more aspects of the present disclosure.

FIG. 2 illustrates a process for obtaining additional data for credit offer decision-making, in accordance with one or more aspects of the present disclosure. For purposes of illustration, the example operations of FIG. 2 are described below within the context of FIG. 1. As shown in FIG. 2, process 200 may begin at block 202, where credit offer system 104 may receive, from computing device 102 associated with merchant 112, a request for a credit offer to merchant 112. In some examples, the request for the credit offer may specify the particular credit offer that is being requested, such as the amount of credit that is being requested, the type of credit being requested, the terms of the credit offer, and the like. In some examples, the request for the credit offer may also include an indication of data that is associated with merchant 112 that credit offer system 104 may use to determine whether to extend the credit offer to merchant 112.

Process 200 may proceed to block 204, where credit offer system 104 may obtain, in real-time, data associated with merchant 112. Data associated with merchant 112 may include any suitable data that may be used by credit offer system 104 in determining whether to make a credit offer to merchant 112. Data may include financial data associated with merchant 112 such as bank account statements, credit reports, accounting records, and the like. Data may also include non-financial data associated with merchant 112, such as data regarding the location or locations of merchant 112, the schedule of business hours of merchant 112, weather forecast information at merchant 112's location, package shipping information associated with merchant 112, and the like.

Credit offer system 104 may receive the data from computing device 102 associated with merchant 112, or may receive, from computing device 102, information for accessing the data at a third-party data source from the third-party data sources 108. If credit offer system 104 receives information for accessing the data at a third-party data source, credit offer system 104 may use the received information to access the data at the third-party data source, such as by accessing the data via an application programming interface provided by the third-party data source and by providing authorization information, such as may be included in the information to access the data that credit offer system 104 received from computing device 102, to the third-party data sources 108.

Credit offer system 104 may obtain such data in real-time, meaning, for example, that as soon as it receives, from computing device 102, the information for accessing the data at a third-party data source, credit offer system 104 may utilize the information received from computing device 102 to access the data at the third-party data source. In this way, credit offer system 104 may access the data at the third-party data source in a matter of seconds or minutes after receiving the information for accessing the data at the third-party data source.

Once credit offer system 104 has obtained the data, process 200 may proceed to block 206, where credit offer system 104 may determine, in real-time, whether the data is sufficient to extend a credit offer to merchant 112 and, if so, whether to make a credit offer to merchant 112. By making such a determination in real-time, credit offer system 104 may be able to notify merchant 112 whether it qualifies for a credit offer or whether credit offer system 104 requires additional data associated with merchant 112 in a matter of minutes (e.g., less than 5 minutes) after merchant 112 requests a credit offer from credit offer system 104.

To determine whether the data is sufficient to extend a credit offer to merchant 112, credit offer engine 106 may determine information associated with merchant 112 from the data and may utilize the information determined from the obtained data to generate or update profile 114 of merchant 112 that it may use to determine whether to make a credit offer to merchant 112.

Credit offer engine 106 may determine whether the data associated with merchant 112 that it has obtained is sufficient for it to extend a credit offer to merchant 112 using any suitable technique. In particular, credit offer system 104 may determine whether the profile 114 it has generated for merchant 112 provides enough information regarding merchant 112 for it to extend a credit offer to merchant 112. In one of many examples, credit offer engine 106 may determine, based on any, some, or all of the information included in profile 114, a confidence level (e.g., from 0 to 100) that merchant 112 would be able to successfully pay back a credit offer, as well as a threshold value (e.g., 90, 95, and the like). If credit offer engine 106 determines that the confidence level for merchant 112 is above the threshold value, credit offer engine 106 may determine that merchant 112 qualifies for a credit offer from credit offer system 104. Conversely, if credit offer engine 106 determines that the confidence level for merchant 112 is below the threshold value, or if profile 114 does not have sufficient information for credit offer engine 106 to determine a confidence level for merchant 112, credit offer engine 106 may determine that the data associated with merchant 112 is not sufficient for credit offer system 104 to extend the credit offer to merchant 112.

In another example, credit offer engine 106 may determine, based on any, some, or all of the information included in profile 114, a risk of default for merchant 112 that may correspond to an estimate of merchant 112's likelihood of default on a potential credit offer from credit offer system 104. The likelihood of default may be represented by a probability or percentage value (e.g., 10%, 20%, 30%). Credit offer engine 106 may compare the calculate probability of default for a particular merchant (e.g., merchant 112) with a threshold value (e.g., 15%). If credit offer engine 106 determines that merchant 112's probability of default is below the threshold value, credit offer engine may determine that merchant 112 qualifies for a credit offer from credit offer system 104. Conversely, if credit offer engine 106 determines that the probability of default is above the threshold value, or if profile 114 does not sufficient information for credit offer engine 106 to determine a probability of default level for merchant 112, credit offer engine 106 may determine that the data associated with merchant 112 is not sufficient for credit offer system 104 to extend the credit offer to merchant 112.

If credit offer engine 106 determines that merchant 112 qualifies for a credit offer from credit offer system 104, process 200 may proceed to block 208, where credit offer system 104 may send information regarding the credit offer to computing device 102 so that merchant 112 may view the details of the credit offer to decide whether to accept the credit offer.

If credit offer engine 106 determines that the data associated with merchant 112 is not sufficient for credit offer system 104 to extend the credit offer to merchant 112, or if credit offer engine 106 determines that the confidence level that merchant 112 would be able to successfully pay back the credit offer is below the threshold value, process 200 may proceed to block 210 where credit offer engine 106 may determine additional data associated with merchant 112 that it may obtain to supplement the data associated with merchant 112 in order to determine whether to make a credit offer to merchant 112.

In some examples, credit offer engine 106 may determine, based at least in part on the previously-obtained data associated with merchant 112, the additional data associated with merchant 112 to obtain that may contain additional information regarding merchant 112 that increases the level of confidence that merchant 112 would be able to successfully pay back a credit offer from credit offer system 104. For example, credit offer engine 106 may determine areas of information in profile 114 of merchant 112 where it does not sufficient information regarding merchant 112 based on analyzing the previously-obtained data associated with merchant 112. In this way, credit offer engine 106 may be able to dynamically determine, based at least in part on profile 114 of merchant 112, the additional data associated with merchant 112 that would supplement those areas of profile 114 with additional information.

In some examples, credit offer engine 106 may determine the additional data associated with merchant 112 to obtain based at least in part on comparing merchant 112 with one or more similar merchants. For example, credit offer engine 106 may determine one or more other merchants that are similar to merchant 112. These one or more similar merchants may be merchants that were used in training credit offer engine 106 via machine learning or may be merchants to whom credit offer engine 106 had previously made credit offers. Credit offer engine 106 may determine the one or more other merchants that are similar to merchant 112 based on any suitable measures of similarity, such as having similar profiles, similar types of business, similar business locations, similar cash flow, similar projected cash flow, and the like.

In response to determining the additional data associated with merchant 112 to obtain, process 200 may proceed to block 212 where credit offer system 104 may send a request for the additional data to computing device 102 associated with merchant 112, which may cause computing device 102 to dynamically generate a user interface with which merchant 112 may interact to provide user input that corresponds to information regarding the additional data, such as information regarding how to access the additional data at a third-party data source (e.g., third-party data source 108B). Process 200 may proceed to block 204 where credit offer system 104 may obtain the additional data associated with merchant 112. For example, in response to sending the request for the additional data to computing device 102, which causes computing device 102 to dynamically generate a user interface with which merchant 112 may interact to provide user input that corresponds to information regarding the additional data, such as information regarding how to access the additional data at a third-party data source, credit offer system 104 may receive from computing device 102 a copy of the additional data or information for accessing the additional data at a third-party data source, which may be inputted by merchant 112 via the dynamically generated user interface at computing device 102. This third-party data source may be different and unrelated to the third-party data source that was previously accessed to obtain data associated with merchant 112. For example, credit offer system 104 may retrieve data from third-party data source 108A and may retrieve additional data from third-party data source 108B Similar to the techniques described above, credit offer system 104 may use the information for accessing the additional data to access the additional data at the specified third-party data source.

Credit offer system 104 may obtain the additional data in real-time, meaning, for example, that as soon as it receives, from computing device 102, the information for accessing the additional data at a third-party data source, credit offer system 104 may utilize the information received from computing device 102 to access the additional data at the third-party data source. In this way, credit offer system 104 may access the additional data at the third-party data source in a matter of seconds or minutes after receiving the information for accessing the additional data at the third-party data source.

In response to obtaining the additional data associated with merchant 112, process 200 may once again proceed to block 206, where credit offer system 104 may determine whether it now has sufficient information regarding merchant 112 to make a credit offer to merchant 112. Credit offer engine 106 may determine additional information regarding merchant 112 from the additional data associated with merchant 112 and may update profile 114 of merchant 112 with such additional information and may determine whether to make a credit offer to merchant 112 based on the updated profile 114 of merchant 112.

In this way, credit offer engine 106 may determine whether the data associated with merchant 112 and the additional data associated with merchant 112 are sufficient to extend the credit offer to merchant 112. If credit offer engine 106 determines that the data associated with merchant 112 and the additional data associated with merchant 112 are sufficient to extend the credit offer to merchant 112, and that merchant 112 qualifies for a credit offer from credit offer system 104, process 200 may proceed to block 208, where credit offer system 104 may send information regarding the credit offer to computing device 102 so that merchant 112 may view the details of the credit offer to decide whether to accept the credit offer.

If credit offer engine 106 determines that the data associated with merchant 112 and the additional data associated with merchant 112 are not sufficient for credit offer system 104 to extend the credit offer to merchant 112, or if credit offer engine 106 determines that the confidence level that merchant 112 would be able to successfully pay back the credit offer is below the threshold value, process 200 may proceed back to block 210 where credit offer engine 106 may continue to determine further data associated with merchant 112 that it may obtain to supplement the information it has already determined regarding merchant 112 in order to determine whether to make a credit offer to merchant 112. Process 200 may repeat the techniques described in blocks 204, 206, 210, and 212 until it has sufficient information about merchant 112 to make a credit offer to merchant 112 or until merchant 112 stops the credit offer process.

Instead of or in addition to determining whether it has sufficient information about a merchant to make a credit offer to the merchant, credit offer system 104 may also determine which credit offer or credit offers that a merchant qualifies for, and may change or update the credit offers that a merchant qualifies for based at least in part on the information it obtains regarding the merchant. As credit offer system 104 receives more information regarding a merchant and is able to form a more comprehensive view of the merchant's business, it may determine credit offers that may be well-suited to the merchant's business and may update the credit offers that it makes to the merchant based on having an increased understanding of the merchant's business. Furthermore, if a merchant does not like the credit offers made to it by credit offer system 104, the merchant may provide additional information regarding itself to credit offer system 104 so that credit offer system 104 may update the credit offers that are made to the merchant.

Figure 3:
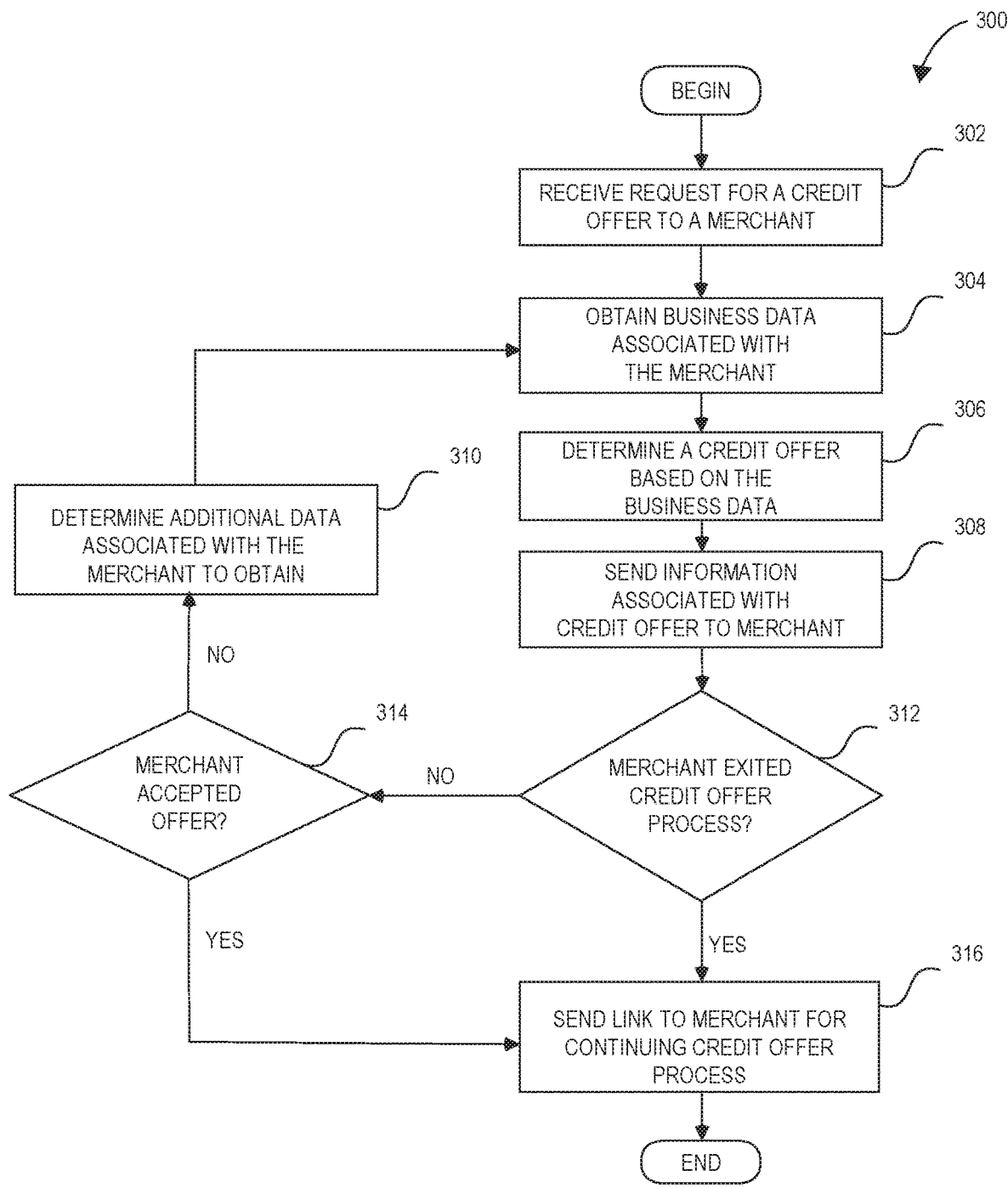
FIG. 3 illustrates a process for obtaining additional data to update a credit offer, in accordance with one or more aspects of the present disclosure.

FIG. 3 illustrates a process for obtaining additional data to update a credit offer, in accordance with one or more aspects of the present disclosure. For purposes of illustration, the example operations of FIG. 3 are described below within the context of FIG. 1. As shown in FIG. 3, process 300 begins at block 302 where credit offer system 104 may receive a request from computing device 102 for a credit offer to merchant 112.

Process 300 may proceed to block 304, where credit offer system 104 may obtain, in real-time, data associated with merchant 112. Data associated with merchant 112 may include any suitable data that may be used by credit offer system 104 in determining whether to make a credit offer to merchant 112. Data may include financial data associated with merchant 112 such as bank account statements, credit reports, accounting records, and the like. Data may also include non-financial data associated with merchant 112, such as data regarding the location or locations of merchant 112, the schedule of business hours of merchant 112, weather forecast information at merchant 112's location, package shipping information associated with merchant 112, and the like.

Credit offer system 104 may receive the data from computing device 102 associated with merchant 112, or may receive, from computing device 102, information for accessing the data at a third-party data source from the third-party data sources 108. If credit offer system 104 receives information for accessing the data at a third-party data source, credit offer system 104 may use the received information to access the data at the third-party data source, such as by accessing the data via an application programming interface provided by the third-party data source and by providing authorization information, such as may be included in the information to access the data that credit offer system 104 received from computing device 102, to the third-party data sources 108.

Credit offer system 104 may obtain such data in real-time, meaning, for example, that as soon as it receives, from computing device 102, the information for accessing the data at a third-party data source, credit offer system 104 may utilize the information received from computing device 102 to access the data at the third-party data source. In this way, credit offer system 104 may access the data at the third-party data source in a matter of seconds or minutes after receiving the information for accessing the data at the third-party data source.

Once credit offer system 104 has obtained the data, process 200 may proceed to block 306, where credit offer system 104 may determine, in real-time, one or more credit offers to make to merchant 112. By making such a determination in real-time, credit offer system 104 may be able to notify merchant 112 regarding one or more credit offers for which merchant 112 qualifies in a matter of minutes (e.g., less than 5 minutes) after merchant 112 requests a credit offer from credit offer system 104.

In some examples, credit offer engine 106 may determine one or more credit offers based at least in part on the data associated with merchant 112. As discussed above, credit offer engine 106 may generate a profile 114 of merchant 112 that contains information associated with merchant 112 that has been obtained or otherwise determined based at least in part on the data associated with merchant 112. Credit offer engine 106 may determine, based at least in part on profile 114 of merchant 112, information such as future cash flow, debt burden, and the like, to determine one or more credit offers for merchant 112 that would suit merchant 112 based on its profile 114.

In some examples, credit offer engine 106 may determine one or more credit offers for merchant 112 based at least in part on comparing merchant 112 with one or more other merchants that credit offer engine 106 has determined are similar to merchant 112. For example, credit offer engine 106 may determine one or more other merchants that are similar to merchant 112 based at least in part on comparing information about merchant 112 in profile 114 of merchant 112 against information about the one or more other merchants. These one or more other merchants may be merchants that were used in training credit offer engine 106 via machine learning or may be merchants to whom credit offer engine 106 had previously made credit offers. Credit offer engine 106 may determine the one or more other merchants that are similar to merchant 112 based on any suitable measures of similarity, such as having similar profiles, similar types of business, similar business locations, similar cash flow, similar projected cash flow, and the like.

Credit offer engine 106 may determine one or more credit offers for merchant 112 based on the credit offers that were made previously to the one or more other merchants. Because merchants that are similar may have similar credit offer needs, credit offer engine 106 may determine one or more credit offers for merchant 112 that are similar in type, terms, amount, and the like to credit offers it had previously made to the one or more other merchants.

In response to determining one or more credit offers for merchant 112, process 300 may proceed to block 308 where credit offer system 104 may send information associated with the one or more credit offers to computing device 102. Computing device 102 may present the information associated with the one or more credit offers to merchant 112 and merchant 112 may use computing device 102 to accept one of the one or more credit offers or to reject the one or more credit offers.

Merchant 112 may exit from process 300 at any time. For example, merchant 112 may not want to or may not have time to provide additional data to credit offer system 104 at the time. As such, at any time during process 300, such as when process 300 proceeds from block 308 to block 310, credit offer system 104 may determine whether merchant 112 has exited the credit offer process. For example, credit offer system 104 may determine that merchant 112 has exited the credit offer process in response to receiving from computing device 102 an indication that merchant 112 has exited from the process.

If credit offer system 104 determines that merchant 112 has exited from the credit offer process, credit offer system 104 may nonetheless save the progress of merchant 112 in the credit offer process, so that credit offer system 104 may, at a later time, return to the point of the credit offer process at which merchant 112 had exited the process. The progress of merchant 112 may include the profile (e.g., profile 114) of merchant 112 that credit offer system 104 has built based on the information regarding merchant 112 that it had previously accessed. Therefore, when merchant 112 returns to the credit offer process, credit offer system 104 may retrieve the profile of merchant 112 that it has built and may determine whether to extend a credit offer and/or the types of credit offers to extend to merchant 112 based on the profile.

Further, credit offer system 104 may continue to update the profile of merchant 112 even after merchant 112 exits the credit offer process. If credit offer system 104 had previously accessed data regarding merchant 112 to build or update the profile of merchant 112, credit offer system 104 may continue to access updated versions of the same previously-accessed data and may update the profile of merchant 112 based on the updated versions of the data. For example, if credit offer system 104 had previously accessed bank account statements of merchant 112 to build the profile of merchant 112, credit offer system 104 may periodically access the current bank account statements of merchant 112 to update the profile of merchant 112 even when merchant 112 has exited the credit offer process.

By continuing to update the profile of merchant 112 even after merchant 112 exits the credit offer process, the updated profile of merchant 112 that is used by credit offer system 104 to determine whether to make a credit offer to merchant 112 and/or the types of credit offers to merchant 112 may be different from the profile of merchant 112 as it existed at the time merchant 112 exits the credit offer process. As such, when merchant 112 later returns to the credit offer process, the results from credit offer system 104 using the updated profile of merchant 112 to make determinations of whether to make a credit offer to merchant 112 and/or the types of credit offers to merchant 112 may differ from the results from credit offer system 104 using the profile of merchant 112 exiting the credit offer process to make determinations of whether to make a credit offer to merchant 112 and/or the types of credit offers to merchant 112.

When merchant 112 exits the credit offer process, process 300 may proceed to block 316 where credit offer process may send a link to merchant 112 via any suitable communications technique such as a text message, an e-mail message, and the like that enables merchant 112 to continue the credit offer process. The link may be a hyperlink to a network address or universal resource locator (URL) associated with credit offer system 104 that merchant 112 may select, such as at computing device 102, that causes computing device 102 to send to credit offer system 104 an indication that merchant 112 would like to continue the credit offer process.

If merchant 112 has not exited the credit offer process, process 300 may proceed to block 312 where credit offer system 104 may determine whether merchant 112 has accepted one of the one or more credit offers made to merchant 112. If credit offer system 104 receives an indication that merchant 112 has accepted one of the one or more credit offers from computing device 102, credit offer system 104 may operate to effectuate the credit offer and end process 300. On the other hand, if credit offer system 104 receives an indication that merchant 112 has rejected the one or more credit offers from computing device 102, process 300 may proceed to block 310 where credit offer engine 106 may determine additional data regarding merchant 112 to obtain in order to be able to make an updated credit offer that merchant 112 may be more likely to accept compared with the one or more credit offers it had previously made to merchant 112.

Credit offer engine 106 may determine the additional data to obtain based on any suitable technique. As discussed above, the additional data associated with merchant 112 may include financial data or non-financial data. In one example, credit offer engine 106 may determine the additional data associated with merchant 112 to obtain based at least in part on the data associated with merchant 112 it had previously obtained. For example, if credit offer engine 106 determines, from a bank account statement associated with merchant 112, that merchant 112 is currently making monthly payments to pay off a loan that merchant 112 had previously taken out, credit offer engine 106 may determine that details regarding this loan may provide information that enables credit offer engine 106 to make a more accurate forecast of future cash flow of merchant 112 because the details of this loan may enable credit offer engine 106 to determine the remaining balance of the loan and when the loan will be paid off.

In another example, credit offer engine 106 may determine the additional data associated with merchant 112 to obtain based at least in part on the profile 114 it had generated for merchant 112. For example, credit offer engine 106 may determine it does not have enough information in certain areas of profile 114 of merchant 112 in order to determine a credit offer that may be more likely to be accepted compared with the credit offer it had previously made to merchant 112. For example, if profile 114 for merchant 112 does not contain information regarding the location of merchant 112, and if credit offer engine 106 determines that it may be able to make an updated credit offer that may be more likely to be accepted compared with the credit offer it had previously made to merchant 112 if it had such information regarding merchant 112, credit offer engine 106 may determine that it is to obtain information regarding the location of merchant 112 as the additional data associated with merchant 112 to obtain.

Credit offer engine 106 may also determine the additional data associated with merchant 112 to obtain based at least in part on the credit offers that were made previously to the one or more other merchants that are determined to be similar to merchant 112. Because merchants that are similar may have similar credit offer needs and/or business needs, credit offer engine 106 may compare the profile of merchant 112 to the profiles of the one or more other merchants that are similar to merchant 112 to determine information that may be lacking in profile 114 compared to the profiles of the one or more other merchants that are similar to merchant 112. Credit offer engine 106 may, in this case, determine that it is to obtain such information currently lacking in profile 114 of merchant 112 as the additional data associated with merchant 112.

In response to determining the additional data associated with merchant 112 to obtain, process 300 may proceed back to block 304 to obtain, in real-time, the additional data associated with merchant 112. Credit offer system 104 may receive the additional data from computing device 102 associated with merchant 112, or may receive, from computing device 102, information for accessing the additional data at a third-party data source from the third-party data sources 108. The third-party data source where additional data is stored may be a specific data source that is different from the third-party data source from which credit offer system 104 accessed the data associated with merchant 112. If credit offer system 104 receives information for accessing the additional data at a third-party data source, credit offer system 104 may use the received information to access the additional data at the third-party data source, such as by accessing the data via an application programming interface provided by the third-party data source and by providing authorization information, such as may be included in the information to access the additional data that credit offer system 104 received from computing device 102, to the third-party data sources 108.

Credit offer system 104 may obtain such additional data in real-time, meaning, for example, that as soon as it receives, from computing device 102, the information for accessing the additional data at a third-party data source, credit offer system 104 may utilize the information received from computing device 102 to access the additional data at the third-party data source. In this way, credit offer system 104 may access the additional data at the third-party data source in a matter of seconds or minutes after receiving the information for accessing the additional data at the third-party data source.

Once credit offer system 104 has obtained the data, process 200 may proceed to block 306, where credit offer system 104 may once again determine, in real-time, an updated credit offer to make to merchant 112 based at least in part on the additional data. Credit offer engine 106 may determine the updated credit offer for merchant 112 based on any of the techniques disclosed herein for determining a credit offer for merchant 112, such as by updating profile 114 of merchant 112 and determining the updated credit offer based at least in part on profile 114, comparing the updated profile 114 against the profiles of one or more other merchants that are similar to merchant 112, and the like.

In response to determining an updated credit offer for merchant 112, process 300 may proceed to block 308 where credit offer system 104 may send information associated with the updated credit offer to computing device 102. Computing device 102 may present the information associated with the updated credit to merchant 112 and merchant 112 may use computing device 102 to accept the updated credit offer or to reject the updated credit offer.

Process 300 may proceed to block 312 where credit offer system 104 may determine whether merchant 112 has accepted the updated credit offer. If credit offer system 104 receives an indication that merchant 112 has accepted the updated credit offer from computing device 102, credit offer system 104 may operate to effectuate the updated credit offer and end process 300. On the other hand, if credit offer system 104 receives an indication that merchant 112 has rejected the updated credit offer from computing device 102, process 300 may proceed to repeat the techniques of blocks 310, 304, 306, 308, and 312 to obtain further data associated with merchant 112 and to determine further updated credit offers for merchant 112 that merchant 112 may accept or reject until merchant 112 accepts a credit offer offered by credit offer system 104 or until merchant 112 exits the credit offer process.

Figure 4:
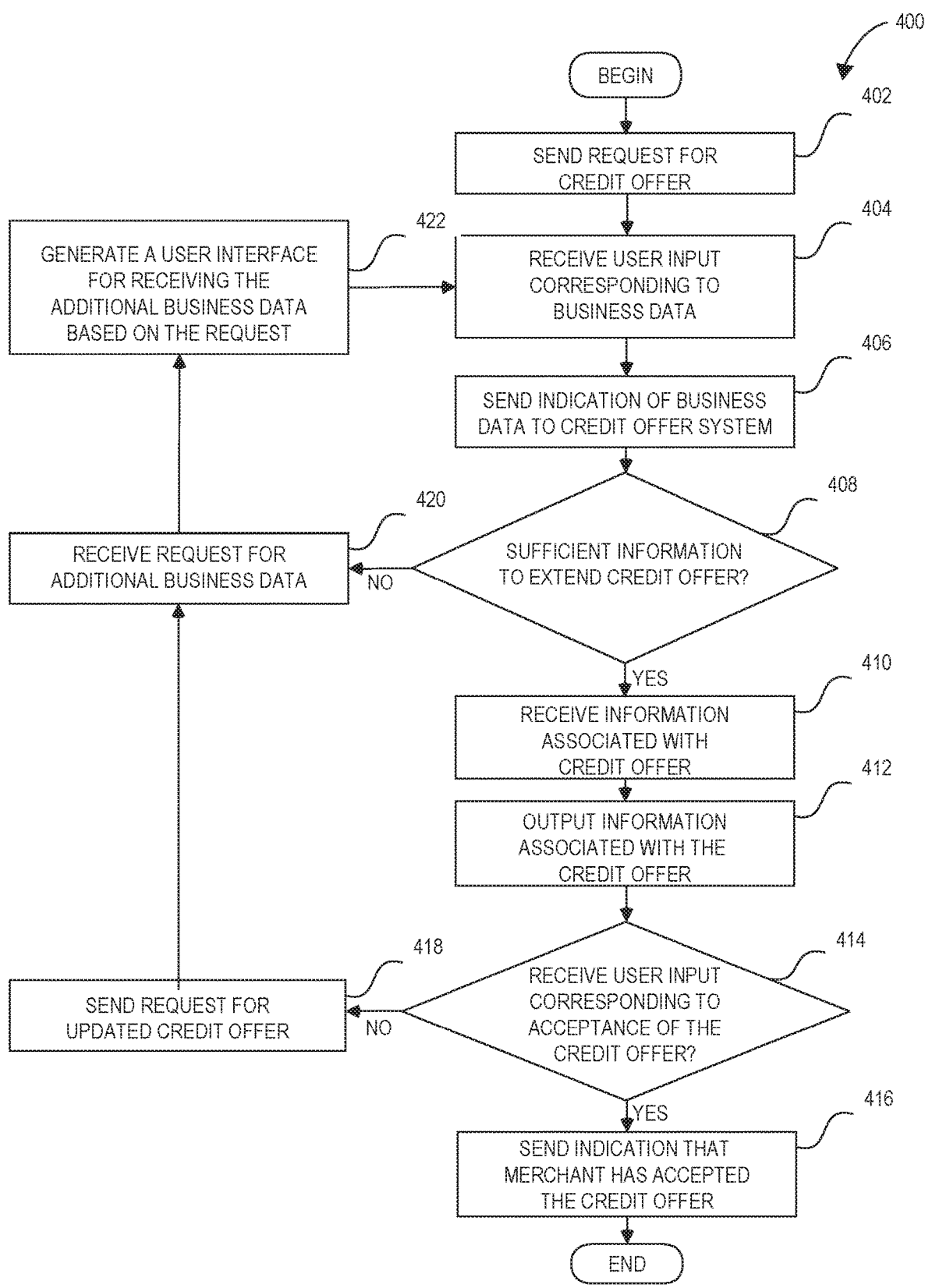
FIG. 4 illustrates a process for dynamically generating user interfaces based on requests for data, in accordance with one or more aspects of the present disclosure.

FIG. 4 illustrates a process for dynamically generating user interfaces by a computing device based on requests for data, in accordance with one or more aspects of the present disclosure. For purposes of illustration, the example operations of FIG. 4 are described below within the context of FIG. 1. As shown in FIG. 4, process 400 may begin at block 402 where computing device 102 associated with merchant 112 may send a request to credit offer system 104 for credit offer system 104 to make a credit offer to merchant 112. For example, computing device 102 may receive user input corresponding to an amount of the requested credit offer, and computing device 102 may send the request for the amount of the requested credit offer to credit offer system 104. In some implementations, the credit offer system 104 may target the specific merchant 112 with an invitation to offer data in lieu of receiving an explicit request for credit offers. Such invitations may be rendered in the form of advertisements, electronic messages, interstitials, etc., on a merchant device or an application executing on the merchant device.

Process 400 may proceed to block 404 where computing device 102 may receive user input corresponding to data associated with merchant 112 that may be provided to credit offer system 104 to determine whether to make the requested credit offer to merchant 112. In one example, the user input corresponding to the data associated with merchant 112 may include user input corresponding to uploading a copy of the data associated with merchant 112 to credit offer system 104. In another example, the user input corresponding to the data associated with merchant 112 may include user input corresponding to information for accessing the data associated with merchant 112 at a third-party data sources 108, such as authentication information for accessing the data associated with merchant 112 at a specific third-party data source out of third-party data sources 108.

Process 400 may proceed to block 406 where computing device 102 may, in response to receiving the user input corresponding to the data associated with merchant 112, send an indication of the data associated with merchant 112 as inputted by merchant 112 to credit offer system 104. In one example, if the user input corresponding to the data associated with merchant 112 includes user input corresponding to uploading a copy of the data associated with merchant 112 to credit offer system 104, computing device 102 may upload a copy of the data associated with merchant 112 to credit offer system 104 via network 110. In another example, if the user input corresponding to the data associated with merchant 112 includes user input corresponding to information for accessing the data associated with merchant 112 at a third-party data source, computing device 102 may send an indication of the information for accessing the data associated with merchant 112 at a third-party data source to credit offer system 104.

In response to receiving the indication of the data associated with merchant 112 from computing device 102, process 400 may proceed to block 408 where credit offer system 104 may determine whether it has sufficient information to determine whether merchant 112 qualifies for a credit offer. If credit offer system 104 determines that merchant 112 qualifies for a credit offer from credit offer system 104, credit offer system 104 may send information associated with the credit offer to computing device 102. Conversely, if credit offer system 104 determines that it does not have sufficient information to determine whether merchant 112 qualifies for a credit offer, it may send a request for additional data associated with merchant 112 to computing device 102.

If credit offer system 104 determines that it does not have sufficient information to determine whether merchant 112 qualifies for a credit offer, process 400 may proceed to block 420 where computing device 102 may receive a request for additional data associated with merchant 112. In response to receiving the request for additional data associated with merchant 112, process 400 may proceed to block 422 where computing device 102 may dynamically generate, in real-time, a user interface adapted to receive information for the additional data, and may output the generated user interface, such as for display at a display device.

In other words, computing device 102 may customize the user interface for receiving user input of information for the additional data based on the additional data that is requested by credit offer system 104. Because credit offer system 104 determines what kind of additional data to request based on the information it has already determined regarding merchant 112, the request for the additional data causes computing device 102 to dynamically generate a user interface that is customized to capture information regarding the specific additional data requested by credit offer system 104. Computing device 102 may customize elements of the user interface, such as user interface controls, the input fields, the appearance of the user interface, and the like, based on the additional data that is requested to output a user interface for capturing such additional data.

In response to generating and outputting the user interface adapted to receive information for the additional data associated with merchant 112, process 400 may proceed to block 404, where computing device 102 may receive user input corresponding to information for the additional data associated with merchant 112, and may proceed to block 404 to send an indication of the additional data to credit offer system 104. In some examples, if credit offer system 104 still does not have sufficient information to determine whether merchant 112 qualifies for a credit offer, it may request further business information from computing device 102, so that blocks 404, 406, 408, 420, and 422 may repeat until process 400 proceeds to block 410 when credit offer system 104 makes a credit offer to merchant 112 or until merchant 112 exits the credit offer process. In some cases, the credit offer system 104 may periodically or at random check the data associated with merchant 112, such as data regarding the transaction volume of merchant 112, to determine if the state of the credit offer request has changed, and if merchant 112 now qualifies for the credit offer. This checking of data may be performed without requesting additional data or waiting for another request from merchant 112 for a credit offer. Credit offer system 104 may send such information to computing device 102, and computing device 102 may output dashboard for display at a display device for merchant 112 to evaluate, reject, or approve the credit offer.

If credit offer system 104 determines that merchant 112 qualifies for a credit offer from credit offer system 104, process 400 may proceed to block 410 where computing device 102 may receive information associated with the credit offer, where the information associated with the credit offer indicates that the credit offer system 104 is extending the credit offer to merchant 112. In response to receiving the information associated with the credit offer, process 400 may proceed to block 412 where computing device 102 may output the information associated with the credit offer, such as the terms of the credit offer, and may output user interface controls with which merchant 112 may interact in order to accept or decline the credit offer.

Process 400 may proceed to block 414 where computing device 102 may receive user input that corresponds to either merchant 112 accepting the offer or merchant 112 declining the offer. If computing device 102 receives user input corresponding to accepting the credit offer, process 400 may proceed to block 416 where computing device 102 may send to credit offer system 104 an indication that merchant 112 has accepted the credit offer.

In some examples, merchant 112 may decline the credit offer, such as when the credit offer is for a smaller amount of money than the amount of money requested by merchant 112. Thus, when merchant 112 declines the credit offer, merchant 112 may request an updated credit offer from credit offer system 104. If computing device 102 receives user input corresponding to declining the credit offer, process 400 may proceed to block 418 to send a request for an updated credit offer to credit offer system 104.

To determine an updated credit offer, credit offer system 104 may request additional information from merchant 112 in order to determine whether to extend an updated credit offer to merchant 112. Thus, in response to sending a request for an updated credit offer to credit offer system 104, process 400 may proceed back to block 420 where computing device 102 may receive from credit offer system 104 a request for further data associated with merchant 112. Such further data may be data that has not previously been sent to credit offer system 104.

In response to receiving the request for further data associated with merchant 112, process 400 may proceed back to block 422 to dynamically generate and output a user interface for receiving information associated with the requested further data, where computing device 102 may customize the user interface based on the requested further data. Process 400 may proceed to block 404 to receive user input corresponding to the requested further data, and to block 406 to send an indication of the requested further data to credit offer system 104.

If credit offer system 104 determines, based at least in part on the further data, to make an updated credit offer to credit offer system 104 at block 408 of process 400, process 400 may proceed to block 410 where computing device 102 may receive information associated with the updated credit offer and to block 412 to output information associated with the updated credit offer. In response to outputting information associated with the updated credit offer, process 400 may proceed to block 414 where computing device 102 may receive user input that corresponds to either merchant 112 accepting the updated credit offer or merchant 112 declining the updated credit offer. If computing device 102 receives user input corresponding to accepting the updated credit offer, process 400 may proceed to block 416 where computing device 102 may send to credit offer system 104 an indication that merchant 112 has accepted the updated credit offer.

Example User Interfaces

Figure 5:
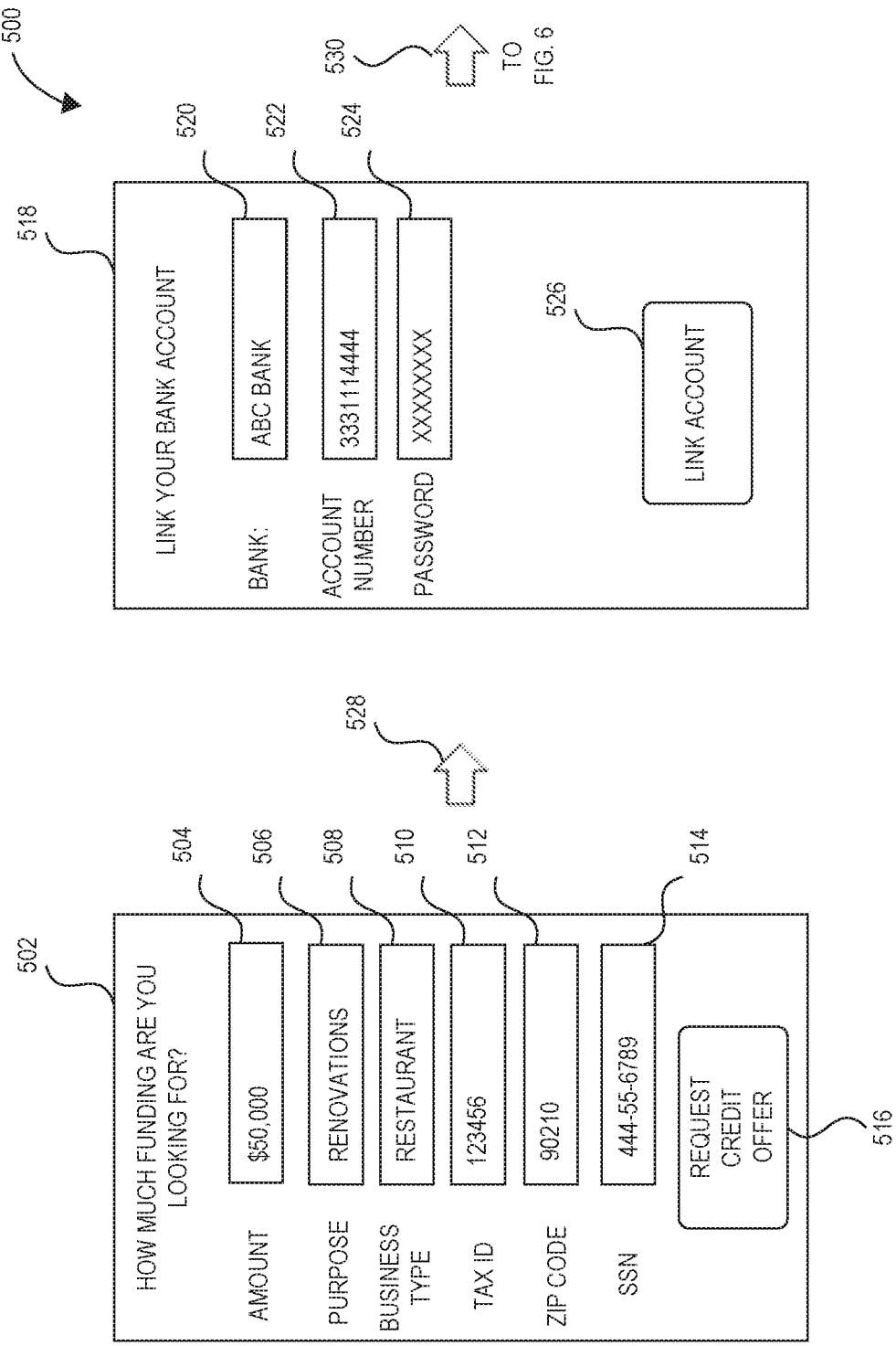
FIG. 5 illustrates techniques for requesting a credit offer from the credit offer system of FIG. 1 in accordance with one or more aspects of the present disclosure.

FIG. 5 illustrates techniques for requesting a credit offer from the credit offer system of FIG. 1, in accordance with one or more aspects of the present disclosure. FIG. 5 is described within the context of environment 100 shown in FIG. 1. As shown in FIG. 5, a computing device, such as computing device 102, may execute to present user interface 502 that is displayed by a display device operably coupled to the computing device. User interface 502 may act as an interface that enables a merchant, such as merchant 112, to request a credit offer from credit offer system 104. User interface 502 may include field 504 with which the merchant may interact, such as via an input device operably coupled to computing device 102, to, for example input an amount of credit to request from credit offer system 104. In addition to the amount of credit to request from credit offer system 104, user interface 502 may include additional fields 506-514 with which merchant may interact to provide input additional information regarding the merchant, such as the purpose of the credit offer request, the type of business the merchant is engaged in, the taxpayer identification of the merchant, the zip code of the location of the merchant's business, the merchant's social security number, and the like, which may be used by credit offer system 104 in determining whether to make a credit offer to the merchant In other examples, the merchant may enter any additional information regarding its business and how it plans on using any credit made by credit offer system 104, such as additional use cases (e.g., financing inventory or invoices) towards which the merchant intend to use the capital. In other examples, the merchant may input any other suitable identifying information, such as merchant classification code (MCC), revenue, earned income, merchant ecommerce website, and the like). User interface 502 may also include one or more interactive elements, such as button 516, with which the merchant may interact to confirm its request for the credit offer.

Once the merchant has requested a credit offer via interacting with user interface 502 and has provided the information as inputted into fields 504-514 of user interface 502, the computing device may transition 528 from presenting user interface 502 to presenting user interface 518, which may be a user interface for receiving information regarding a particular data associated with the merchant. In the example of FIG. 5, user interface 518 may be a user interface for receiving information regarding a bank account that is associated with the merchant. User interface 518 may include fields 520, 522, and 524 with which the merchant may interact to input the details associated with a bank account, such as the name of the bank, the account number for the merchant, and the password for the merchant. User interface 508 may also include one or more interactive elements, such as button 526 with which the merchant may interact to cause computing device 102 to send the inputted details associated with the bank account to credit offer system 104 and to transition 530 from user interface 518 to a user interface described in FIG. 6.

Figure 6:
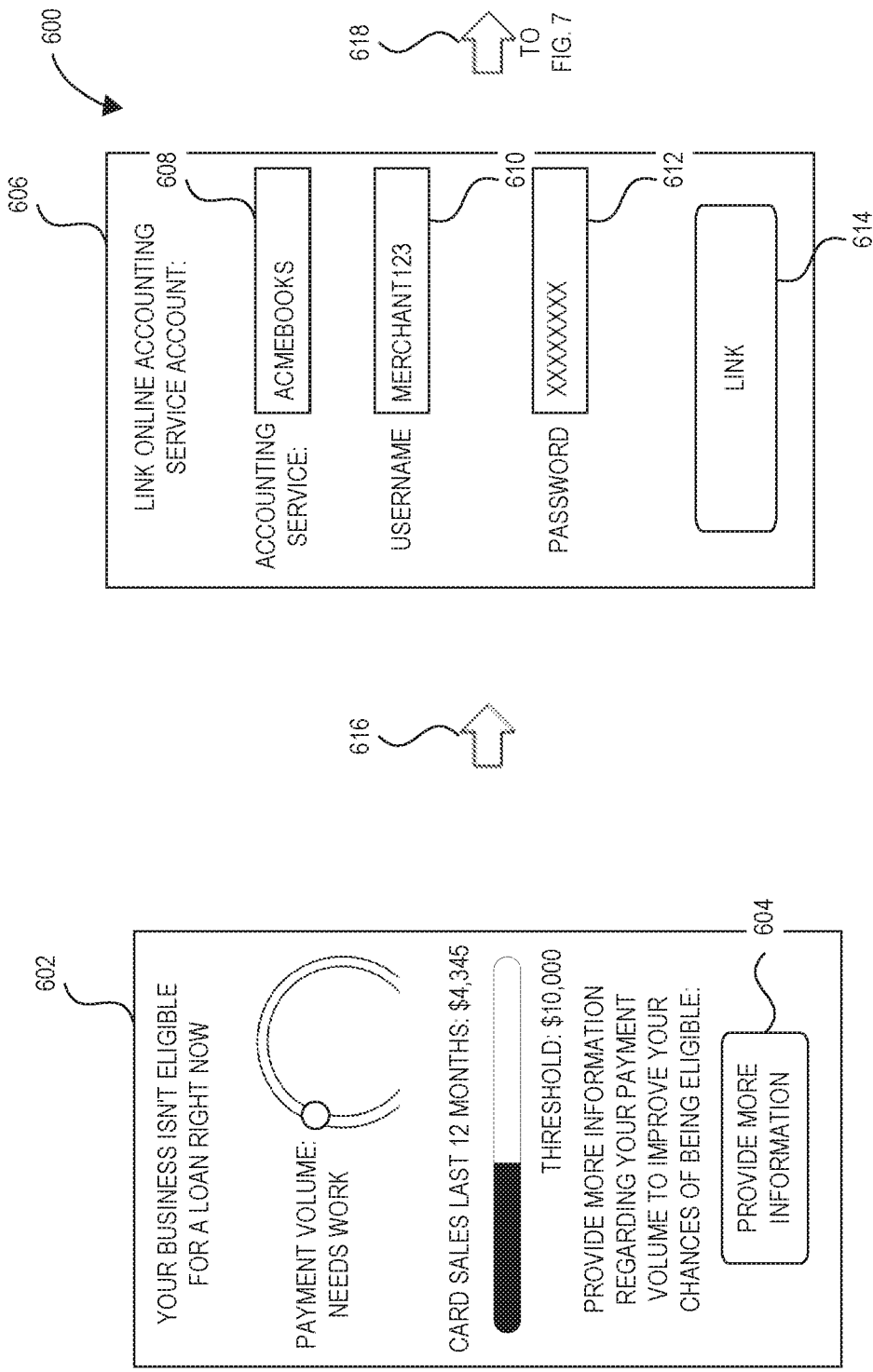
FIG. 6 illustrates techniques that continue from FIG. 5 for requesting a credit offer in accordance with one or more aspects of the present disclosure.

FIG. 6 illustrates techniques that continue from FIG. 5 for requesting a credit offer in accordance with one or more aspects of the present disclosure. FIG. 6 is described within the context of environment 100 shown in FIG. 1. Credit offer system 104 may determine, in response to receiving the information associated with the merchant's bank account as inputted into user interface 518 of FIG. 5, whether it is able to extend a credit offer to the merchant. For example, credit offer system 104 may use the information associated with the merchant's bank account to retrieve bank account statements associated with the merchant from the merchant's bank. Credit offer system 104 may analyze such bank account statements to determine information regarding the merchant that it may use to determine whether to extend a credit offer to the merchant.

One metric that credit offer system 104 may use in determining whether to extend a credit offer to the merchant may be the payment volume of the merchant, which may be the total amount of sales by the merchant in a given period of time, such as in the last 12 months. For example, credit offer system 104 may determine a threshold payment volume that the merchant has to meet in order to qualify for a credit offer from credit offer system 104. One example of such a threshold payment volume may be $10,000 in sales over the past 12 months. Credit offer system 104 may adaptively determine the threshold payment volume based on any suitable factor or factors, such as the type of business the merchant is operating, the location of the business, the amount of cash on hand by the merchant, the amount of debt that the merchant has, and the like.

In the example of FIG. 6, credit offer system 104 may determine, from the information provided by the merchant's bank account statements, that the total amount of credit card sales by the merchant in the last 12 months is $4,345, which is less than the threshold payment volume of $10,000. As such, credit offer system 104 may determine that it currently cannot make a credit offer to the merchant. Correspondingly, computing device 102 may transition from presenting user interface 518 to presenting user interface 602 shown in FIG. 6 to present such information so that the merchant is able to view the information credit offer system 104 has determined so far regarding the merchant, such as the payment volume of the merchant, the threshold payment volume that the merchant has to meet, as well as a prompt to provide additional information that may enable credit offer system 104 to update its determination of the merchant's payment volume. User interface 602 may also include an interactive element such as button 604 that the merchant may select to provide additional information regarding its payment volume that is not currently reflected in the total amount of credit card sales determined by credit offer system 104 based on the merchant's bank account statements.

While credit offer system 104 was able to determine the volume of credit card sales based on the information provided by the merchant's bank accounts, the credit offer system 104 may have other sources of payment volume that is not accounted for from the information provided by the merchant's bank account statements. As such, based on its determination that the information provided by the merchant's bank account statements do not indicate that the merchant has sufficient payment volume to qualify for a credit offer, credit offer system 104 may determine which other pieces of data associated with the merchant may be able to provide information regarding additional payment volume for the merchant that is not reflected in the information provided by the merchant's bank account statements.

For example, if credit offer system 104 determines that the merchant's bank account statements do not include information regarding every payment received by the merchant, credit offer system 104 may determine which additional sources of information regarding the merchant may provide more complete information regarding payments received by the merchant. For example, credit offer system 104 may determine that since it does not have any information regarding accounting statements associated with the merchant, credit offer system 104 may determine to send a request to the computing device used by the merchant for information regarding accounting statements associated with the merchant.

The computing device may receive the request for information regarding accounting statements associated with the merchant and may, in response, dynamically generate a user interface for receiving user input corresponding to information regarding accounting statements associated with the user. In the example of FIG. 6, in response to the user providing user input to select an interactive element (e.g., button 604) to indicate that the merchant would like to provide additional information in order to qualify for a credit offer, and in response to receiving the request for information regarding accounting statements associated with the merchant, the computing device may transition 616 from presenting user interface 602 to presenting user interface 606, where user interface 606 is dynamically generated by the computing device for receiving user input corresponding to information regarding accounting statements associated with the user.

As shown in FIG. 6, user interface 606 is dynamically generated by the computing device based on the request it received from credit offer system 104 for information regarding accounting statements associated with the merchant. In particular, user interface 606 may be dynamically generated and customized by the computing device to include specific interactive elements for capturing information that is specifically to enable credit offer system 104 to access accounting statements associated with the merchant at an online accounting service. Thus, for example, user interface 606 may include fields 608-612 with which the merchant may interact to provide input corresponding to information regarding the merchant's account with an online accounting service, so that credit offer system 104 may be able to use such information to access accounting statements associated with the merchant.

The merchant may interact with interactive elements included in user interface 606, such as button 614, to send the information it has inputted for accessing accounting statements associated with the merchant at an online accounting service to credit offer system 104. Credit offer system 104 may receive the information from the computing device and may use the information to access accounting statements associated with the merchant from an online accounting service. The merchant may analyze the accounting statements associated with the merchant to derive additional information regarding the merchant, such as additional information regarding the payment volume of the merchant's business. For example, credit offer system 104 may determine from the accounting statements that the merchant's business has additional payment volume not reflected in the merchant's bank account statements, and that the total payment volume for the merchant's business exceeds the payment volume threshold. As such, credit offer system 104 may determine it has sufficient information to make a credit offer to the merchant, and may send information associated with the credit offer to the computing device and to transition 618 from user interface 606 to a user interface described in FIG. 7.

Figure 7:
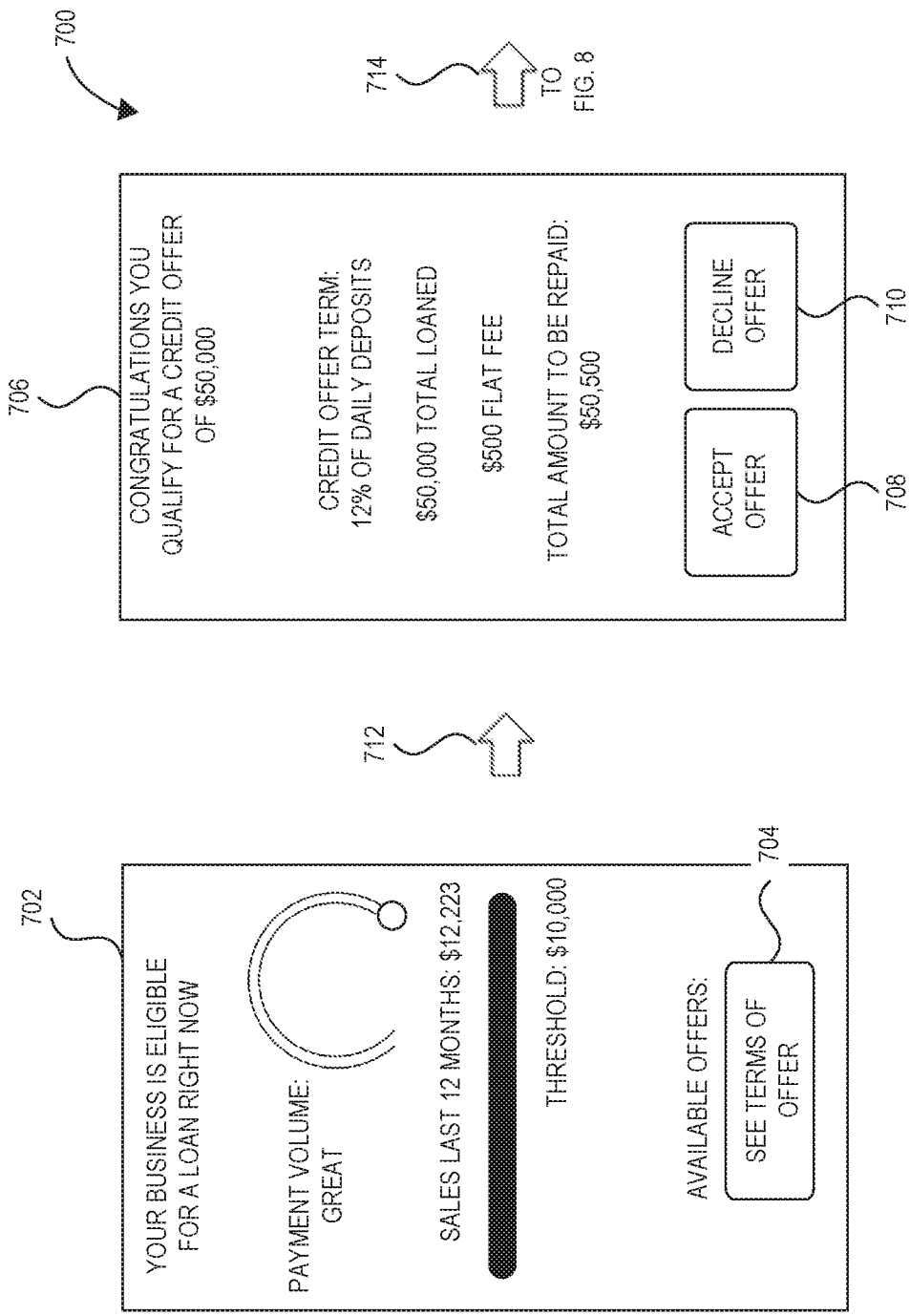
FIG. 7 illustrates techniques that continue from FIG. 6 for requesting a credit offer in accordance with one or more aspects of the present disclosure.

FIG. 7 illustrates techniques that continue from FIG. 6 for requesting a credit offer in accordance with one or more aspects of the present disclosure. FIG. 7 is described within the context of environment 100 shown in FIG. 1. As shown in FIG. 7, when the computing device receives the information associated with the credit offer from credit offer system 104, the computing device may transition from presenting user interface 606 to presenting user interface 702. User interface 702 may include information indicating that the merchant is eligible for a credit offer from credit offer system 104, and may also include additional information regarding the merchant that has been determined by the credit offer system 104, such as the payment volume of $12,223 for the merchant's business over the last 12 months, which exceeds the payment volume threshold of $10,000. User interface 702 may also include interactive elements, such as button 704, which the merchant may provide user input to select in order to view the terms of the credit offer.

In response to receiving user input from the merchant that selects button 704 to view the terms of the credit offer, the computing device may transition 712 from presenting user interface 702 to presenting user interface 706 that includes the terms of the credit offer, such the amount of the credit offer, the origination fee for the credit offer, the percentage of daily deposits by the merchant that will be sent to credit offer system 104 to repay the offer, the total amount of money to be repaid, and the like. User interface 706 may also include interactive elements, such as buttons 708 and 710, which the merchant may provide user input to select in order to accept the terms of the credit offer or to decline the terms of the credit offer.

If the merchant provides user input to select button 710 to decline the terms of the credit offer, the computing device may send to credit offer system 104 an indication that the merchant has declined the terms of the credit offer. In response to receiving the indication that the merchant has declined the terms of the credit offer, credit offer system 104 may determine, based at least in part on the information it currently has determined regarding the merchant, whether there are any additional information that the merchant may be able to provide that may enable credit offer system 104 to extend a credit offer with better terms to the merchant.

For example, credit offer system 104 may determine that, based on its current determination of the amount of payment volume of the merchant's business, it cannot extend a credit offer with better terms until it is able to determine an increase in the payment volume of the merchant's business. Thus, credit offer system 104 may determine whether there is any additional information that it may request from the merchant that may enable credit offer system 104 to determine an increase in the payment volume of the merchant's business. Based on such a determination, credit offer system 104 may determine that the merchant's federal tax returns may include additional information regarding the payment volume of the merchant's business. As such, credit offer system 104 may send to the computing device a request for information regarding the merchant's federal tax returns and to transition 714 from user interface 706 to a user interface described in FIG. 8.

Figure 8:
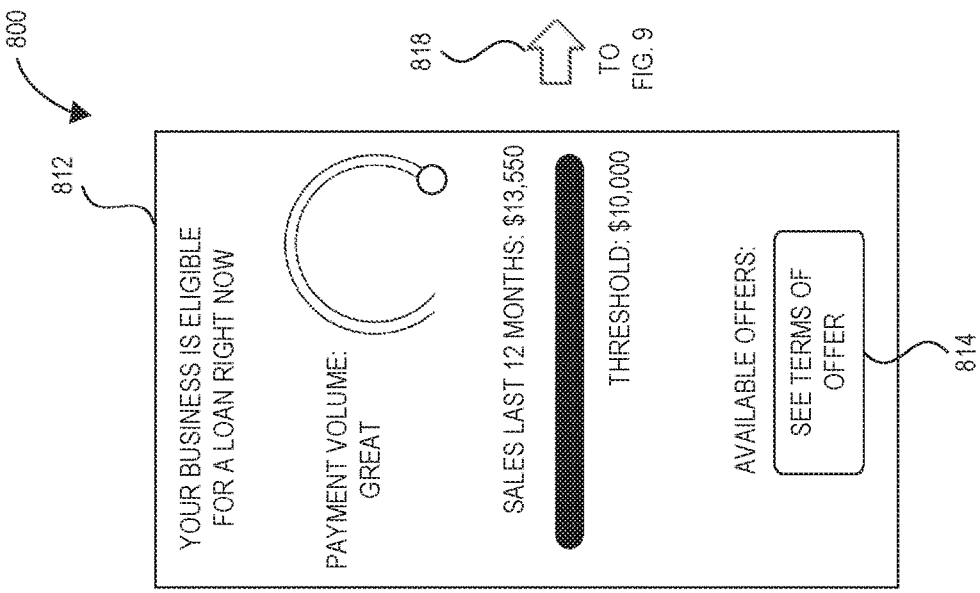
FIG. 8 illustrates techniques that continue from FIG. 7 for requesting a credit offer in accordance with one or more aspects of the present disclosure.
Figure 8:
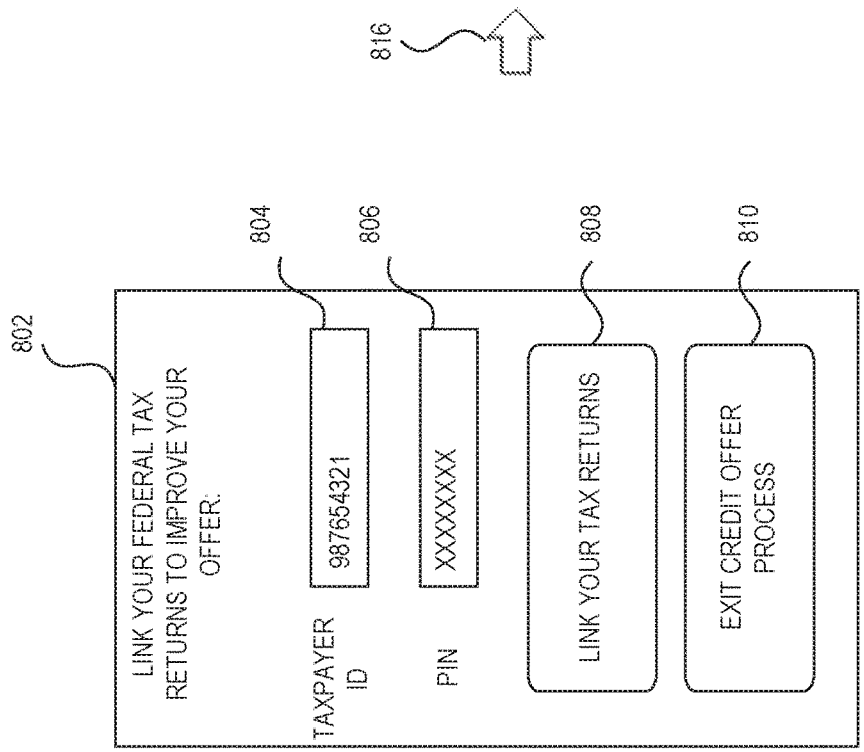

FIG. 8 illustrates techniques that continue from FIG. 7 for requesting a credit offer in accordance with one or more aspects of the present disclosure. FIG. 8 is described within the context of environment 100 shown in FIG. 1. As shown in FIG. 8, when the computing device receives the request for information regarding the merchant's federal tax returns from credit offer system 104, the computing device may transition from presenting user interface 802 to presenting user interface 802. The computing device may dynamically generate user interface 802 based on the request it received from credit offer system 104 for the merchant's federal tax returns, so that user interface 802 may include fields 804 and 806 for receiving input from the merchant that provides information for accessing the merchant's federal tax returns from the Internal Revenue Service.

The user interface 802 may also include interactive elements, such as buttons 808 and 810, which the merchant may interact with to either submit the information for accessing the merchant's federal tax returns to credit offer system 104 or to exit the credit offer process. If the merchant provides user input to select button 810 to exit the credit offer process, the computing device may exit the merchant from the credit offer process. When the merchant exits from the credit offer process, credit offer system 104 may nonetheless save the information it currently has determined regarding the merchant, so that the merchant may return to the credit offer process at a later time and be able to pick up from where the merchant left off in the process. On the other hand, if the merchant provides user input to select button 808, the computing device may proceed to submit the information for accessing the merchant's federal tax returns, as inputted into fields 804 and 806, to credit offer system 104.

Credit offer system 104 may receive the information from the computing device for accessing the merchant's federal tax returns and may use such information to access the merchant's federal tax returns from the Internal Revenue Service. The merchant may analyze the merchant's federal tax returns to derive additional information regarding the merchant, such as additional information regarding the payment volume of the merchant's business. For example, credit offer system 104 may determine from the merchant's federal tax returns that the merchant's business has additional payment volume not reflected in the merchant's bank account statements and the merchant's accounting statements, and that the total payment volume for the merchant's business is even greater than it had previously determined. As such, credit offer system 104 may determine it has sufficient information to make an updated credit offer to the merchant, and may send information associated with the updated credit offer to the computing device.

As shown in FIG. 8, when the computing device receives the information associated with the updated credit offer from credit offer system 104, the computing device may transition 816 from presenting user interface 802 to presenting user interface 812. User interface 812 may include information indicating that the merchant is eligible for an updated credit offer from credit offer system 104, and may also include updated information regarding the merchant that has been determined by the credit offer system 104, such as the updated payment volume of $13,550 for the merchant's business over the last 12 months, which exceeds the payment volume threshold of $10,000. User interface 812 may also include interactive elements, such as button 814, which the merchant may provide user input to select in order to view the terms of the updated credit offer and to transition 818 from user interface 812 to a user interface described in FIG. 9.

Figure 9:
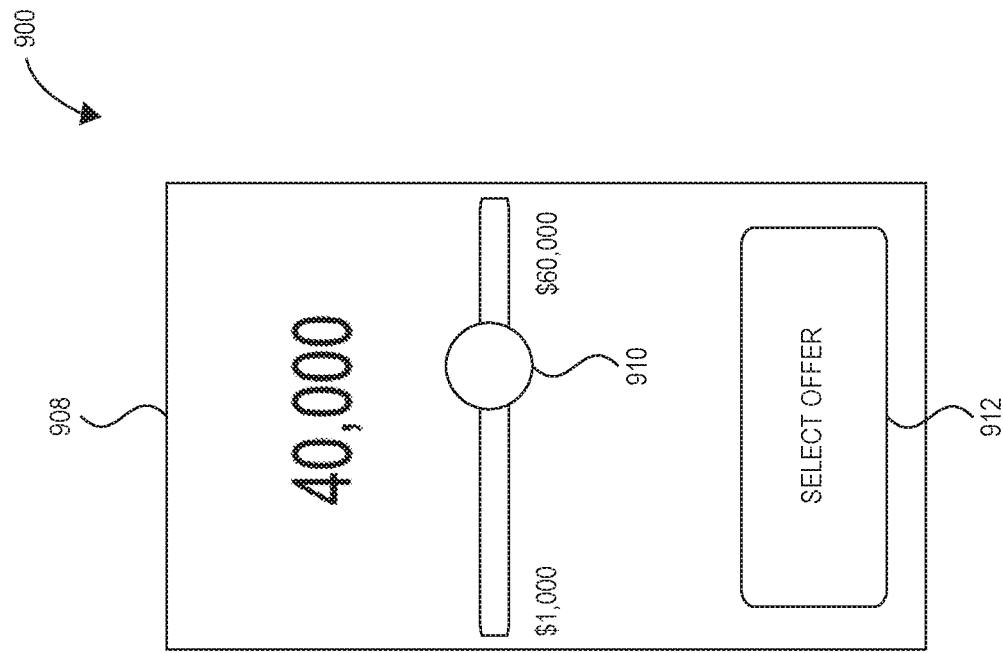
FIG. 9 illustrates techniques that continue from FIG. 8 for requesting a credit offer in accordance with one or more aspects of the present disclosure.
Figure 9:
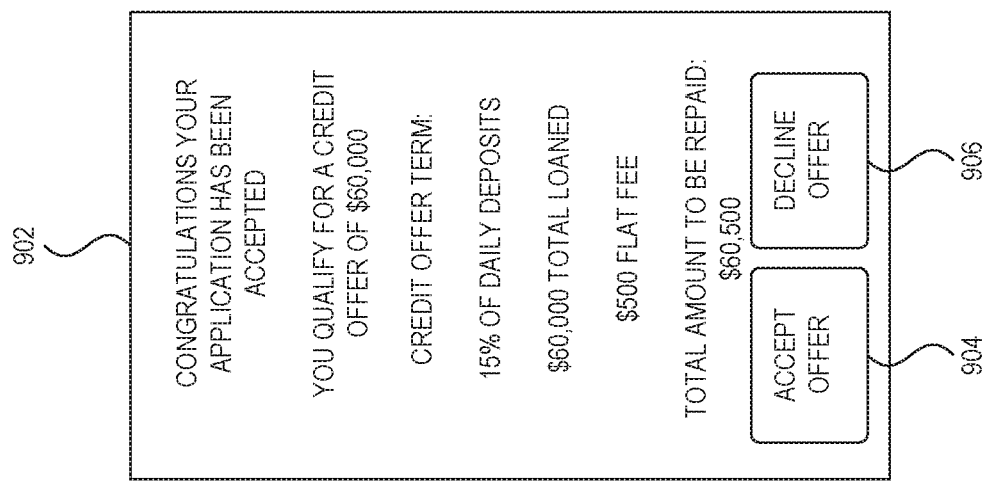

FIG. 9 illustrates techniques that continue from FIG. 8 for requesting a credit offer in accordance with one or more aspects of the present disclosure. FIG. 9 is described within the context of environment 100 shown in FIG. 1. When the merchant provides user input at user interface 812 to select in order to view the terms of the updated credit offer, the computing device may transition from presenting user interface 812 to presenting user interface 902 that includes the terms of the updated credit offer, such the amount of the updated credit offer, the origination fee for the updated credit offer, the percentage of daily deposits by the merchant that will be sent to credit offer system 104 to repay the updated credit offer, the total amount of money to be repaid, and the like. User interface 902 may also include interactive elements, such as buttons 904 and 906, which the merchant may provide user input to select in order to accept the terms of the credit offer or to decline the terms of the credit offer.

If the merchant provides user input to select button 906 to accept the updated credit offer, the computing device may transition 914 from presenting user interface 902 to presenting user interface 908 that enables the merchant to determine how much money to borrow from credit offer system 104. For example, if the updated credit offer to the merchant enables the merchant to borrow up to $60,000, the merchant may choose to borrow any amount of money between $1,000 and $60,000. Thus, user interface 908 may include interactive element 910 that the merchant may use to select the amount of money it currently wants to borrow. User interface 908 may also include an interactive element, such as button 912, that the merchant may provide user input to select to confirm the amount of money that it has selected to borrow. In response to receiving user input to select button 912, the computing device 102 may send a confirmation of the amount of money that the merchant is borrowing to credit offer system 104.

Figure 10:
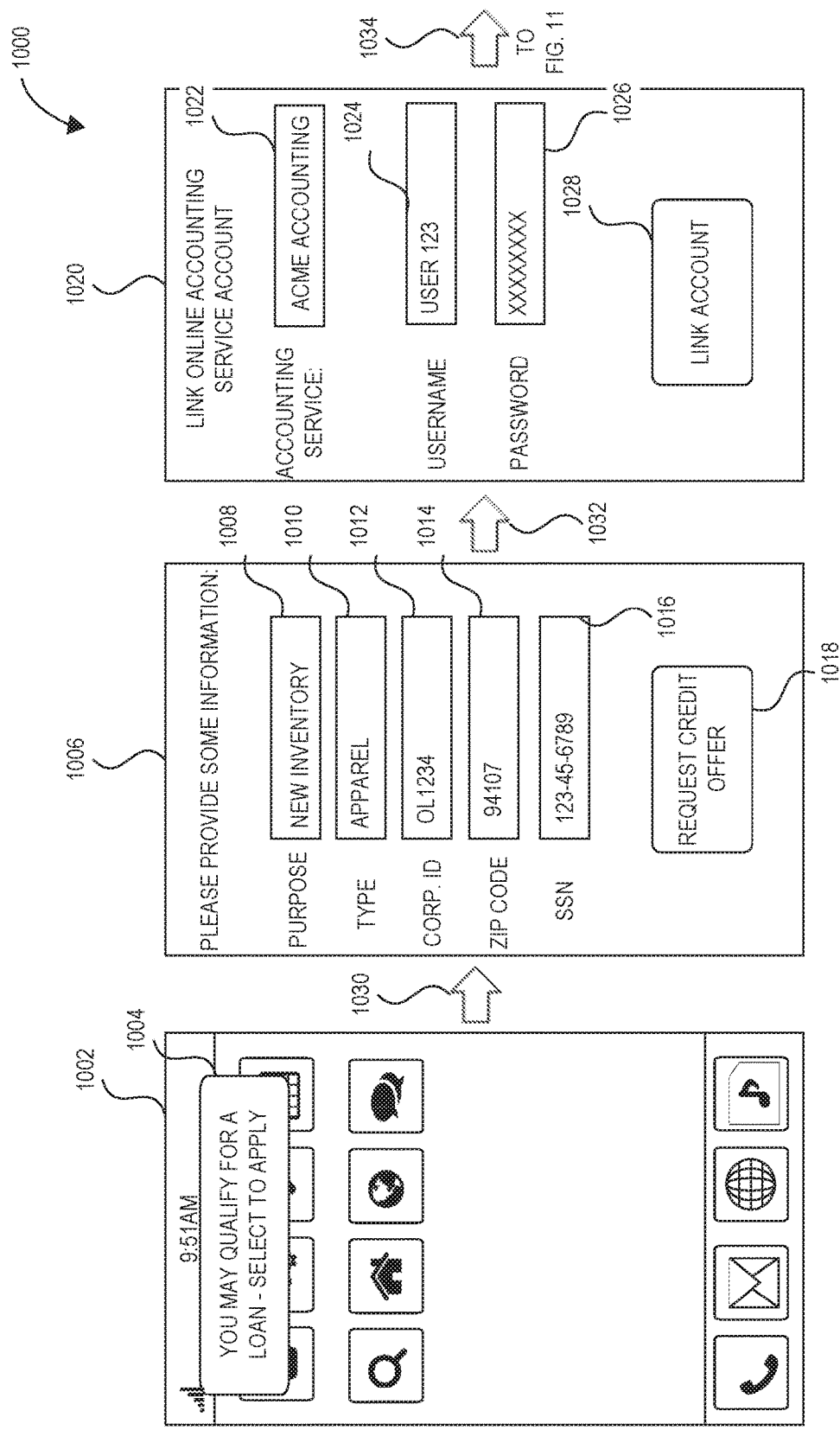
FIG. 10 illustrates additional techniques for requesting a credit offer from the credit offer system of FIG. 1 in accordance with one or more aspects of the present disclosure.

The techniques for requesting a credit offer from credit offer system 104 may differ for different merchants because different merchants may differ in location, types of business, revenue, debts, and the like. As such, FIG. 10 illustrates additional techniques for requesting a credit offer from the credit offer system of FIG. 1, in accordance with one or more aspects of the present disclosure. FIG. 10 is described within the context of environment 100 shown in FIG. 1.

In some examples, a merchant, such as merchant 112 shown in FIG. 1, may be prompted to apply for a credit offer by a computing device, such as computing device 102, being used by the merchant. For example, as the merchant uses the computing device, the merchant may encounter advertisements, notifications, and the like prompting the merchant to apply for a credit offer from credit offer system 104 without having browsed to a web page associated with credit offer system 104 and without having launched an app that is associated with credit offer system 104. As shown in FIG. 1, a computing device, such as computing device 102, may execute to present user interface 1002 that is displayed by a display device operably coupled to the computing device. User interface 1002 may act as an interface with which a merchant, such as merchant 112, may interact to provide input. In the example of FIG. 1, while the computing device outputs user interface 1002 that is a home screen for the computing device, the computing device may present notification 1004 in user interface 1002 that prompts the merchant using the computing device to apply for a credit offer with credit offer system 104. The merchant may provide user input to select notification 1004 to begin the process of applying for a credit offer from credit offer system 104.

In response to receiving user input from the merchant selecting notification 1004, the computing device may launch or switch to a web page associated with credit offer system 104 or an app that is associated with credit offer system 104, and may transition 1030 from presenting user interface 1002 to user interface 1006.

User interface 1006 may include fields 1008-1016 with which merchant may interact to provide information regarding the merchant, such as the purpose of the credit offer request, the type of business the merchant is engaged in, the corporate identifier for the merchant, the zip code of the location of the merchant's business, the merchant's social security number, and the like, which may be used by credit offer system 104 in determining whether to make a credit offer to the merchant. User interface 1006 may also include one or more interactive elements, such as button 1018, with which the merchant may interact to confirm its request for the credit offer.

Once the merchant has requested a credit offer via interacting with user interface 1006 and has provided the information as inputted into fields 1008-1016 of user interface 1006, computing device 102 may transition 1032 from presenting user interface 1006 to presenting user interface 1020, which may be a user interface for receiving information regarding a particular data associated with the merchant. In the example of FIG. 10, user interface 1020 may be a user interface for receiving information regarding an online accounting service that is associated with the merchant, so that credit offer system 104 may be able to access accounting statements for the merchant via the online accounting service. User interface 1020 may include fields 1022, 1024, and 1026 with which the merchant may interact to input the details associated with an online accounting service, such as the name of the online accounting service, the username for the merchant in the online accounting service, and the password for the merchant in the online accounting service. User interface 1020 may also include one or more interactive elements, such as button 1028 with which the merchant may interact to cause the computing device to send the inputted details associated with the online accounting service account of the merchant to credit offer system 104 and to transition 1034 from user interface 1020 to a user interface described in FIG. 11.

Figure 11:
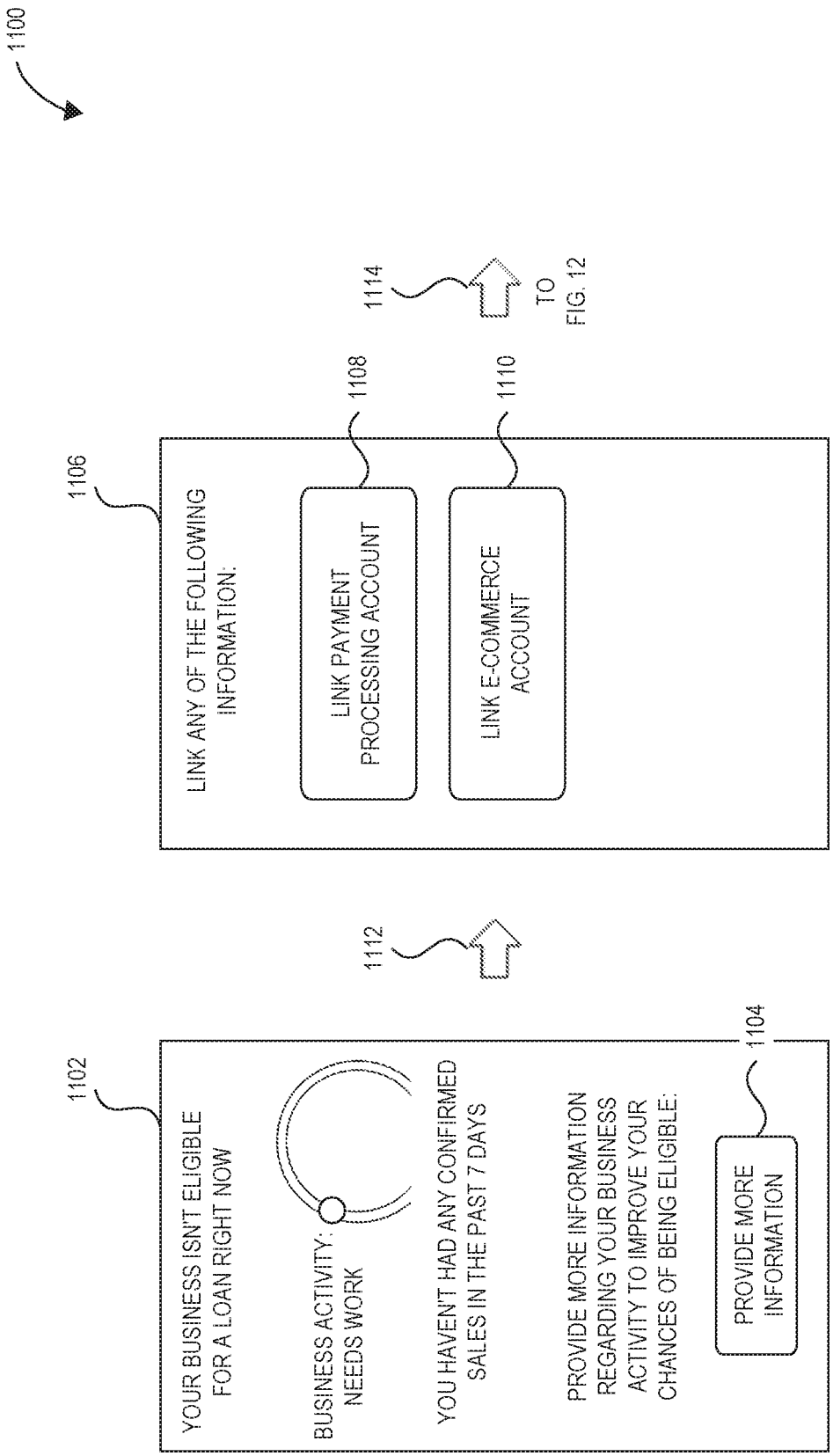
FIG. 11 illustrates techniques that continue from FIG. 10 for requesting a credit offer in accordance with one or more aspects of the present disclosure.

FIG. 11 illustrates techniques that continue from FIG. 10 for requesting a credit offer in accordance with one or more aspects of the present disclosure. FIG. 11 is described within the context of environment 100 shown in FIG. 1. Credit offer system 104 may determine, in response to receiving the information associated with the merchant's online accounting service account as inputted into user interface 1020 of FIG. 10, whether it has sufficient information regarding the merchant to extend a credit offer to the merchant. For example, credit offer system 104 may use the information associated with the merchant's online accounting service account to retrieve accounting statements associated with the merchant from the merchant's online accounting service. Credit offer system 104 may analyze such accounting statements to determine information regarding the merchant that it may use to determine whether to extend a credit offer to the merchant.

One metric that credit offer system 104 may use in determining whether to extend a credit offer to the merchant may be the business activity of the merchant, which may be the total number of sales by the merchant in a given period of time, such as in the last 7 days. For example, credit offer system 104 may determine the number of days in which the merchant has made a sale out of the last 7 days, and may determine whether the number of days in which the merchant has made a sale out of the last 7 days meets or exceeds a threshold business activity value. For example, if credit offer system 104 determines a threshold business activity value of 4 days of sales in the last 7 days, the credit offer system 104 may determine that a merchant has sufficient business activity for the purposes of extending a credit offer to the merchant if the merchant's business activity in the last 7 days meets or exceeds 4 days of sales. Credit offer system 104 may adaptively determine the threshold business activity value based on any suitable factor or factors, such as the type of business the merchant is operating, the location of the business, the amount of cash on hand by the merchant, the amount of debt that the merchant has, and the like.

In the example of FIG. 11, credit offer system 104 may not be able to confirm whether the merchant has made any sales in the past 7 days. For example, while the accounting statements for the merchant may indicate that it had sales in each of the last 7 days, credit offer system 104 may treat the information in the accounting statements with a relatively low level of confidence because accounting statements may be created and edited by the merchant themselves, as opposed to information from bank statements and the like where the merchant may not be able to edit the information from bank statements retrieved directly from the bank. As such, credit offer system 104 may determine that it currently does not have sufficient information regarding the merchant to make a credit offer to the merchant.

Correspondingly, the computing device may transition from presenting user interface 1020 to presenting user interface 1102 shown in FIG. 1102 to present an indication that credit offer system 104 cannot confirm the merchant's business activity for the past 7 days. User interface 1102 may also include an interactive element such as button 1104 that the merchant may select to provide additional information that may be able to confirm the business activity of the merchant for the past 7 days.

Because credit offer system 104 is unable to confirm the merchant's business activity, credit offer system 104 may determine additional data regarding the merchant that may contain information that could confirm the merchant's business activity. For example, credit offer system 104 may determine, from the merchant's accounting statements, that the merchant is receiving money from a payment processing service and from an electronic commerce (e-commerce) platform service, each of which may potentially be able to provide credit offer system 104 with additional information regarding the merchant's business activity. As such, credit offer system 104 may send a request to the computing device used by the merchant for information regarding either the payment processing service used by the merchant or the e-commerce platform service used by the merchant.

The computing device may receive the request for information regarding either the payment processing service used by the merchant or the e-commerce platform service used by the merchant and may, in response, dynamically generate a user interface for receiving user input corresponding to information regarding either the payment processing service used by the merchant or the e-commerce platform service used by the merchant. In the example of FIG. 11, in response to the user providing user input to select an interactive element (e.g., button 1104) in user interface 1102 to indicate that the merchant would like to provide additional information in order to qualify for a credit offer, and in response to receiving the request for information regarding either the payment processing service used by the merchant or the e-commerce platform service used by the merchant, the computing device may transition 1112 from presenting user interface 1102 to presenting user interface 1106.

User interface 1106 may be dynamically generated by the computing device to enable the merchant to provide user input to select whether to provide information regarding the payment processing service used by the merchant or the e-commerce platform service used by the merchant. In particular, user interface 1106 may include user interface elements, such as buttons 1108 and 1110, for selecting whether to provide information regarding the payment processing service used by the merchant or to provide the e-commerce platform service used by the merchant. User interface 1106 is dynamically generated by the computing device because the elements within user interface 1106, such as buttons 1108 and 1110, are included in user interface 1106 in accordance with the request received from credit offer system 104 for information regarding either the payment processing service used by the merchant or the e-commerce platform service used by the merchant.

If the computing device receives user input from the merchant selecting button 1108, the computing device may proceed to allow the merchant to input information regarding payment processing service used by the merchant. Conversely, if the computing device receives user input from the merchant selecting button 1110, the computing device may proceed to allow the merchant to input information regarding the e-commerce platform used by the merchant and to transition 1114 from user interface 1106 to a user interface described in FIG. 12.

Figure 12:
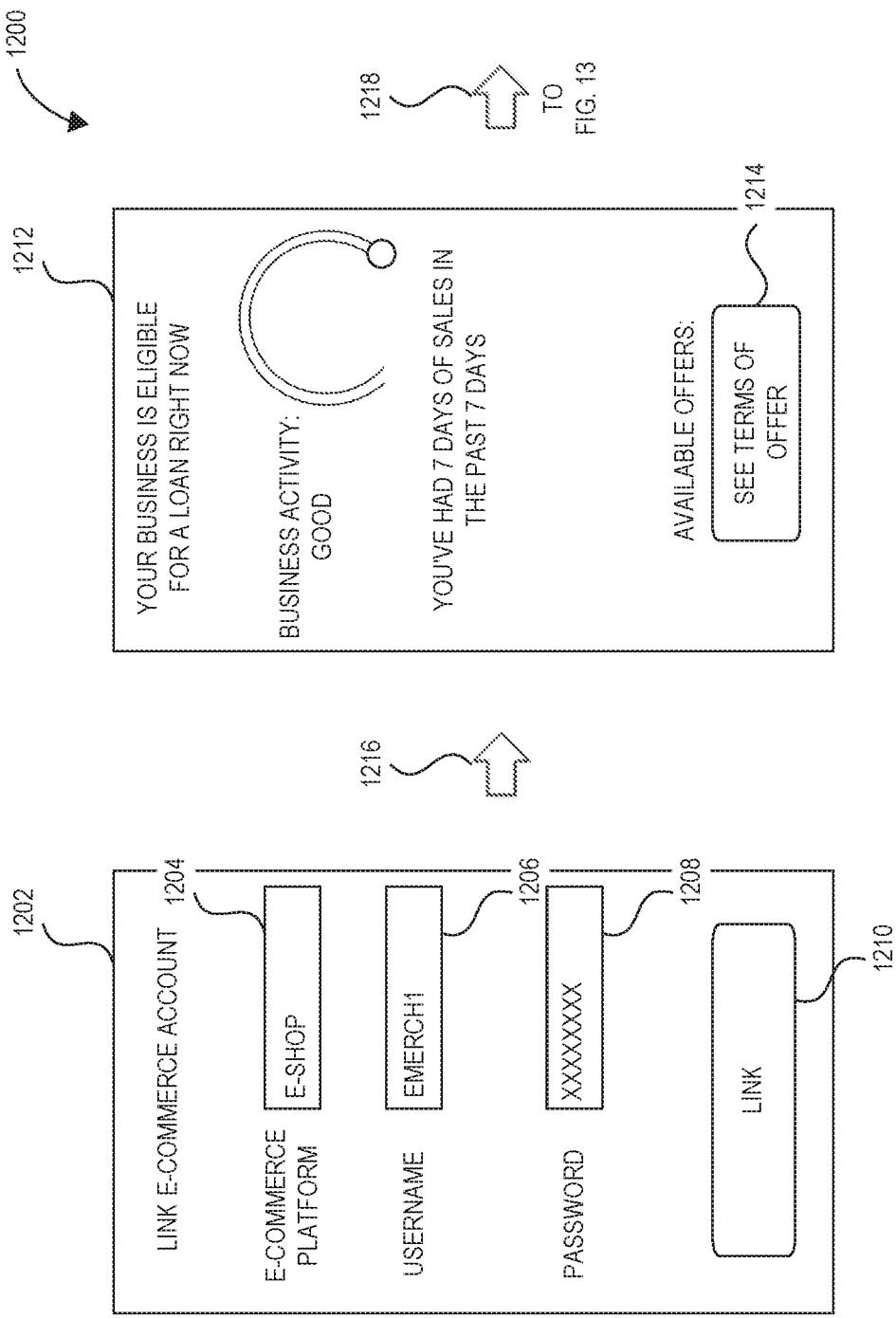
FIG. 12 illustrates techniques that continue from FIG. 11 for requesting a credit offer in accordance with one or more aspects of the present disclosure.

FIG. 12 illustrates techniques that continue from FIG. 11 for requesting a credit offer in accordance with one or more aspects of the present disclosure. FIG. 12 is described within the context of environment 100 shown in FIG. 1. As shown in FIG. 12, if the computing device receives user input from the merchant selecting button 1110 in user interface 1106, the computing device may proceed to transition from presenting user interface 1106 shown in FIG. 11 to presenting user interface 1202, which includes fields 1204-1208 with which the merchant may interact to provide user input regarding information for accessing the e-commerce platform service used by the merchant. For example, the merchant may provide user input regarding the identity of the specific e-commerce platform service used by the merchant and the merchant's login information (e.g., username and password) for the specific e-commerce platform service.

User interface 1202 also includes a user interface element, such as button 1210, that the merchant may interact with to select to submit the information the merchant has provided regarding the e-commerce platform service it uses to credit offer system 104. Credit offer system 104 may use the information provided by the merchant to access information regarding the merchant from the e-commerce platform service used by the merchant. In particular, credit offer system 104 may access the information from the e-commerce platform service to determine the merchant's business activity from the accessed information, and may reconcile the merchant's business activity as determined from the accessed information with the merchant's business activity that was previously determined from the merchant's accounting statements. By comparing and reconciling such information regarding the merchant's business activity from different third-party data sources, credit offer system 104 may be able to more reliably confirm the merchant's business activity compared with determining the merchant's business activity from a single source.

In this way, credit offer system 104 may determine that the merchant has sufficient business activity for the purposes of extending a credit offer to the merchant because the merchant had 7 days of sales in the last 7 days. Credit offer system 104 may determine a credit offer to extend to the merchant and may send information regarding the credit offer to the computing device.

In response to receiving the information regarding the credit offer from credit offer system 104, the computing device may transition 1216 from presenting user interface 1202 to presenting user interface 1212. User interface 1212 may include information indicating that the merchant is eligible for a credit offer from credit offer system 104, and may also include additional information regarding the merchant that has been determined by the credit offer system 104, such as the amount of business activity by the merchant in the past 7 days. User interface 1212 may also include interactive elements, such as button 1214, which the merchant may provide user input to select in order to view the terms of the credit offer and to transition 1218 from user interface 1212 to a user interface described in FIG. 13.

Figure 13:
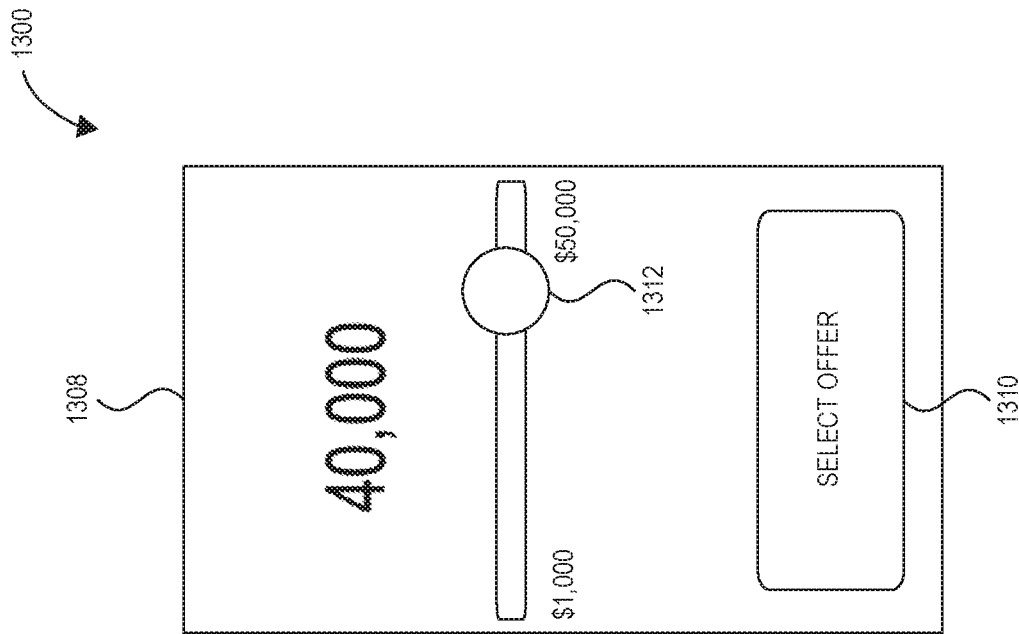
FIG. 13 illustrates techniques that continue from FIG. 12 for requesting a credit offer in accordance with one or more aspects of the present disclosure.
Figure 13:
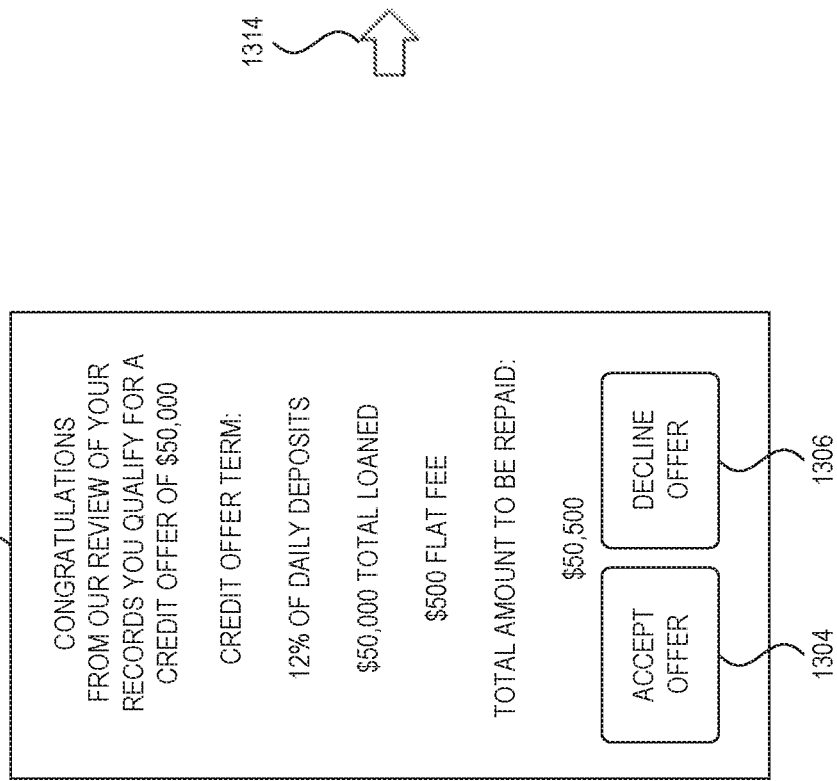

FIG. 13 illustrates techniques that continue from FIG. 12 for requesting a credit offer in accordance with one or more aspects of the present disclosure. FIG. 13 is described within the context of environment 100 shown in FIG. 1. As shown in FIG. 13 in response to receiving user input from the merchant that selects button 1214 in user interface 1212 to view the terms of the credit offer, the computing device may transition from presenting user interface 1212 to presenting user interface 1302 that includes the terms of the credit offer, such the amount of the credit offer, the origination fee for the credit offer, the percentage of daily deposits by the merchant that will be sent to credit offer system 104 to repay the offer, the total amount of money to be repaid, and the like. User interface 1302 may also include interactive elements, such as buttons 1304 and 1306, which the merchant may provide user input to select in order to accept the terms of the credit offer or to decline the terms of the credit offer.

If the merchant provides user input to select button 1306 to accept the credit offer, the computing device may transition 1314 from presenting user interface 1302 to presenting user interface 1308 that enables the merchant to determine how much money to borrow from credit offer system 104. For example, if the credit offer to the merchant enables the merchant to borrow up to $50,000, the merchant may choose to borrow any amount of money between $1,000 and $50,000. Thus, user interface 1308 may include interactive element 1312 that the merchant may use to select the amount of money it currently wants to borrow. User interface 1308 may also include an interactive element, such as button 1310, that the merchant may provide user input to select to confirm the amount of money that it has selected to borrow. In response to receiving user input to select button 1310, the computing device may send a confirmation of the amount of money that the merchant is borrowing to credit offer system 104.

Figure 14:
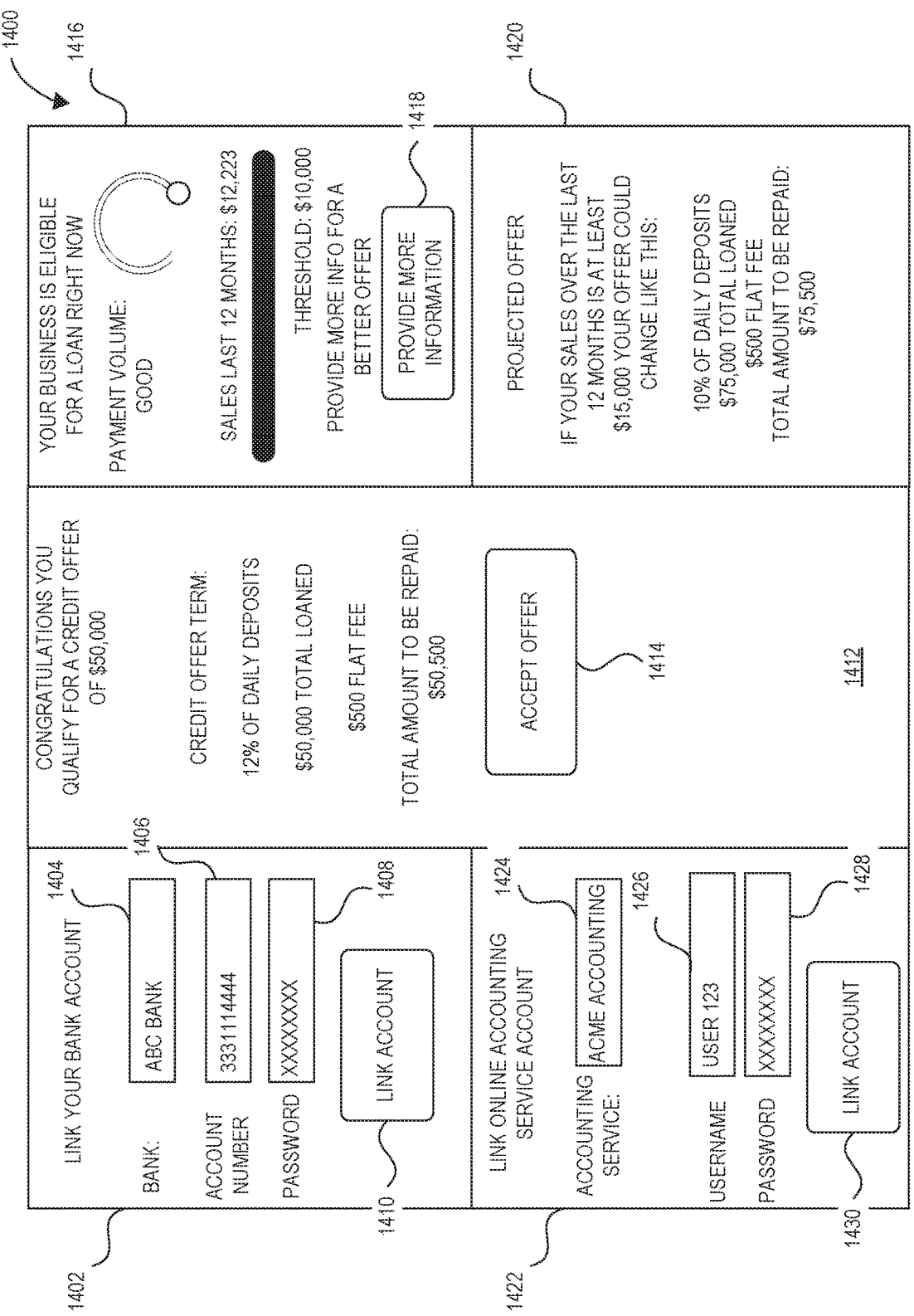
FIG. 14 illustrates techniques for visualizing current and potential credit offers made by the credit offer system of FIG. 1, in accordance with one or more aspects of the present disclosure.

FIG. 14 illustrates techniques for visualizing current and potential credit offers made by the credit offer system of FIG. 1, in accordance with one or more aspects of the present disclosure. FIG. 14 is described within the context of environment 100 shown in FIG. 1. As shown in FIG. 14, a computing device, such as computing device 102, may execute to present dashboard 1400 that is displayed by a display device operably coupled to the computing device. For example, credit offer system 104 may send a signal to computing device 102 that causes computing device 102 to present a dashboard, such as dashboard 1400. Dashboard 1400 may act as an interface that enables a merchant, such as merchant 112, to request a credit offer from credit offer system 104, to view the credit offer made by credit offer system 104, and to visualize how merchant 112 may be able to receive an updated credit offer from credit offer system 104 by linking additional data associated with merchant 112 to credit offer system 104.

Dashboard 1400 may act as a unifying user interface for visualizing current and potential future states of the credit offer. Computing device 102 may receive via dashboard 1400, user input corresponding to information for data associated with merchant 112 and additional user input corresponding to the information for the additional data associated with the merchant 112. Further, dashboard 1400 may present visualizations of a current credit offer for merchant 112 and one or more future or proposed credit offers for merchant 112.

Dashboard 1400 can indicate the state of the credit offer—including past, present, and future states—to provide better visibility to merchant 112 regarding which data sources may impact the credit offer and how data sources may impact the credit offer. This may aid merchant 112 to more efficiently plan their business by determining how its actions may affect the credit offers made by credit offer system 104 (e.g., gaining knowledge that purchasing inventory before a credit offer request could negatively impact terms of the credit offer). Thus, such a "plug-and-play" feature allows merchant 112 to take action to modify their business in order to cause credit offer system 104 to extend more favorable credit offers.

Dashboard 1400 may include panes 1402, 1412, 1416, 1420, and 1422. Pane 1402 may include fields 1404, 1406, and 1408 for receiving information that enables credit offer system 104 to access particular data associated with merchant 112 from a third-party data source. Merchant 112 may be able to interact with fields 1404, 1406, and 1408 via an input device operably coupled to computing device 102, to, for example input the information that enables credit offer system 104 to access particular data associated with merchant 112 from a third-party data source. The information that is inputted into panes 1402, 1412, 1416, 1420, and 1422 may affect the presentation of other panes 1402, 1412, 1416, 1420, and 1422 within dashboard 1400. For example, the information inputted into files 1404-1408 of pane 1402 may affect the credit offer that is presented in pane 1412 and affects the information that is presented in panes 1416 and 1420. Further, based on how merchant 112 interacts with the buttons 1414 and 1418 in pane 1412 and 1416 may affect how pane 1422 is presented, such as the kind of fields (e.g., fields 1424-1428) that are presented in pane 1422. In other examples, dashboard 1400 can be implemented in any other fashion. For example, instead of panes 1402 and navigational flow, 1412, 1416, 1420, and 1422, dashboard 1400 can also be implemented as any combination of panes, windows, tabs, or other user interface elements. For example, input into pane 1402 may cause computing device 102 to output for display a new window or an interstitial that acts similarly to pane 1416. In another example, the input into pane 1402 triggers activation of a secondary display that dynamically varies based on the input.

In the example of FIG. 14, pane 1402 may receive information regarding a bank account that is associated with merchant 112, and merchant 112 may interact with fields 1404, 1406, and 1408 to input the details associated with a bank account, such as the name of the bank, the account number for merchant 112, and the password for merchant 112. Pane 1402 may also include one or more interactive elements, such as button 1410 with which merchant 112 may interact to cause computing device 102 to send the inputted details associated with the bank account to credit offer system 104.

Credit offer system 104 may access data associated with merchant 112 based at least in part on the information inputted by merchant 112 into fields 1404, 1406, and 1408, and may determine whether to extend a credit offer to merchant 112 based at least in part on the data associated with merchant 112 that is accessed by credit offer system 104. If credit offer system 104 makes a credit offer to merchant 112, credit offer system 104 may transmit information regarding the credit offer to computing device 102 and pane 1412 of dashboard 1400 may present the terms of the credit offer being offered to merchant 112 by credit offer system 104 for viewing by merchant 112.

Along with pane 1412 that presents the terms of the credit offer being extended by credit offer system 104 or the terms of a credit offer that merchant 112 has already accepted or a loan for which the merchant is currently signed up, dashboard 1400 may also include pane 1416 that provides a visualization of at least some of the information credit offer system 104 has determined about merchant 112 and how the information determined about merchant 112 affects the terms of the credit offer made by credit offer system 104 to merchant 112. This enables merchant 112 to visualize how the information it has provided to credit offer system 104 affects the decision-making of credit offer system 104 and to visualize how it may link additional data associated with merchant 112 to improve the terms of the credit offer made by credit offer system 104 to merchant 112.

In the example of FIG. 14, pane 1416 presents a visualization of the sales volume of merchant 112 in the last 12 months as determined by credit offer system 104 based on the data associated with merchant 112 it has accessed, such as bank statements of merchant 112 accessed by credit offer system 104. In particular, pane 1416 presents a visualization of the sales volume of merchant 112 that it has determined compared with a threshold sales volume $10,000, enabling merchant 112 to understand the reasoning behind why credit offer system 104 has made the credit offer with the terms presented in pane 1412 to merchant 112.

Along with pane 1416, dashboard 1400 may also include pane 1420 that presents a projected credit offer that credit offer system 104 may potentially make to merchant 112 if merchant 112 is able to provide credit offer system 104 with additional information that enables merchant 112 to qualify for such a projected credit offer. For example, if merchant 112 is able to provide credit offer system 104 with additional information that enables credit offer system 104 to determine that merchant 112 has at least $15,000 in sales volume over the past 12 months, credit offer system 104 may potentially be able to update the loan amount of its credit offer to merchant 112 from $50,000 to $75,000. By presenting such a projected credit offer, dashboard 1400 may encourage merchant 112 to link additional data associated with itself to credit offer system 104 so that credit offer system 104 may be able to use such additional data to generate an updated credit offer for merchant 112.

In some examples, pane 1420 may additionally or alternatively present information regarding other offers by services that are associated with credit offer system 104 to cross-sell these other services that are associated with credit offer system 104. For example, pane 140 may also present offers for merchant 112 to subscribe or utilize services such as a payroll service, an appointment service, and the like, which may enable merchant 112 to use such services to more easily provide data regarding itself to credit offer system 104. Pane 140 may also surface such services to provide information that may help shape the loan eligibility or size credit offers. For example, the credit offer system 104 may specifically request for the cash flow statement of the merchant's business. The merchant 112 may not have the cash flow statement handy and collating the information may take too long. To this end, the credit offer system 104 may surface a service, either its own or a third-party via third-party API integration, to fulfil the data request.

Pane 1416 may also include one or more interactive elements, such as button 1418 with which merchant 112 may interact to indicate that merchant 112 would like to link additional data associated with merchant 112 to credit offer system 104 so that credit offer system 104 may use such additional data to extend an updated credit offer to merchant 112. When merchant 112 selects button 1418, computing device 102 may communicate to credit offer system 104 an indication that merchant 112 would like to link additional data associated with merchant 112 to credit offer system 104.

In response, credit offer system 104 may determine the kinds of additional data associated with merchant 112 that would be useful to determine an updated credit offer for merchant 112, and may send a request for such additional data associated with merchant 112 to computing device 102. Computing device 102 may receive the request from credit offer system 104 and may, in response, output, for display at a display device, a user interface for receiving input from merchant 112 corresponding to the additional data requested by credit offer system 104.

In the example of FIG. 14, dashboard 1400 includes pane 1422, which may be an example of the user interface for receiving input from merchant 112 corresponding to the additional data requested by credit offer system 104. In particular, credit offer system 104 may determine that merchant 112's online accounting statements may include additional information regarding the sales volume of merchant 112, and thus may send a request to computing device 102 for information to access merchant 112's online accounting statements from an online accounting service.

Pane 1422 may include fields 1424, 1426, and 1428 for receiving information that enables credit offer system 104 to access merchant 112's online accounting statements from an online accounting service. Merchant 112 may be able to interact with fields 1424, 1426, and 1428 via an input device operably coupled to computing device 102, to, for example input the information that enables credit offer system 104 to access merchant 112's online accounting statements from an online accounting service, such as the name of the online accounting service, the username for merchant 112, and the password for merchant 112. Pane 1422 may also include one or more interactive elements, such as button 1430 with which merchant 112 may interact to cause computing device 102 to send the inputted details associated with merchant 122's account with the online accounting service to credit offer system 104. In this way, merchant 112 may enable credit offer system 104 to access such additional data associated with merchant 112 to determine whether to generate an updated credit offer for merchant 122.

Figure 15:
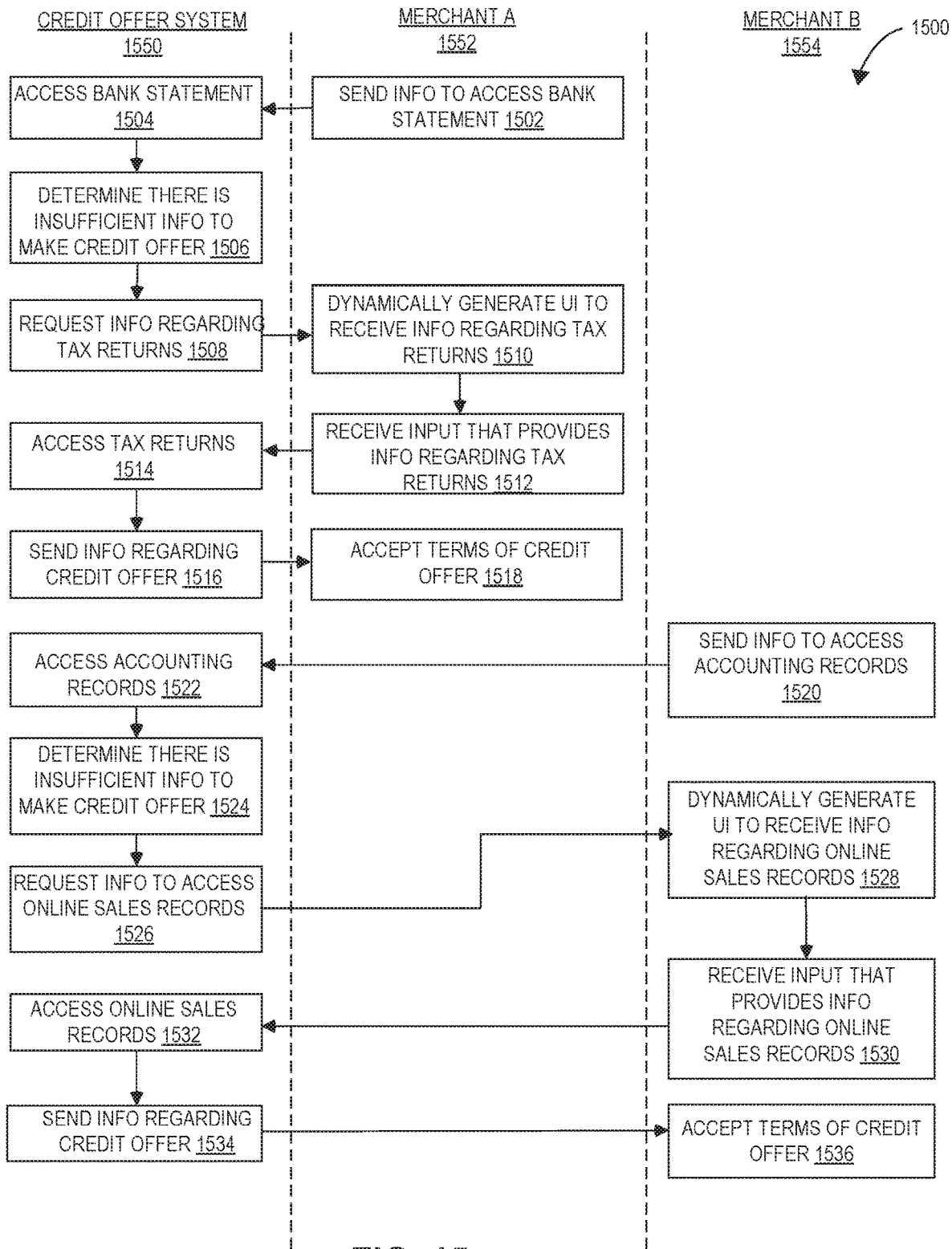
FIG. 15 illustrates a process for a credit offer system to interact with multiple merchants to extend credit offers to each of the merchants, in accordance with one or more aspects of the present disclosure.

FIG. 15 illustrates a process for a credit offer system to interact with multiple merchants to extend credit offers to each of the merchants, in accordance with one or more aspects of the present disclosure. For purposes of illustration, the example operations of FIG. 15 are described below within the context of FIG. 1. As shown in FIG. 15, process 1500 may include steps performed by credit offer system 1550, merchant A 1552, and merchant B 1554. Credit offer system 1550 is similar to credit offer system 104 shown in FIG. 1, while merchants 1552 and 1554 are each similar to merchant 112 shown in FIG. 1, and merchants 1552 and 1554 may each communicate with credit offer system 104 via respective computing devices that are similar to computing device 102 shown in FIG. 1.

Blocks 1502-1518 illustrate interactions between merchant A 1552 and credit offer system 1550 while blocks 1520-1536 illustrate interactions between merchant B 1554 and credit offer system 1550. Credit offer system 1550 may be able to interact with both merchant A 1552 and merchant B 1554 in any order, including at substantially the same time. Thus, for example, merchant A 1552 may be able to interact with credit offer system 1550, such as at block 1502 at substantially the same time as merchant B 1552 interacts with credit offer system 1550, such as at block 1520, so that the processes illustrated in blocks 1502-1518 may be performed at substantially the same time as the processes illustrated in blocks 1520-1536.

Process 1500 begins at block 1502 where merchant A 1552 may use its computing device to send information for accessing merchant A 1552's bank account statement to credit offer system 1550. Credit offer system 1550 may customize the data request to this specific third-party data source, as opposed to all possible kinds of data sources, based at least in part on current information associated with merchant A 1552. In one implementation, block 1502 may be triggered by credit offer system 1550 receiving a request from merchant A 1552 for a credit offer (not shown). In other implementations, the credit offer system 1550 may trigger the request at random or at periodic intervals for select merchants (e.g., merchant A 1552 or merchant B 1554) within its ecosystem. Credit offer system 1550 may select its target audience of the credit offer based on past requests from these merchants, knowledge of merchants similar to merchants A and B, and so on.

Process 1500 proceeds to block 1504 where credit offer system 1550 may use the information for accessing merchant 1552's bank account statement to access merchant A 1552's bank account statement. Process 1500 proceeds to block 1506 where credit offer system 1550 may determine, based at least in part on merchant A 1552's bank account statement, that it has insufficient information regarding merchant A 1552 to make a credit offer to merchant A 1552, and may determine additional information regarding merchant A 1552 it may obtain that may enable credit offer system 1550 to have sufficient information to make a credit offer to merchant A 1552.

For example, based on the bank account statements, credit offer system 1550 may determine that the merchant A 1552 is deemed to have a risk profile higher than a certain threshold. This could be based on factors such as merchant A 1552 having sales volume being lower than a specified sales volume threshold, merchant A 1552 having debt that is higher than a specified debt threshold, and the like. Credit offer system 1550 may then determine the delta and possible options of data sources that can bring the merchant's risk profile lower or equal to the threshold. In one example, the options may have an associated level of input complexity, e.g., one that can be provided by or on behalf of the merchant with lower network delays. For example, inputting a social security number may have a lower complexity value than providing 12 months of evidence of paid rent. Further, if credit offer system 1550 determines that both of these data sources are capable of lowering the risk profile, credit offer system 1550 may choose the data source with a lower level of input complexity. In this way, credit offer system 1550 may prioritize the data that it requests from the merchant based on the friction or complexity value of the merchant providing such data to credit offer system 1550.

Process 1500 proceeds to block 1508 where credit offer system 1550 determines that merchant A 1552's tax returns may include information that would enable credit offer system 1550 to have sufficient information to make a credit offer to merchant A 1552, and credit offer system 1550 may send a request for information for accessing merchant A 1552's tax returns to the computing device being used by merchant A 1552.

Process 1500 proceeds to block 1510 where in response to receiving the request for information for accessing merchant A 1552's tax returns, the computing device used by merchant A 1552 may dynamically generate a user interface that is customized to receive user input from merchant A 1552 that provides the information for accessing merchant A 1552's tax returns. Process 1500 proceeds to block 1512 where the computing device used by merchant A 1552 may receive user input from merchant A 1552 that provides the information for accessing merchant A 1552's tax returns, and may send the information for accessing merchant A 1552's tax returns to credit offer system 1550.

Process 1500 proceeds to block 1514 where credit offer system 1550 may receive the information for accessing merchant A 1552's tax returns and may access merchant A 1552's tax returns at a third-party data source, such as by logging into the IRS's website using the received information. Process 1500 proceeds to block 1516 where credit offer system 1550 may determine, based on the additional information it has determined regarding merchant A 1552 from merchant A 1552's tax returns, that merchant A 1552 qualifies for a credit offer, and credit offer system 1550 may send information regarding the credit offer to the computing device being used by merchant A 1552. Process 1500 proceeds to block 1518 where the computing device being used by merchant A 1552 may receive the information regarding the credit offer, and merchant A 1552 may interact with the computing device to accept the terms of the credit offer.

Similarly, in block 1520 of process 1500, merchant B 1554 may use its computing device to send information for accessing merchant B 1554's online accounting statement to credit offer system 1550. Process 1500 proceeds to block 1522 where credit offer system 1550 may use the information for accessing merchant B 1554's online accounting statement to access merchant B 1554's online accounting statement. Process 1500 proceeds to block 1524 where credit offer system 1550 may determine, based at least in part on merchant B 1554's online accounting statement, that it has insufficient information regarding merchant B 1554 to make a credit offer to merchant B 1554, and may determine additional information regarding merchant B 1554 it may obtain that may enable credit offer system 1550 to have sufficient information to make a credit offer to merchant 1554.

Process 1500 proceeds to block 1526 where credit offer system 1550 determines that merchant B 1554's online sales records may include information that would enable credit offer system 1550 to have sufficient information to make a credit offer to merchant B 1554, and credit offer system 1550 may send a request for information for accessing merchant B 1554's online sales records to the computing device being used by merchant B 1554.

Process 1500 proceeds to block 1528 where in response to receiving the request for information for accessing merchant B 1554's online sales records, the computing device used by merchant B 1554 may dynamically generate a user interface that is customized to receive user input from merchant B 1554 that provides the information for accessing merchant B 1554's online sales records. Process 1500 proceeds to block 1530 where the computing device used by merchant B 1554 may receive user input from merchant B 1554 that provides the information for accessing merchant B 1554 online sales records, and may send the information for accessing merchant B 1554's online sales records to credit offer system 1550.

Process 1500 proceeds to block 1532 where credit offer system 1550 may receive the information for accessing merchant B 1554's online sales records and may access merchant B 1554's online sales records at a third-party data source, such as by logging into the online sales system used by merchant B 1554 using the received information. Process 1500 proceeds to block 1534 where credit offer system 1550 may determine, based on the additional information it has determined regarding merchant B 1554 from merchant B 1554's online sales records, that merchant B 1554 qualifies for a credit offer, and credit offer system 1550 may send information regarding the credit offer to the computing device being used by merchant B 1554. Process 1500 proceeds to block 1536 where the computing device being used by merchant B 1554 may receive the information regarding the credit offer, and merchant B 1554 may interact with the computing device to accept the terms of the credit offer.

Figure 16:
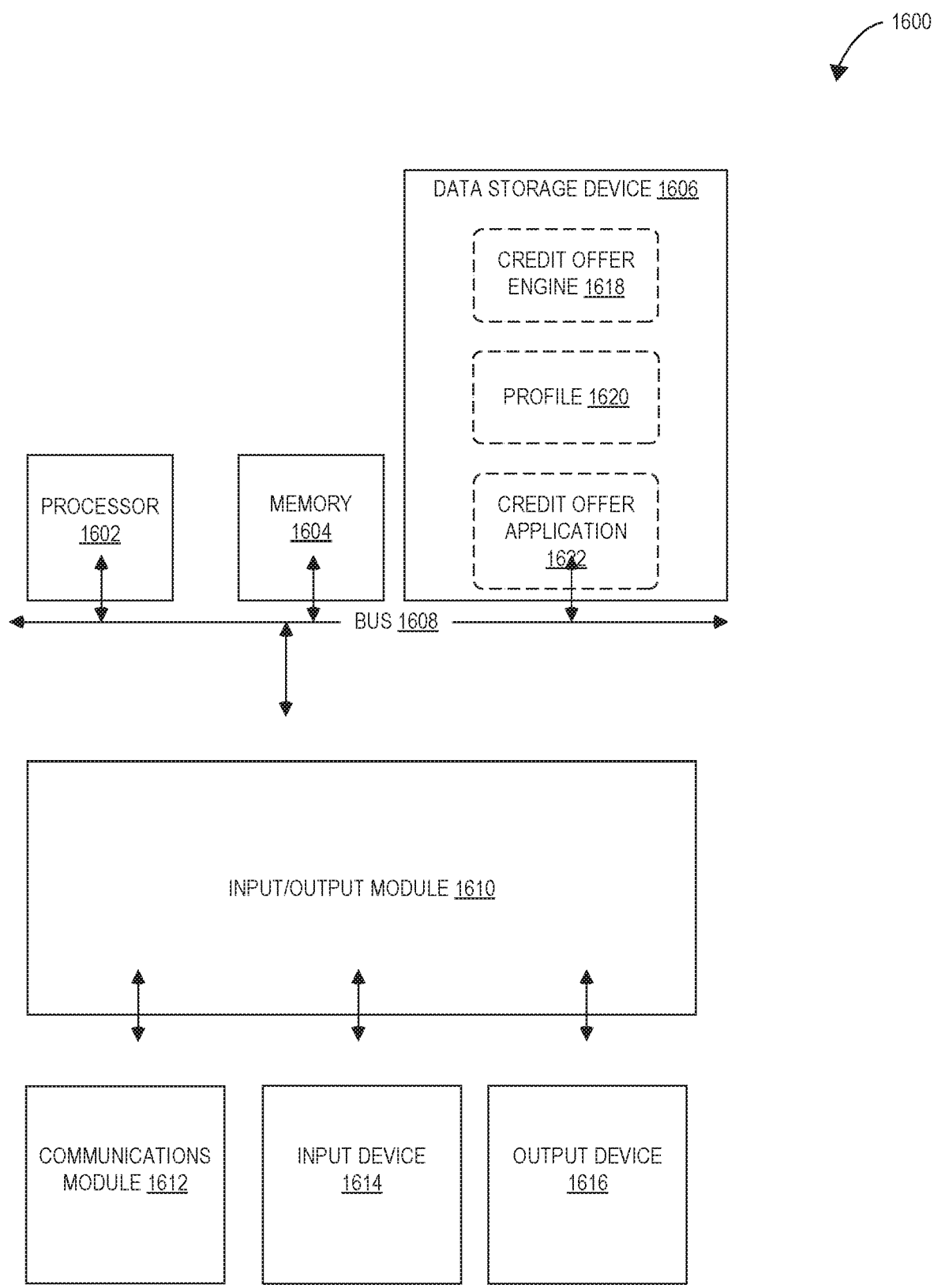
FIG. 16 illustrates an example computer system with which the credit offer system and the computing device of FIGS. 1-15 can be implemented.

FIG. 16 illustrates an example computer system with which the credit offer system and the computing device of FIGS. 1-16 can be implemented. As shown in FIG. 16, computer system 1600 represents an example of credit offer system 104 or computing device 102. In certain aspects, the computer system 1600 may be implemented using hardware or a combination of software and hardware, either in a dedicated server, or integrated into another entity, or distributed across multiple entities.

Computer system 1600 (e.g., credit offer system 104 or computing device 102) includes a bus 1608 or other communication mechanism for communicating information, and a processor 1602 coupled with bus 1608 for processing information. According to one aspect, the computer system 1600 can be a cloud computing server of an IaaS that is able to support PaaS and SaaS services. According to one aspect, the computer system 1600 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 1600 may be implemented with one or more processor 1602. Processor 1602 may be a general-purpose microprocessor, a microcontroller, a Digital Signal processor (DSP), an ASIC, a FPGA, a Programmable Logic Device (PLD), a controller, a state machine, gated logic, discrete hardware components, or any other suitable entity that can perform calculations or other manipulations of information.

Computer system 1600 can include, in addition to hardware, code that creates an execution environment for the computer program in question, e.g., code that constitutes processor firmware, a protocol stack, a database management system, an operating system, or a combination of one or more of them stored in an included memory 1604, such as a Random Access memory (RAM), a flash memory, a Read Only memory (ROM), a Programmable Read-Only memory (PROM), an Erasable PROM (EPROM), registers, a hard disk, a removable disk, a CD-ROM, a DVD, or any other suitable storage device, coupled to bus 1608 for storing information and instructions to be executed by processor 1602. The processor 1602 and the memory 1604 can be supplemented by, or incorporated in, special purpose logic circuitry. Expansion memory may also be provided and connected to computer system 1600 through input/output module 1610, which may include, for example, a SIMM (Single In Line Memory Module) card interface. Such expansion memory may provide extra storage space for computer system 1600, or may also store applications or other information for computer system 1600. Specifically, expansion memory may include instructions to carry out or supplement the processes described above, and may include secure information also. Thus, for example, expansion memory may be provided as a security module for computer system 1600, and may be programmed with instructions that permit secure use of computer system 1600. In addition, secure applications may be provided via the SIMM cards, along with additional information, such as placing identifying information on the SIMM card in a non-hackable manner.

The instructions may be stored in the memory 1604 and implemented in one or more computer program products, e.g., one or more modules of computer program instructions encoded on a computer readable medium for execution by, or to control the operation of, the computer system 1600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and XML-based languages. Memory 1604 may also be used for storing temporary variable or other intermediate information during execution of instructions to be executed by processor 1602.

A computer program or application as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 1600 further includes a data storage device 1606 such as a magnetic disk or optical disk, coupled to bus 1608 for storing information and instructions. When computer system 1600 acts as an example of credit offer system 104, data storage device 1606 may store credit offer engine 1618, which may be an example of credit offer engine 106 in FIG. 1, and profile 1620, which may be an example of profile 114 in FIG. 1. Similarly, when computer system 1600 acts as an example of computing device 102, data storage device 1606 may store credit offer application 1622, which may be an example of credit offer application 130 in FIG. 1, and which processor 1602 may execute to perform the techniques described herein attributed to computing device 102. Computer system 1600 may be coupled via input/output module 1610 to various devices. The input/output module 1610 can be any input/output module. Example input/output module 1610 includes data ports such as USB ports. In addition, input/output module 1610 may be provided in communication with processor 1602, so as to enable near area communication of computer system 1600 with other devices. The input/output module 1610 may provide, for example, for wired communication in some implementations, or for wireless communication in other implementations, and multiple interfaces may also be used. The input/output module 1610 is configured to connect to a communications module 1612. Example communications input/output module 1610 include networking interface cards, such as Ethernet cards and modems.

The components of the system can be interconnected by any form or medium of digital data communication, e.g., a communication network. The communication network (e.g., network 110) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 1612 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 1612 sends and receives electrical, electromagnetic or optical signals that carry digital data streams representing various types of information. The network link typically provides data communication through one or more networks to other data devices. For example, the network link of the communications module 1612 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 1612, which carry the digital data to and from computer system 1600, are example forms of transmission media.

Computer system 1600 can send messages and receive data, including program code, through the network(s), the network link and communications module 1612. In the Internet example, a server might transmit a requested code for an application program through Internet, the ISP, the local network and communications module 1612. The received code may be executed by processor 1602 as it is received, and/or stored at data storage device 1606 for later execution.

In certain aspects, the input/output module 1610 is configured to connect to a plurality of devices, such as an input device 1614 and/or an output device 1616. Example input device 1614 include a keyboard and a pointing device, e.g., a mouse or a trackball, by which a user can provide input to the computer system 1600. Other kinds of input device 1614 can be used to provide for interaction with a user as well, such as a presence-sensitive input device, a tactile input device, a visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output device 1616 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user, audio output devices such as loudspeakers or earphones, haptic motors for outputting haptic feedback, and the like. The output device 1616 may comprise appropriate circuitry for driving the output device 1616 to present graphical and other information to a user.

According to one aspect of the present disclosure, computing device 102 and credit offer system 104 can be implemented using a computer system 1600 in response to processor 1602 executing one or more sequences of one or more instructions contained in memory 1604, such as the instructions of credit offer engine 1618 or the instructions of credit offer application 1622 stored in data storage device 1606. Such instructions may be read into memory 1604 from another machine-readable medium, such as data storage device 1606. Execution of the sequences of instructions contained in main memory 1604 causes processor 1602 to perform the process steps described herein. One or more processors in a multi-processing arrangement may also be employed to execute the sequences of instructions contained in memory 1604. Processor 1602 may process the executable instructions and/or data structures by remotely accessing the computer program product, for example by downloading the executable instructions and/or data structures from a remote server through communications module 1612 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

When computer system 1600 implements an example of credit offer system 104, processor 1602 may execute the instructions of credit offer engine 1618 to receive, from computing device 102 associated with merchant 112, a request for a credit offer to the merchant. Processor 1602 may further execute the instructions of credit offer engine 1618 to obtain specific data associated with merchant 112 for determining whether to extend the credit offer to merchant 112, where the data corresponds to a specific data source (e.g., one of third-party data sources 108). Processor 1602 may further execute the instructions of credit offer engine 1618 to generate profile 1620 of merchant 112 based at least in part on the information regarding merchant 112 contained or otherwise derived from the data associated with merchant 112.

Processor 1602 may further execute the instructions of credit offer engine 1618 to determine, based at least in part on profile 1620 of merchant 112, whether the data is sufficient to extend the credit offer to merchant 112. In response to determining that the data is not sufficient to extend the credit offer to the merchant, processor 1602 may further execute the instructions of credit offer engine 1618 to determine, based at least in part on the data, additional data associated with merchant 112 that is to be obtained for determining whether to extend the credit offer to the merchant. Along with or in place of the additional data, the credit offer engine 1618 can indicate another data source to access for determining risk profile of the merchant and accordingly make a decision on the credit offer. This process of identification of data source and mining data accordingly, may continue until the request is processed or the request is rescinded.

Processor 1602 may further execute the instructions of credit offer engine 1618 to send, to computing device 102 via communications module 1612, a request for information for accessing the additional data, where the request causes computing device 102 to generate a user interface that is customized for receiving user input corresponding to the information for accessing the additional data. In response to receiving the information for accessing the additional data from computing device 102 via communications module 1612, processor 1602 may further execute the instructions of credit offer engine 1618 to access the additional data associated with merchant 112 based at least in part on the information for accessing the additional data, where the additional data corresponds to another specific data source (e.g., another one of third-party data sources 108). In response to determining that the data and the additional data are sufficient to extend the credit offer to merchant 112, processor 1602 may further execute the instructions of credit offer engine 1618 to send to computing device 102 information associated with the credit offer.

When computer system 1600 implements an example of computing device 102, processor 1602 may execute the instructions of credit offer application 1622 to receive, via input device 1614, an indication of user input, the user input corresponding to information for data associated with merchant 112, where the data corresponds to a specific data source (e.g., one of third-party data sources 108). Processor 1602 may further execute the instructions of credit offer application 1622 to send, via communications module 1612, an indication of the data to credit offer system 104 for determining whether the data is sufficient for credit offer system 104 to extend a credit offer to merchant 112.

In response to receiving, from credit offer system 104 via communications module 1612, a request for additional data associated with merchant 112, processor 1602 may further execute the instructions of credit offer application 1622 to dynamically generate, based at least in part on the request for the additional data, a user interface adapted to receive information for the additional data associated with merchant 112, and may output the user interface for display at output device 1616. Processor 1602 may further execute the instructions of credit offer application 1622 to receive, via the user interface and via input device 1614, an indication of additional user input, the additional user input corresponding to the information for the additional data associated with merchant 112, where the additional data corresponds to another specific data source (e.g., another one of third-party data sources 108).

Processor 1602 may further execute the instructions of credit offer application 1622 to send, via communications module 1612, an indication of the additional data to credit offer system 104 for determining whether the data combined with the additional data are sufficient for credit offer system 104 to extend a credit offer to merchant 112. In response to sending the indication of the additional data to credit offer system 104, processor 1602 may further execute the instructions of credit offer application 1622 to receive, via communications module 1612, information associated with the credit offer, the information associated with the credit offer indicative of credit offer system 104 extending the credit offer to merchant 112.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computer system 1600 can include clients and servers. A client and server are generally remote from each other and typically interact through a communication network. The relationship of client and server arises by virtue of computer programs running on the respective computers and having a client-server relationship to each other. Computer system 1600 can be, for example, and without limitation, a desktop computer, laptop computer, or tablet computer. Computer system 1600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 1602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash storage device 1606. Volatile media include dynamic memory, such as memory 1604. Transmission media include coaxial cables, copper wire, and fiber optics, including the wires that comprise bus 1608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 1608. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents.

What is claimed is:

1. A method comprising:
receiving, by one or more server computing devices of a service system, a request for a credit offer for a merchant, wherein the request is received via an application executing on a computing device of the merchant;
receiving, by the one or more server computing devices, an indication of input provided by the merchant via a user interface at the computing device;
sending, from the one or more server computing devices and via a first application programming interface (API), a data request to a first data source for first data associated with the merchant;
receiving, by the one or more server computing devices and via the first API, the first data associated with the merchant from the first data source;
training a machine learning model using historic data previously obtained from a plurality of merchants associated with the service system, the plurality of merchants including the merchant, wherein the historic data includes transaction information received from the plurality of merchants by a payment service associated with the service system for processing of transactions between the plurality of merchants and respective customers;
determining, by the one or more server computing devices, based at least on a first output of the machine learning model, that the first data is not sufficient to extend the credit offer to the merchant;
in response to determining that the first data is not sufficient to extend the credit offer to the merchant, determining, by the one or more server computing devices and based at least in part on (i) the first data and (ii) information associated with other merchants similar to the merchant, additional data associated with the merchant that is to be obtained for determining whether to extend the credit offer to the merchant, wherein the additional data is associated with at least one second data source different from the first data source;
customizing, by the one or more server computing devices, at least one request for information to send to the computing device of the merchant for accessing the additional data;
sending, to the computing device of the merchant, the customized at least one request for the information for accessing the additional data, which causes the computing device of the merchant to generate, automatically and in near real-time, one or more additional user interfaces customized for receiving additional input for accessing the additional data, wherein the one or more additional user interfaces are presented sequentially, and graphically indicate, based on the additional input provided for accessing the additional data, updated progress toward a metric threshold for a metric indicative of a business of the merchant;
based on receiving the additional input for accessing the additional data, sending, by the one or more server computing devices and via a second API, a data request to the second data source for the additional data associated with the merchant;
receiving, by the one or more server computing devices, from the second data source and via the second API, the additional data associated with the merchant;
providing, by the one or more server computing devices, at least the additional data to the machine learning model;
determining, by the one or more server computing devices, based at least on a second output of the machine learning model, that the first data and the additional data are sufficient to extend the credit offer to the merchant based at least on the second output of the machine learning model indicating that a confidence level associated with the first data and the additional data exceeds a threshold confidence level;
based at least on receiving the additional data and the second output of the machine learning model, sending, by the one or more server computing devices and to the computing device of the merchant, information to cause the computing device of the merchant to modify the one or more additional user interfaces to update the progress toward the metric threshold presented in the one or more additional user interfaces; and
in response to determining that the data and the additional data are sufficient to extend the credit offer to the merchant, sending, by the one or more server computing devices and to the computing device associated with the merchant, information associated with the credit offer to cause the computing device associated with the merchant to present a customized user interface including the credit offer and one or more controls selectable for selecting the credit offer.

2. The method of claim 1, wherein the first data comprises at least one of a bank account statement, an accounting statement, or a tax return, the method further comprising determining, by the one or more server computing devices, information associated with the merchant based at least in part on the first data.

3. The method of claim 2, further comprising:
determining, by the one or more server computing devices, additional information associated with the merchant based at least in part on the additional data; and
prioritizing, by the one or more server computing devices, the additional information associated with the merchant over the information associated with the merchant to determine the credit offer for the merchant.

4. The method of claim 1, further comprising transmitting, by the one or more server computing devices and to the computing device of the merchant, a signal that causes the computing device of the merchant to output a dashboard, wherein the dashboard presents a unifying user interface associated with current and potential future states of the credit offer, and wherein the unifying user interface is able to receive at least the input for accessing the additional data.

5. The method of claim 1, further comprising:
determining, by the one or more server computing devices, information associated with the merchant based at least in part on the first data;
determining, by the one or more server computing devices, additional information associated with the merchant that is to be obtained to supplement the information associated with the merchant that has been determined based at least in part on the first data; and
determining, by the one or more server computing devices, the additional data associated with the merchant that is to be obtained based at least in part on the additional information associated with the merchant.

6. The method of claim 1, further comprising determining, by the one or more server computing devices, the credit offer for the merchant while the computing device receives the additional input for accessing the additional data.

7. The method of claim 1, wherein the first data source and the second data source are associated with different types of information, and the first API used for obtaining the first data from the first data source is different from the second API used for obtaining the additional data from the second data source.

8. A system comprising:
   a processor; and
   a memory storing instructions that, when executed by the processor, configure the system to:
      receive, in association with a request for a credit offer, user input provided by a user of payment service via a user interface at a computing device associated with the user, wherein the payment service is associated with the system;
      obtain, based at least in part on the user input provided by the user and via a first application programming interface (API), first data associated with the user from a first data source;
      train a machine learning model using historic data previously obtained from a plurality of users associated with the system, the plurality of users including the user, wherein the historic data includes transaction information received from the plurality of users by the payment service associated with the system for processing of transactions in which the plurality of users participated;
      determine, based at least on a first output of the machine learning model, that the first data is not sufficient to extend a specific credit offer to the user;
      in response to determining that the first data is not sufficient to extend the specific credit offer to the user, determine, based at least in part on (i) the first data and (ii) information associated with at least one other user similar to the user, additional data associated with the user that is to be obtained for determining whether to extend the specific credit offer to the user, wherein the additional data is associated with at least a second data source;
      customize at least one request for information for accessing the additional data to send to the computing device of the user;
      send, to the computing device of the user, the customized request for the information for accessing the additional data, which causes the computing device of the user to generate, automatically and in near real-time, one or more additional user interfaces customized for receiving additional user input for accessing the additional data, wherein the one or more additional user interfaces are presented sequentially, and graphically indicate, based on the additional input provided for accessing the additional data, updated progress toward a metric threshold for a metric indicative of a business of the user;
      based on receiving the additional input for accessing the additional data, send, and via a second API, a data request to the second data source for the additional data associated with the user;
      receive, from the second data source and via the second API, the additional data associated with the user;
      provide at least the additional data to the machine learning model;
      determine, based at least on a second output of the machine learning model, that the first data and the additional data are sufficient to extend the credit offer to the user based at least on the second output of the machine learning model indicating that a confidence level associated with the first data and the additional data exceeds a threshold confidence level;
      based at least on receiving the additional data and the second output of the machine learning model, send, to the computing device of the user, information to cause the computing device of the user to modify the one or more additional user interfaces to update the progress toward the metric threshold presented in the one or more additional user interfaces; and
      in response to determining that the data and the additional data are sufficient to extend the specific credit offer to the user, send, to the computing device associated with the user, information associated with the specific credit offer to cause the computing device associated with the user to present a customized user interface including the credit offer and one or more controls selectable for selecting the credit offer.

9. The system of claim 8, wherein the first data comprises at least one of a bank account statement, an accounting statement, or a tax return, and wherein the instructions further configure the system to determine information associated with the user based at least in part on information included in the first data.

10. The system of claim 8, wherein the instructions further configure the system to transmit to the computing device of the user, a signal that causes the computing device of the user to output a dashboard, wherein the dashboard presents a unifying user interface associated with current and potential future states of the credit offer, and wherein the unifying user interface is able to receive at least the input for accessing the additional data.

11. The system of claim 8, wherein the instructions further configure the system to:
   determine information associated with the user based at least in part on the first data;
   determine additional information associated with the user that is to be obtained to supplement the information associated with the user that has been determined based at least in part on the first data; and
   determine the additional data associated with the user that is to be obtained based at least in part on the additional information associated with the user.

12. The system of claim 11, wherein the instructions further configure the system to:
   determine the specific credit offer for the user while the computing device receives the additional information for accessing the additional data.

13. The system of claim 8, wherein the first data source and the second data source are associated with different types of information, and the first API used for obtaining the first data from the first data sources is different from the second API used for obtaining the additional data from the second data source.

14. A non-transitory computer-readable storage medium, the computer-readable storage medium including instructions that when executed by at least one processor associated with a service system, cause the at least one processor to:
   receive, from a computing device associated with a merchant via an application executing at the computing device, a request for a credit offer for the merchant;

obtain, based at least in part on input provided by the merchant via a user interface at the computing device, first data associated with the merchant, wherein the first data is obtained via a first application programming interface (API) from a first data source;

train a machine learning model using historic data previously obtained from a plurality of merchants associated with the service system, the plurality of merchants including the merchant, wherein the historic data includes transaction information received from the plurality of merchants by a payment service associated with the service system for processing of transactions between the plurality of merchants and respective customers;

determine, based at least on a first output of a machine learning model, that the first data is not sufficient to extend the credit offer to the merchant;

in response to determining that the first data is not sufficient to extend the credit offer to the merchant, determine, based at least in part on (i) the first data and (ii) information associated with at least one other merchant similar to the merchant, additional data associated with the merchant that is to be obtained for determining whether to extend the credit offer to the merchant, wherein the additional data is associated with at least one second data source that is different than the first data source;

customize at least one request to access the additional data to send to the computing device;

send, to the computing device, the customized at least one request to access the additional data, which causes the computing device to generate, automatically and in near real-time, one or more additional user interfaces customized for receiving additional input for accessing the additional data, wherein the one or more additional user interfaces are presented sequentially, and graphically indicate, based on the additional input provided for accessing the additional data, updated progress toward a metric threshold for a metric indicative of a business of the merchant;

based on receiving the additional input for accessing the additional data, send, via a second API, a data request to the second data source for the additional data associated with the merchant;

receive, from the second data source and via the second API, the additional data associated with the merchant;

provide at least the additional data to the machine learning model;

determine, based at least on a second output of the machine learning model, that the first data and the additional data are sufficient to extend the credit offer to the merchant based at least on the second output of the machine learning model indicating that a confidence level associated with the first data and the additional data exceeds a threshold confidence level;

based at least on receiving the additional data and the second output of the machine learning model, send, to the computing device of the merchant, information to cause the computing device of the merchant to modify the one or more additional user interfaces to update the progress toward the metric threshold presented in the one or more additional user interfaces; and in response to determining that the data and the additional data are sufficient to extend the credit offer to the merchant, send to the computing device associated with the merchant, information associated with the credit offer to cause the computing device associated with the merchant to present a customized user interface including the credit offer and one or more controls selectable for selecting the credit offer.

15. A method for adaptively obtaining data for decision-making, the method comprising:

receiving, by a computing device, an indication of user input, the user input corresponding to information for accessing first data associated with a merchant, wherein the first data is associated with a first data source;

sending, by the computing device, an indication of the first data to one or more server computing devices of a service system for determining whether the first data is sufficient for the service system to extend a credit offer to the merchant, wherein the one or more server computing devices employ a first application programming interface (API) to obtain the first data from the first data source, wherein the one or more service computing devices determine, based at least on a first output of a machine learning model, whether the first data is sufficient to extend the credit offer to the merchant, the machine learning model having been trained using historic data previously obtained from a plurality of merchants associated with the service system, the plurality of merchants including the merchant, wherein the historic data includes transaction information received from the plurality of merchants by a payment service associated with the service system for processing of transactions between the plurality of merchants and respective customers;

in response to receiving a request for additional data associated with the merchant based on a determination by the one or more server computing devices that the first data is insufficient, generating, by the computing device and based at least in part on the request for the additional data, a user interface adapted to receive information for accessing the additional data associated with the merchant, wherein the user interface is customized based at least in part on the additional data requested and is generated automatically and in near real-time, the user interface including a graphical indication of progress toward a metric threshold for a metric indicative of a business of the merchant;

receiving, by the computing device via the user interface, an indication of additional user input, the additional user input corresponding to the information for accessing the additional data associated with the merchant, wherein the additional data is associated with a second data source;

sending, by the computing device, an indication of the additional data to the service system for determining whether the first data combined with the additional data are sufficient for the service system to extend a credit offer to the merchant, wherein the one or more server computing devices are configured to send, via a second API, a data request to the second data source for the additional data associated with the merchant, and based on receiving the additional data, provide the additional data as input to the machine learning model for determining, based at least on a second output of the machine learning model, that the first data and the additional data are sufficient to extend the credit offer to the merchant based at least on the second output of the machine learning model indicating that a confidence level associated with the first data and the additional data exceeds a threshold confidence level;

in response to sending the indication of the additional data to the service system, receiving, by the computing device, information associated with the credit offer, the information associated with the credit offer indicative of the service system extending the credit offer to the merchant, wherein the information associated with the credit offer includes information to cause the computing device to modify the graphical indication in the user interface to update the progress toward the metric threshold presented in the user interface to indicate that the first data and the additional data received exceeds the metric threshold and is sufficient for the service system to extend the credit offer; and based at lease on the one or more server computing devices determining that the data and the additional data are sufficient to extend the credit offer to the merchant, receiving, by the computing device, information to cause the computing device to present a customized user interface including the credit offer and one or more controls selectable for selecting the credit offer.

16. The method of claim 15, further comprising:

outputting, by the computing device, a dashboard, wherein the dashboard presents a unifying user interface associated with current and potential future states of the credit offer, wherein the dashboard presents visualizations of a current credit offer for the merchant and a visualization of one or more future credit offers for the merchant.

\* \* \* \* \*